United States Patent
Dhuse et al.

(10) Patent No.: US 10,671,585 B2
(45) Date of Patent: *Jun. 2, 2020

(54) STORING INDEXED DATA TO A DISPERSED STORAGE NETWORK

(71) Applicant: CLEVERSAFE, INC., Chicago, IL (US)

(72) Inventors: Greg Dhuse, Chicago, IL (US); Ilya Volvovski, Chicago, IL (US); Adam Michael Gray, Chicago, IL (US); Andrew Baptist, Mt. Pleasant, WI (US)

(73) Assignee: Pure Storage, Inc., Mountain View, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 13/943,456

(22) Filed: Jul. 16, 2013

(65) Prior Publication Data
US 2013/0304745 A1 Nov. 14, 2013

Related U.S. Application Data

(63) Continuation-in-part of application No. 13/718,961, filed on Dec. 18, 2012, now Pat. No. 9,507,786.
(Continued)

(51) Int. Cl.
*G06F 16/22* (2019.01)
*G06F 11/10* (2006.01)

(52) U.S. Cl.
CPC ...... *G06F 16/2272* (2019.01); *G06F 11/1096* (2013.01); *G06F 16/22* (2019.01);
(Continued)

(58) Field of Classification Search
CPC .......... G06F 17/30091; G06F 17/3023; G06F 17/30309; G06F 17/30312; G06F 11/1088;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — David T. Brooks
*Assistant Examiner* — Berhanu Mitiku
(74) *Attorney, Agent, or Firm* — Garlick & Markison; Timothy W. Markison; Kelly H. Hale

(57) ABSTRACT

A method begins by a dispersed storage (DS) processing module storing a data portion in a dispersed storage network (DSN), where the data portion is associated with a set of data index keys, a version index key, and with a set of portion index keys. The method continues with the DS processing module traversing, based on the set of data index keys, a plurality of index structures to determine whether an object retrieval structure exists for the data portion. When the object retrieval structure exists, the method continues with the DS processing module updating the object retrieval structure by determining whether a version record exists that corresponds to the version index key and when the version record exists, creating, within the version record, a new data portion record for the data portion to include an identifier of the data portion and the set of portion index keys.

10 Claims, 69 Drawing Sheets

Related U.S. Application Data

(60) Provisional application No. 61/695,997, filed on Aug. 31, 2012, provisional application No. 61/593,116, filed on Jan. 31, 2012.

(52) U.S. Cl.
CPC ........ *G06F 16/221* (2019.01); *G06F 16/2219* (2019.01); *G06F 16/2237* (2019.01); *G06F 11/1092* (2013.01)

(58) Field of Classification Search
CPC ......... G06F 2211/1009; G06F 11/1662; G06F 16/22; G06F 16/221; G06F 16/2219; G06F 16/2228; G06F 16/2237
USPC ................. 707/741, 746, 769–770, 797, 827
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,647,329 B1 * | 1/2010 | Fischman ............. G06F 3/0607 707/999.1 |
| 8,335,776 B2 * | 12/2012 | Gokhale ............. G06F 16/2272 707/696 |
| 8,650,156 B1 * | 2/2014 | McHugh ............. G06F 16/219 707/638 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0129588 A1 * | 6/2006 | Hsu |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2008/0256183 A1 * | 10/2008 | Flynn ..................... G06F 1/183 709/204 |
| 2009/0094251 A1 | 4/2009 | Gladwin et al. |
| 2009/0094318 A1 | 4/2009 | Gladwin et al. |
| 2009/0313309 A1 * | 12/2009 | Becker ............. G06F 17/30595 |
| 2010/0023524 A1 | 1/2010 | Gladwin et al. |
| 2010/0146004 A1 * | 6/2010 | Sim-Tang ........... G06F 11/1448 707/797 |
| 2011/0126026 A1 * | 5/2011 | Gladwin ........... G06F 17/30067 713/193 |
| 2011/0196833 A1 * | 8/2011 | Drobychev ............. G06F 16/23 707/634 |
| 2012/0259863 A1 * | 10/2012 | Bodwin ............. G06F 17/3023 707/747 |
| 2013/0091251 A1 * | 4/2013 | Walker ............... H04N 21/6125 709/219 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

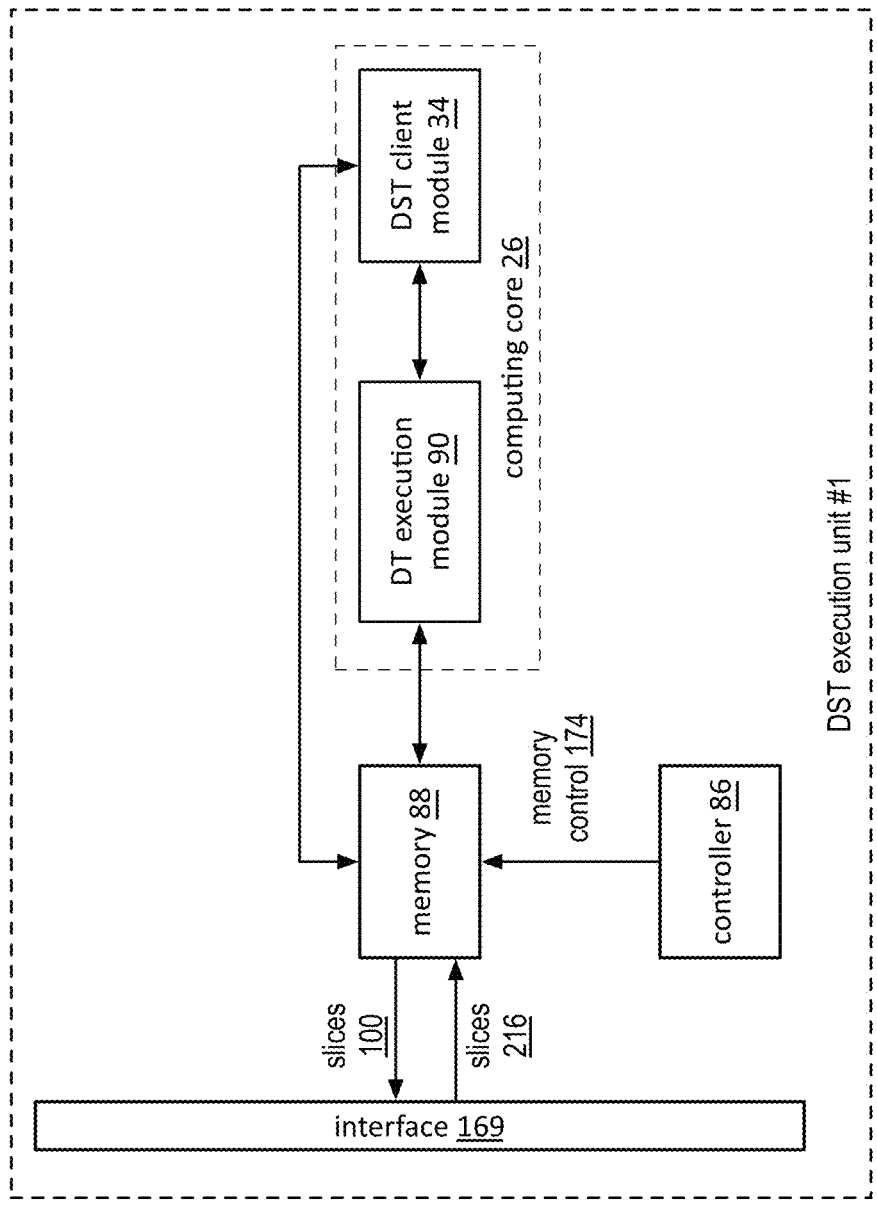
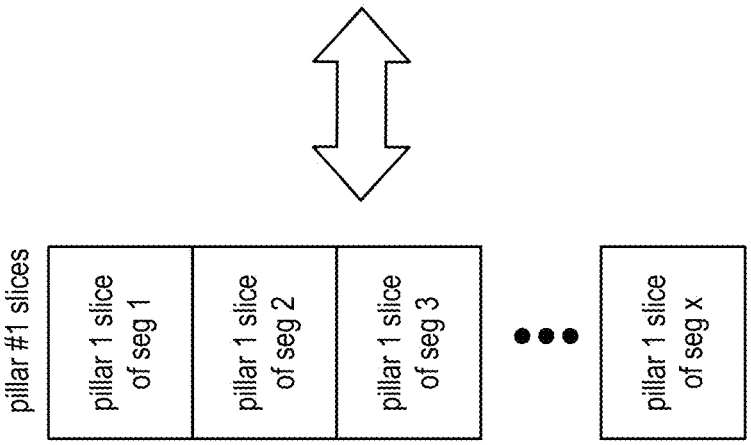
FIG. 24

DST allocation info 242 | data partition info 320: [X]data ID; No. of partitions; Addr. info for each partition; format conversion indication

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| | | task execution info 322 | | | intermediate result info 324 | | |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

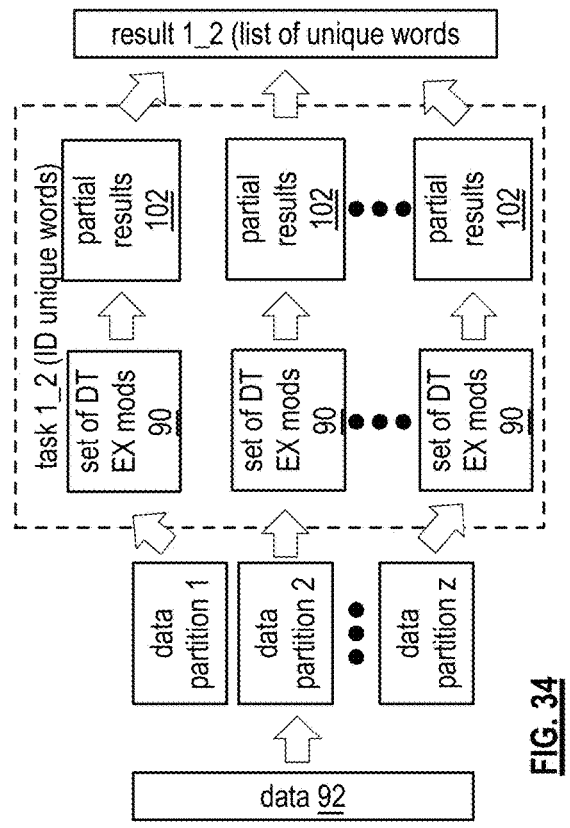
FIG. 34
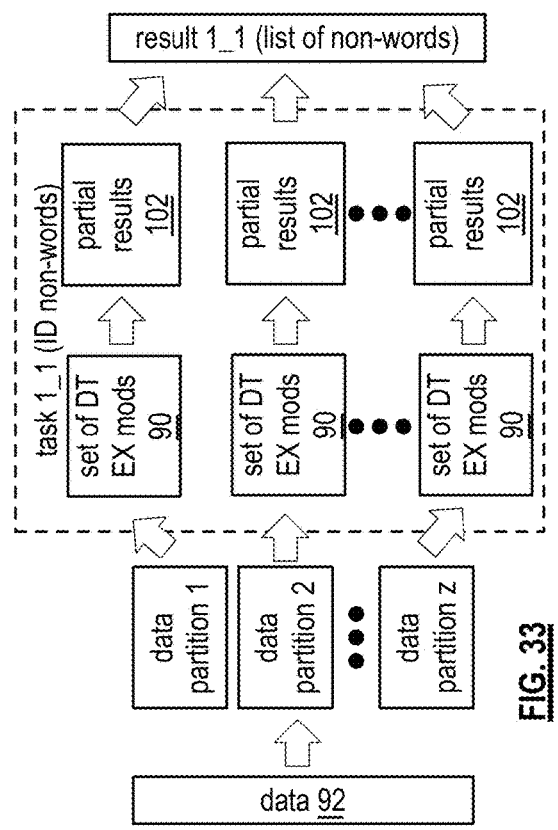
FIG. 33
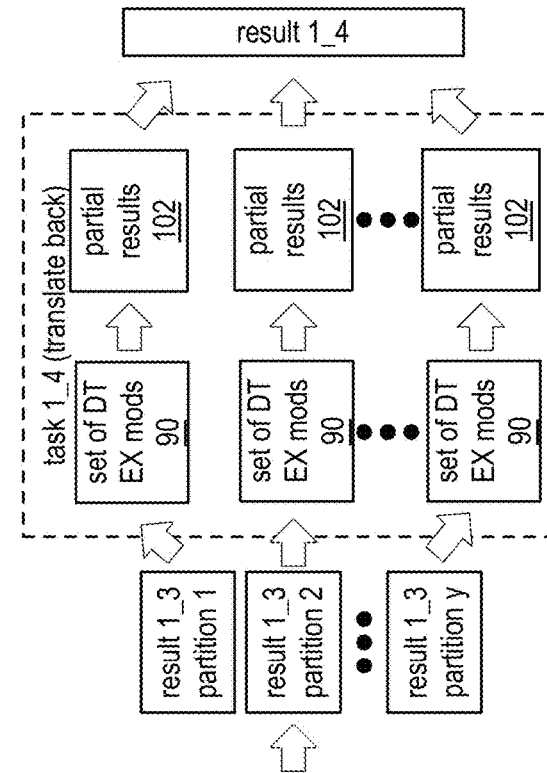
FIG. 35
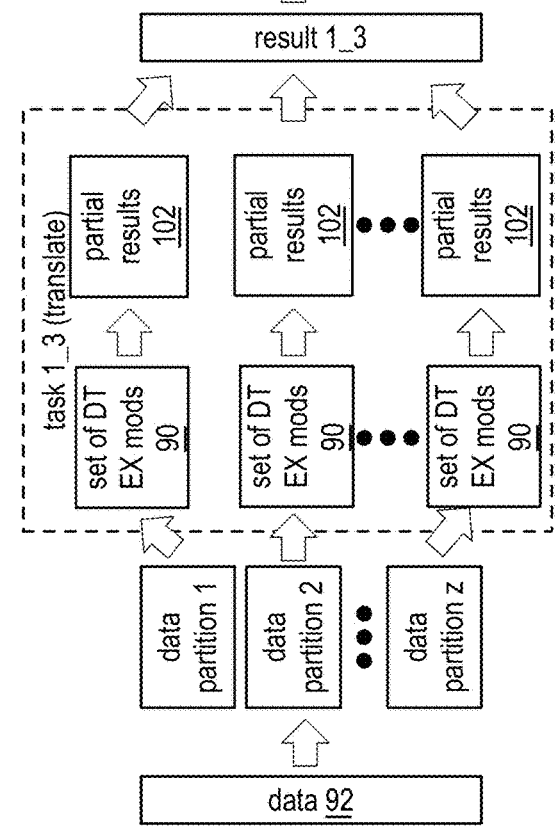

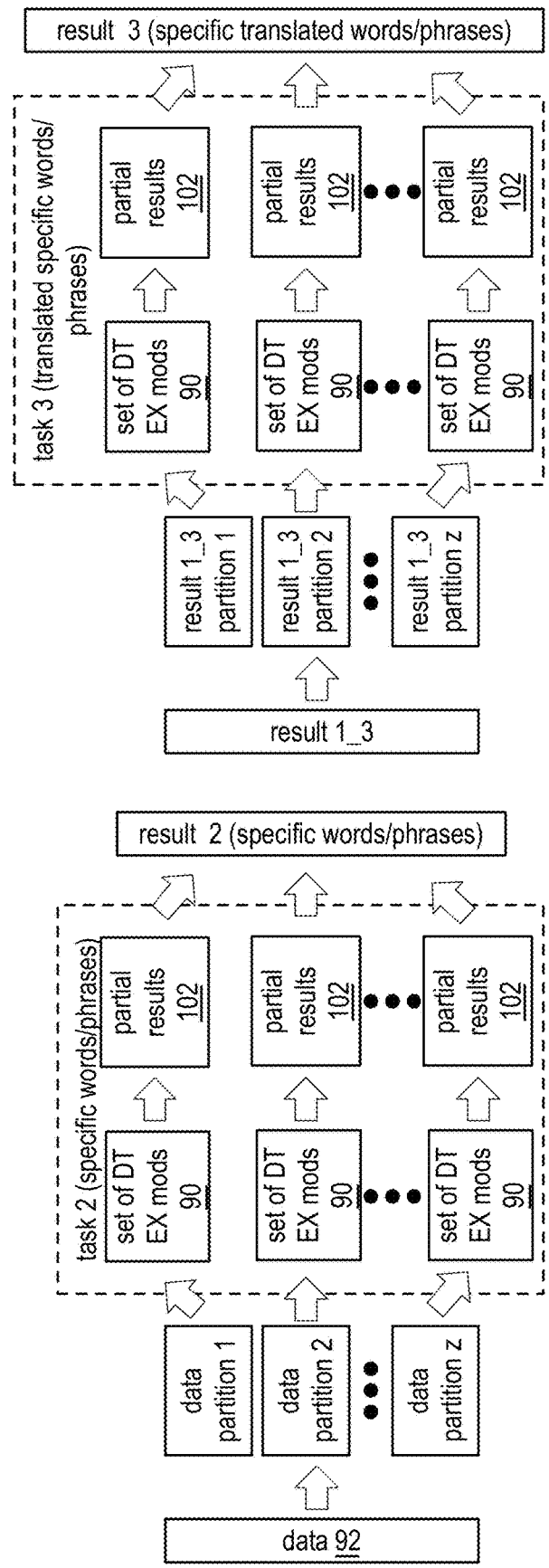
FIG. 38
FIG. 37
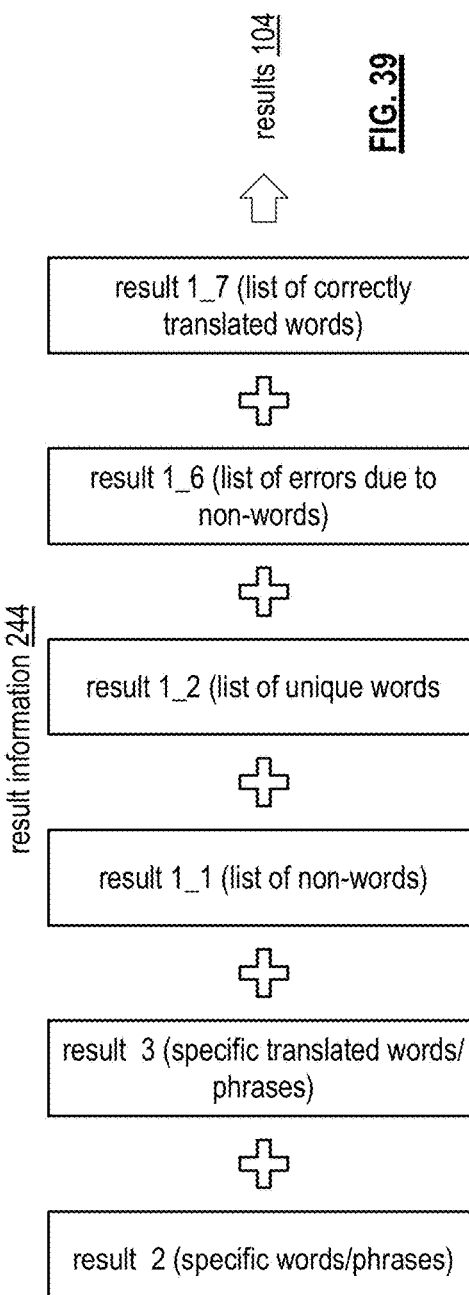
FIG. 39

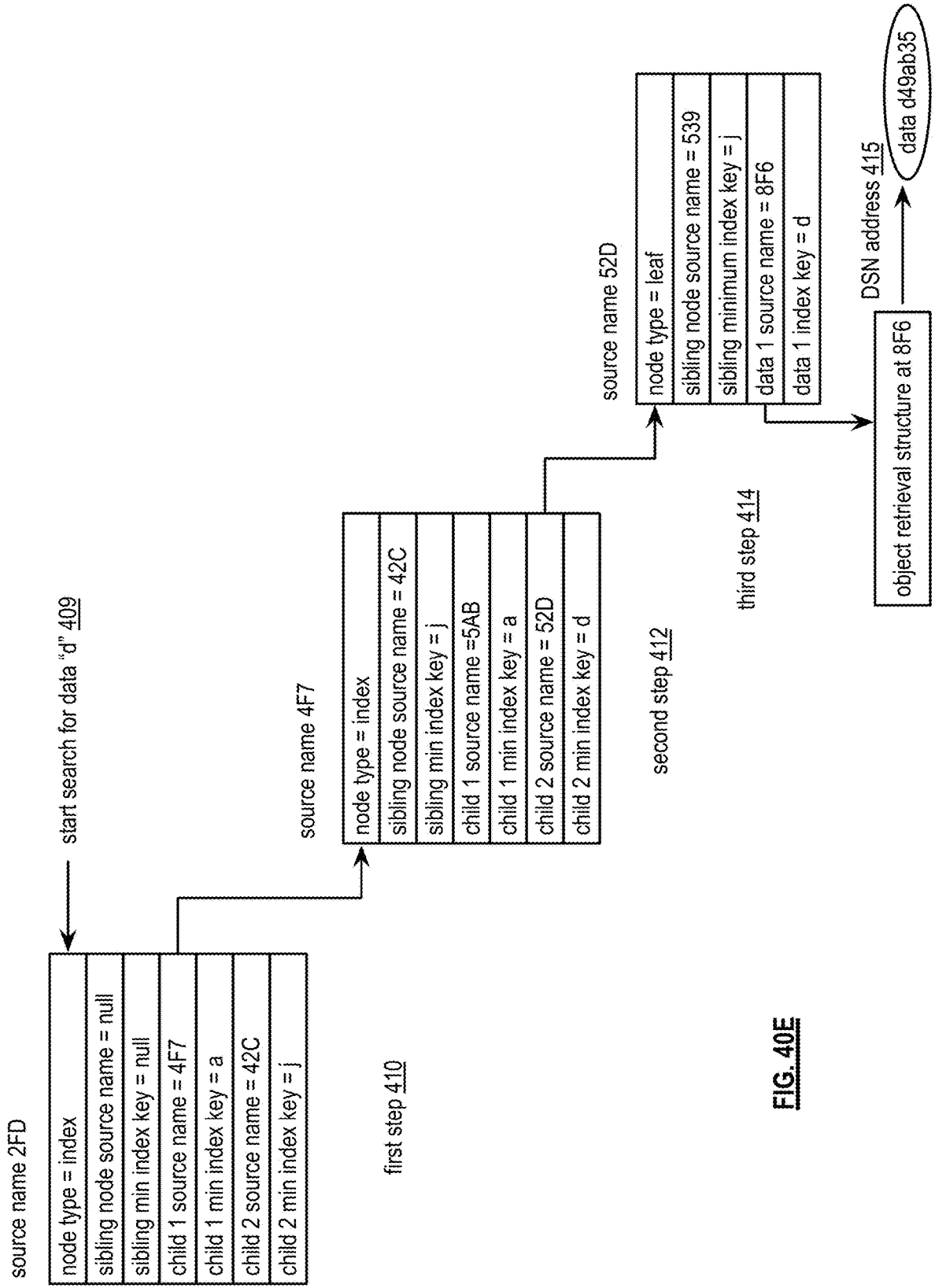

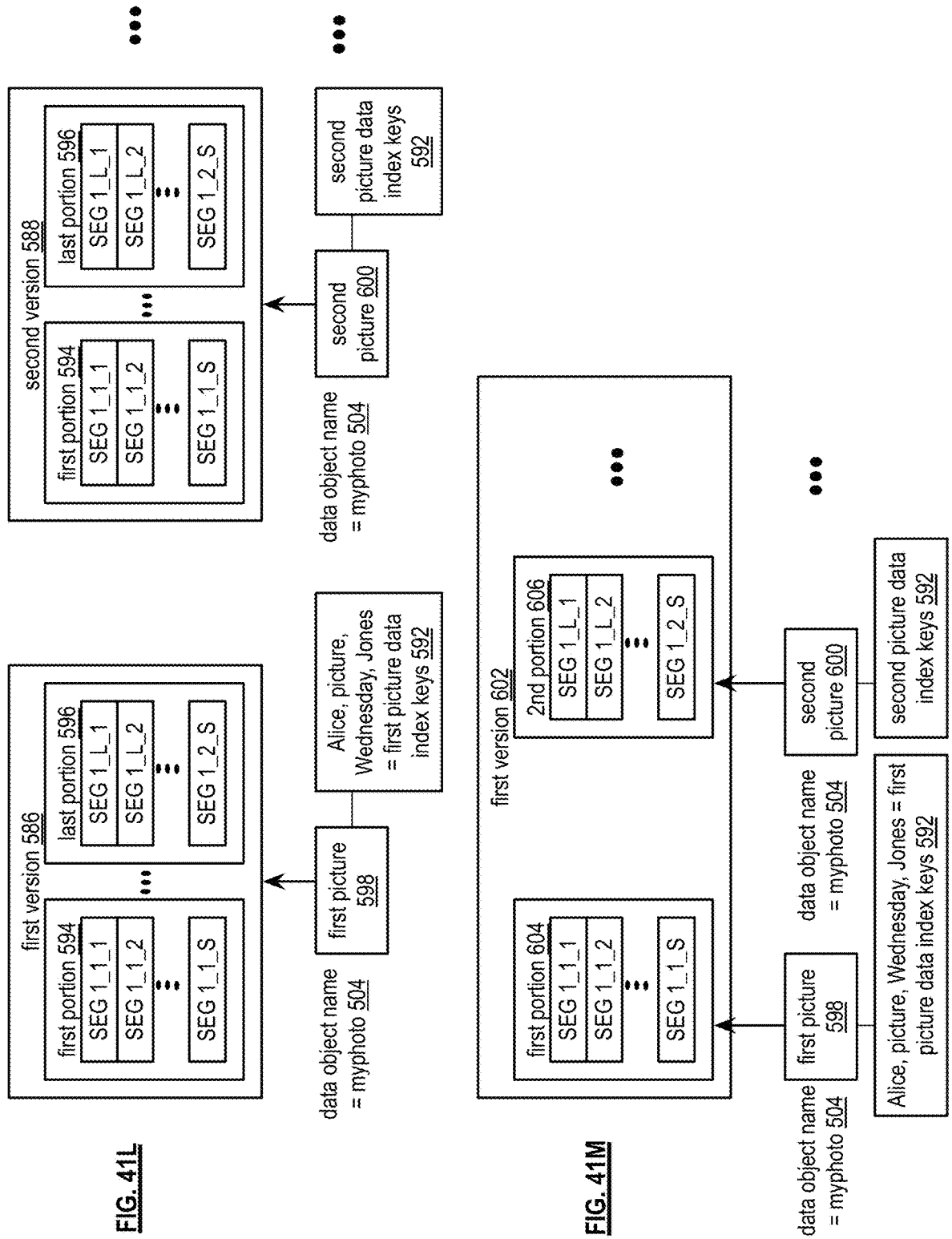

STORING INDEXED DATA TO A DISPERSED STORAGE NETWORK

CROSS REFERENCE TO RELATED PATENTS

This patent application is claiming priority under 35 USC § 119(e) to a provisionally filed patent application entitled UTILIZING METADATA TO ACCESS A DISPERSED STORAGE AND TASK NETWORK, having a provisional filing date of Aug. 31, 2012, and a provisional Ser. No. 61/695,997, which is incorporated herein by reference in its entirety.

This patent application is further claiming priority under 35 USC § 120 as a continuation-in-part patent application of co-pending patent application entitled RETRIEVING DATA UTILIZING A DISTRIBUTED INDEX, having a filing date of Dec. 18, 2012, and a Ser. No. 13/718,961, which is incorporated herein by reference in its entirety, and which claims priority under 35 USC § 119(e) to a provisionally filed patent application entitled INDEXING IN A DISTRIBUTED STORAGE AND TASK NETWORK, having a provisional filing date of Jan. 31, 2012 and a provisional Ser. No. 61/593,116, which is incorporated herein by reference in its entirety.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work station, video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 40A:
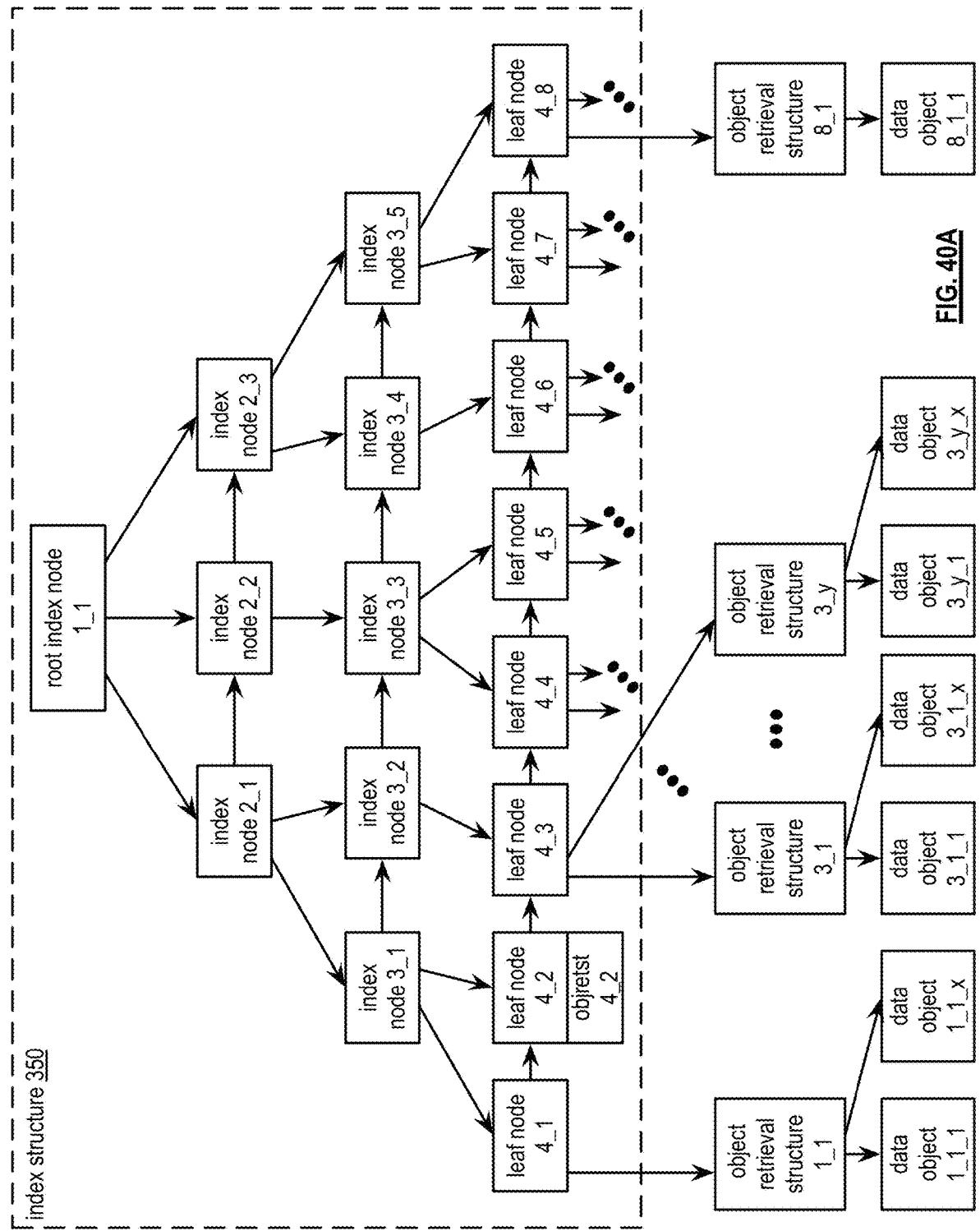
FIG. 40A is a diagram illustrating an example of an index structure in accordance with the present invention.
Figure 40B:
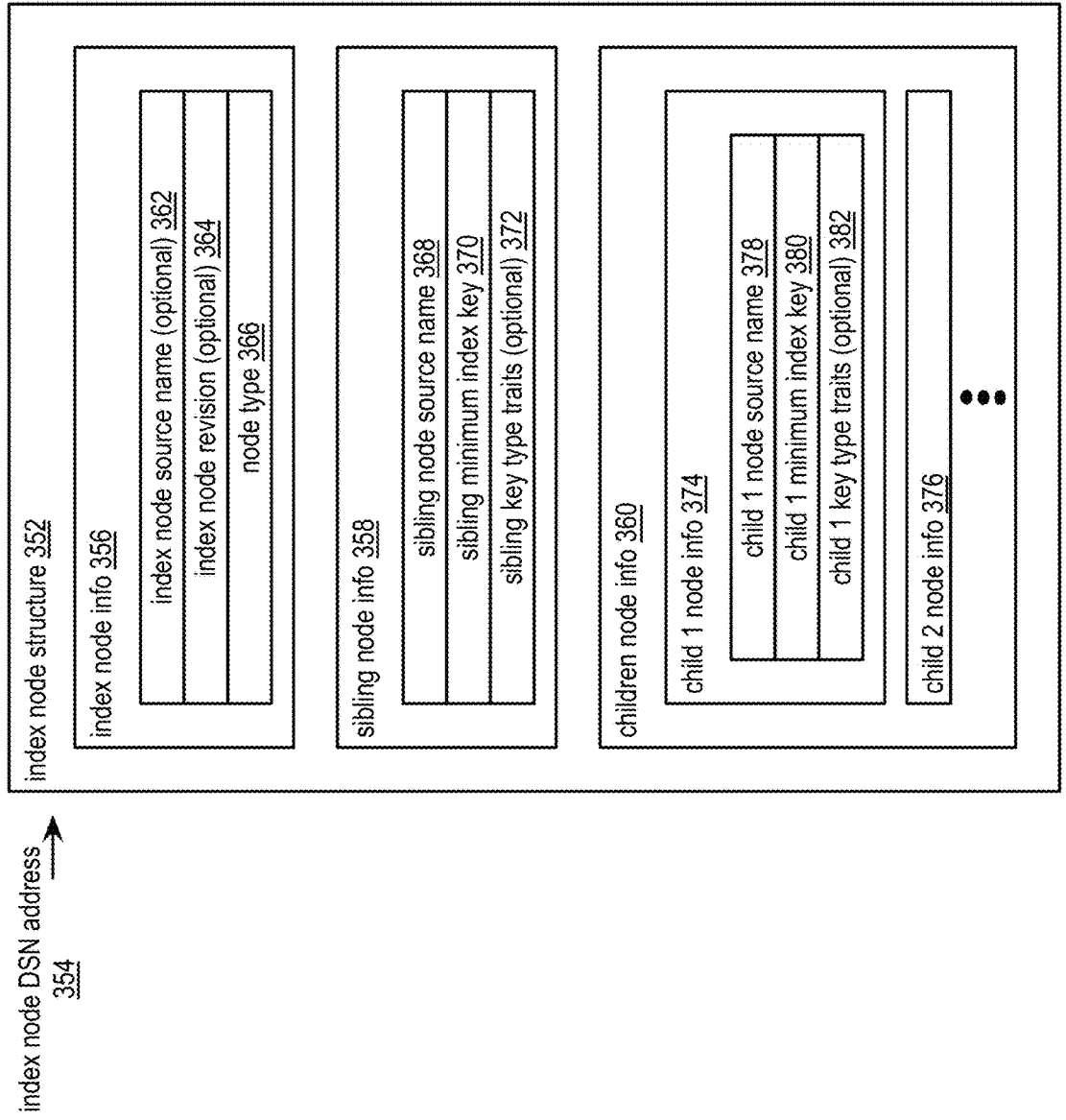
FIG. 40B is a diagram illustrating an example of an index node structure in accordance with the present invention.
Figure 40C:
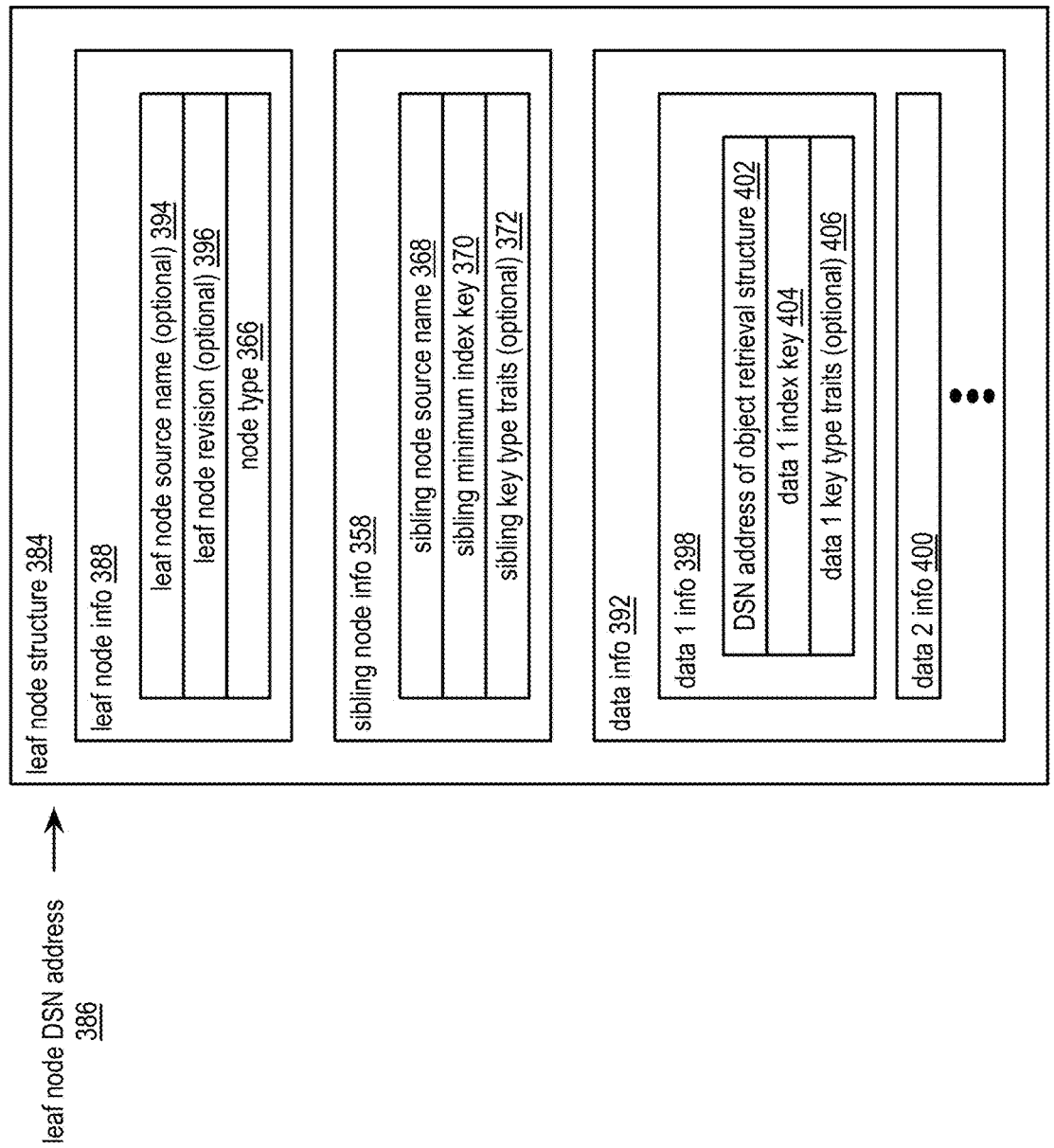
FIG. 40C is a diagram illustrating an example of a leaf node structure in accordance with the present invention.
Figure 40D:
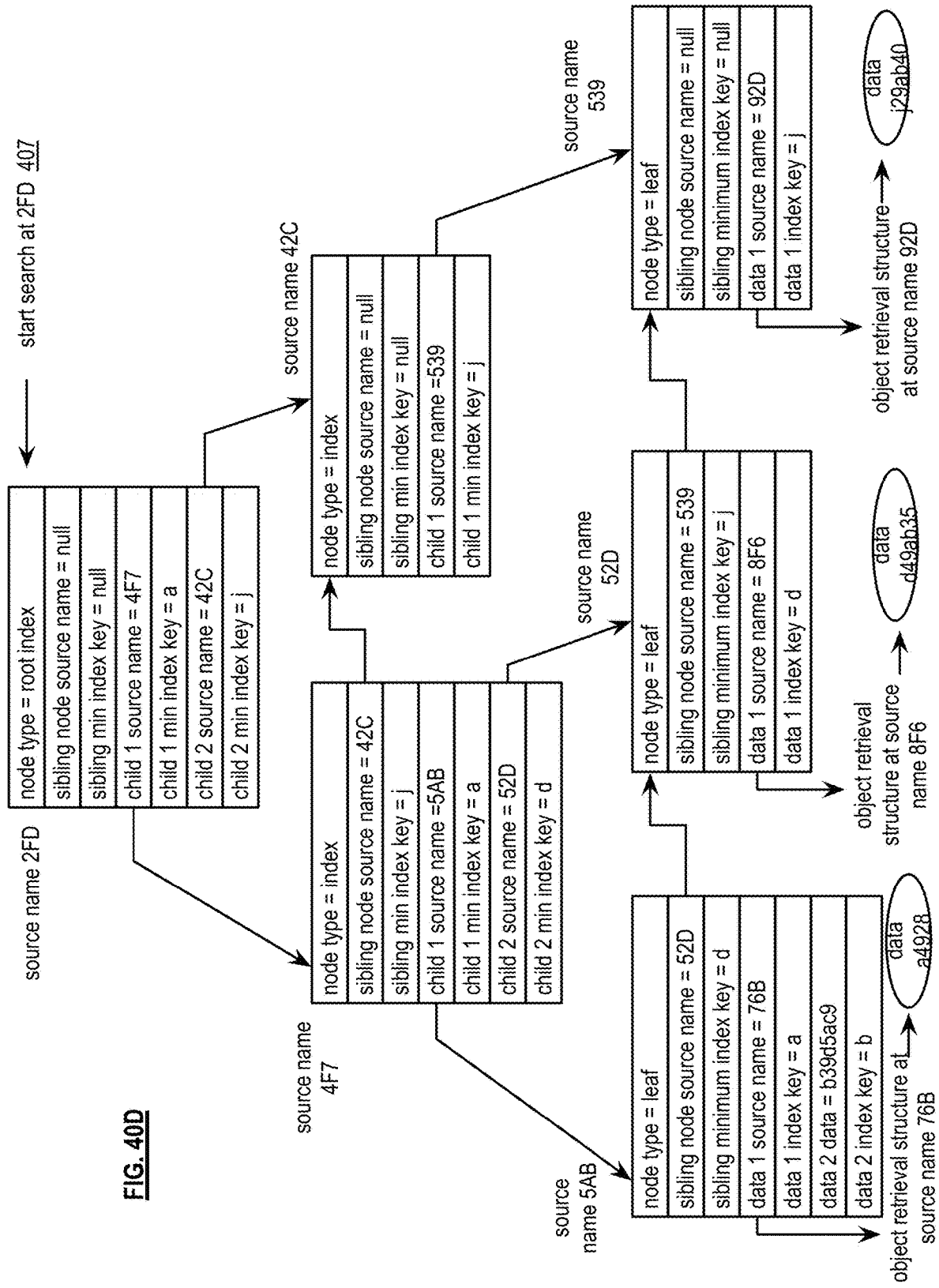
FIG. 40D is a diagram illustrating another example of an index structure in accordance with the present invention.
Figure 40F:
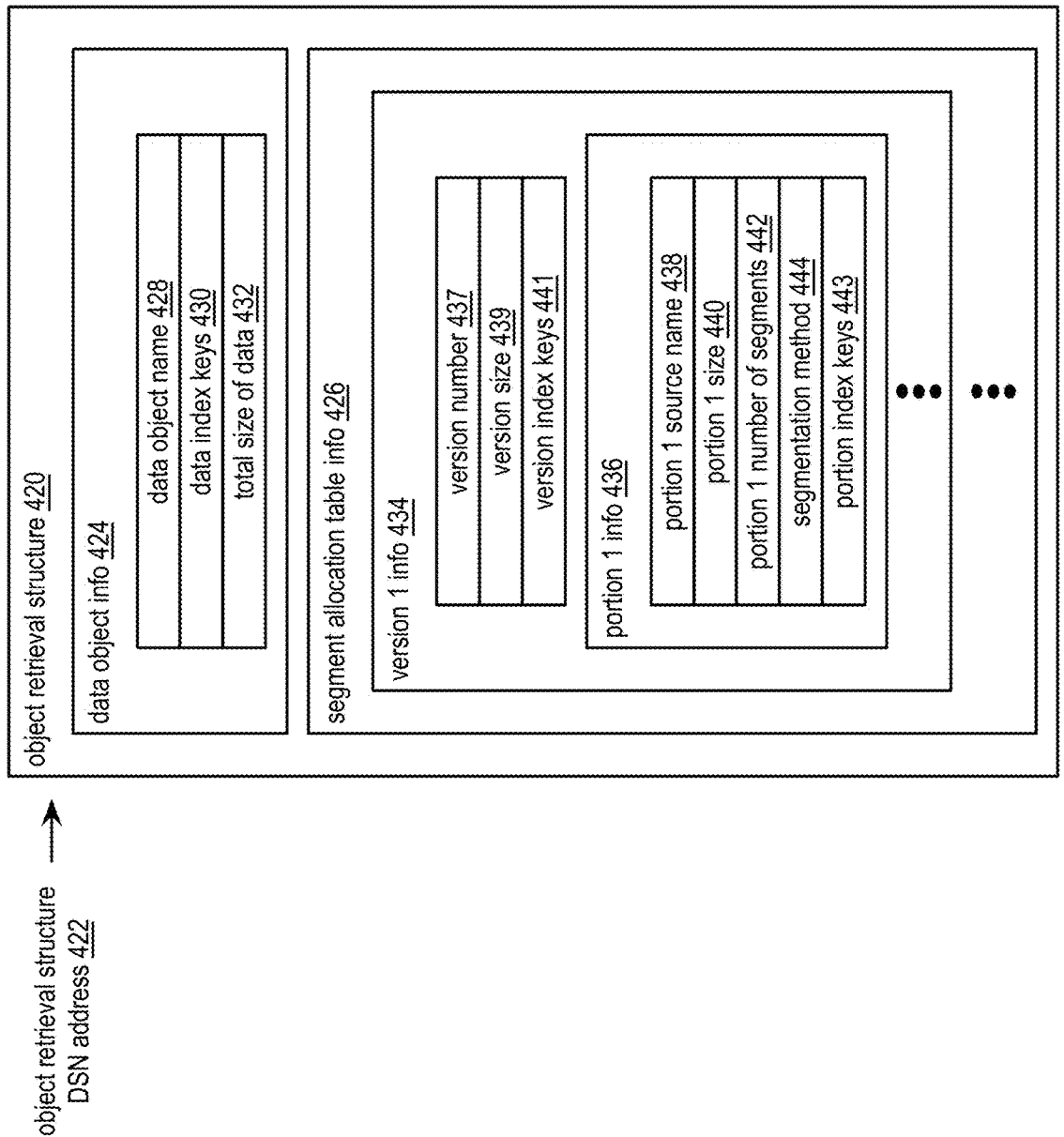
FIG. 40F is a diagram illustrating an example of an object retrieval structure in accordance with the present invention.
Figure 40G:
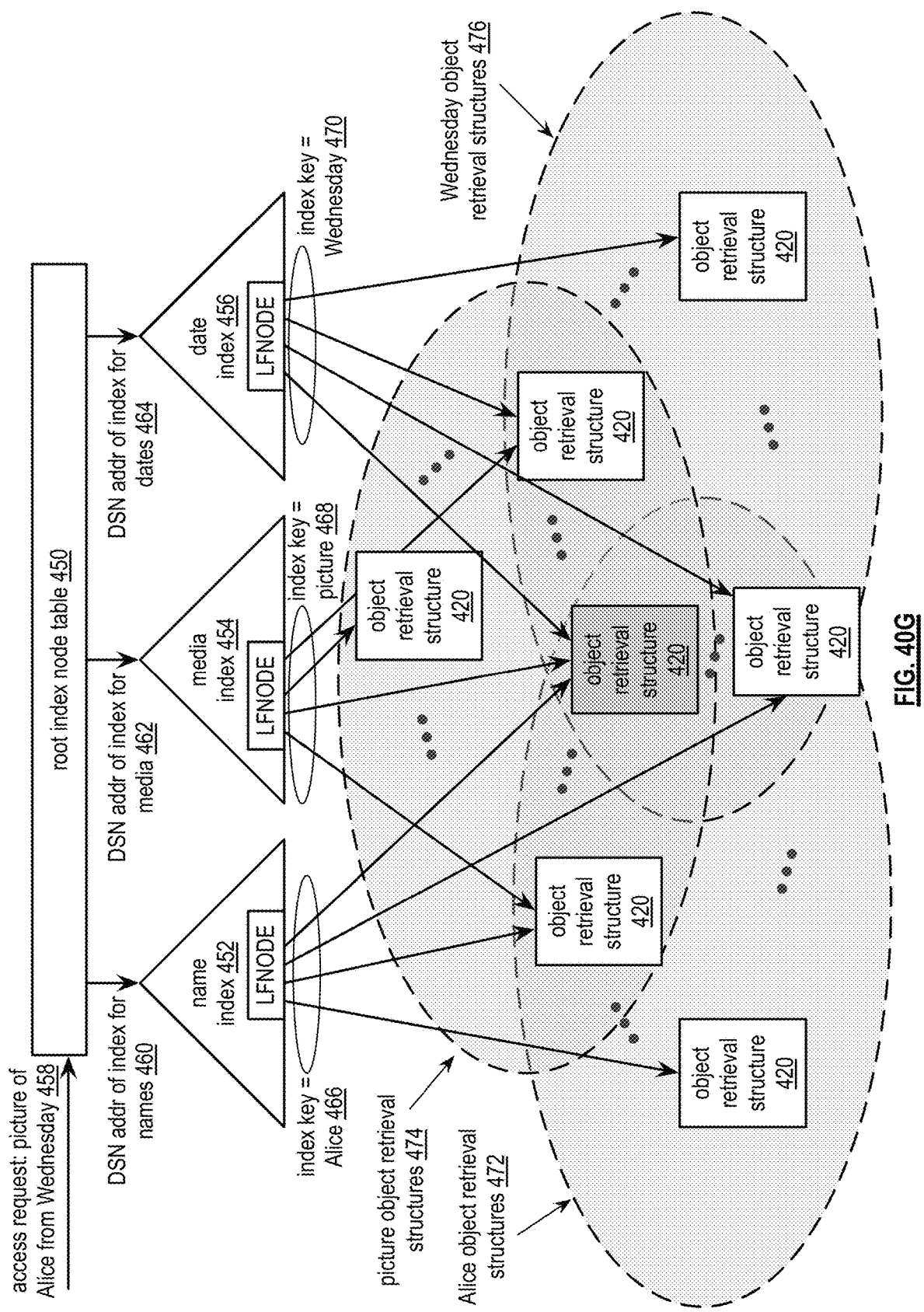
FIG. 40G is a diagram illustrating an example of multiple index structures in accordance with the present invention.
Figure 40H:
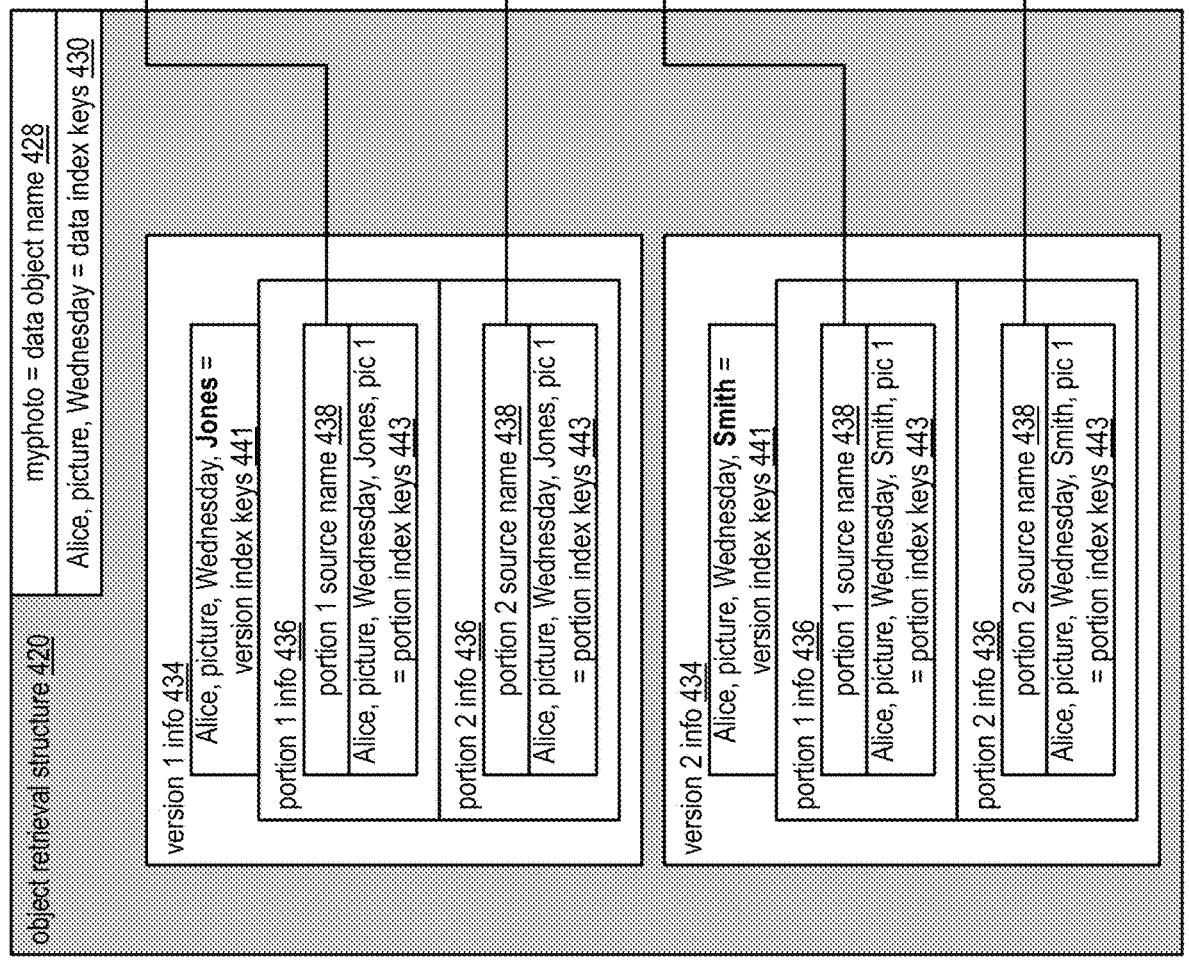
FIG. 40E is a diagram illustrating another example of an index structure in accordance with the present invention.
Figure 40I:
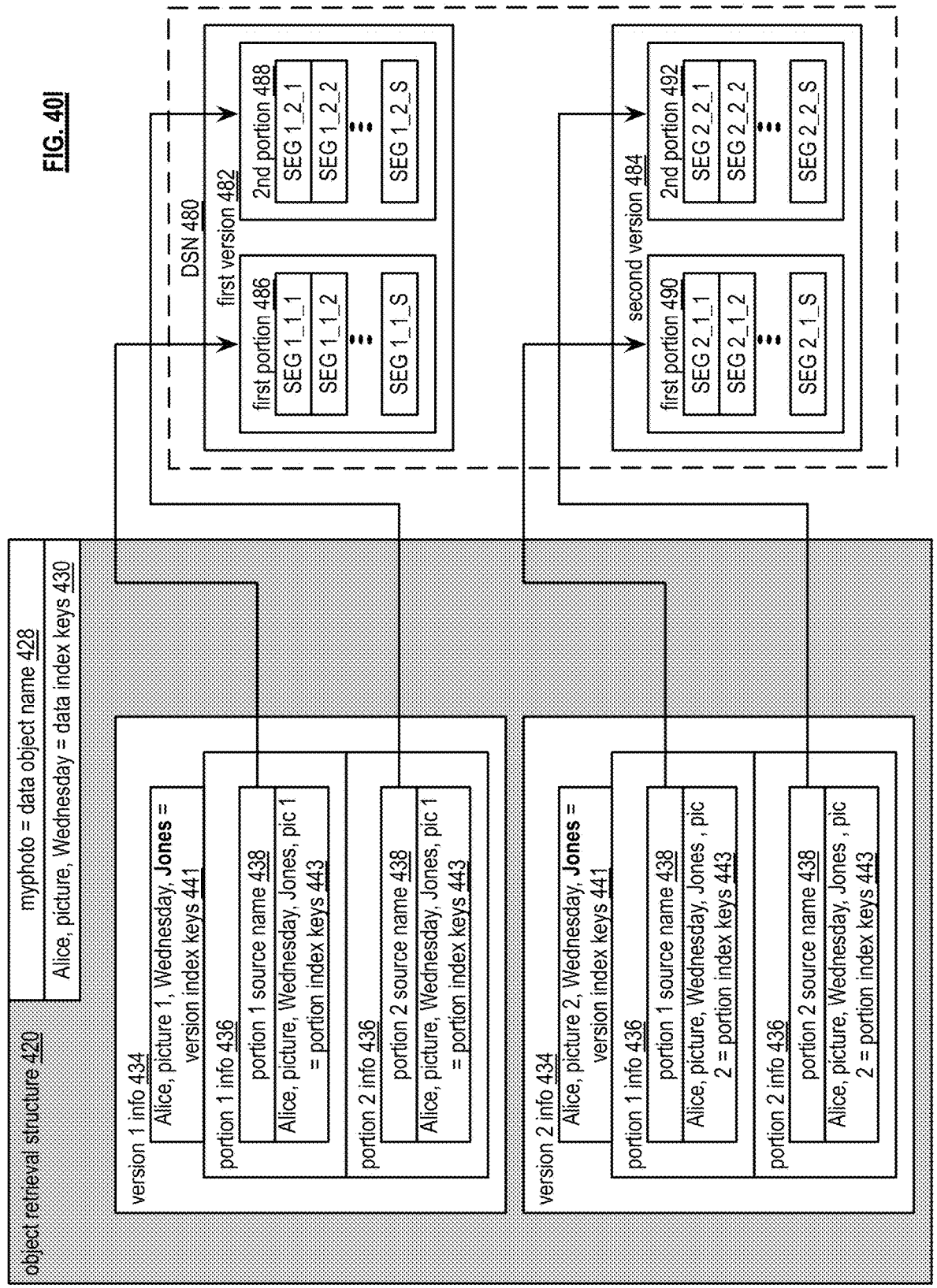
Figure 40J:
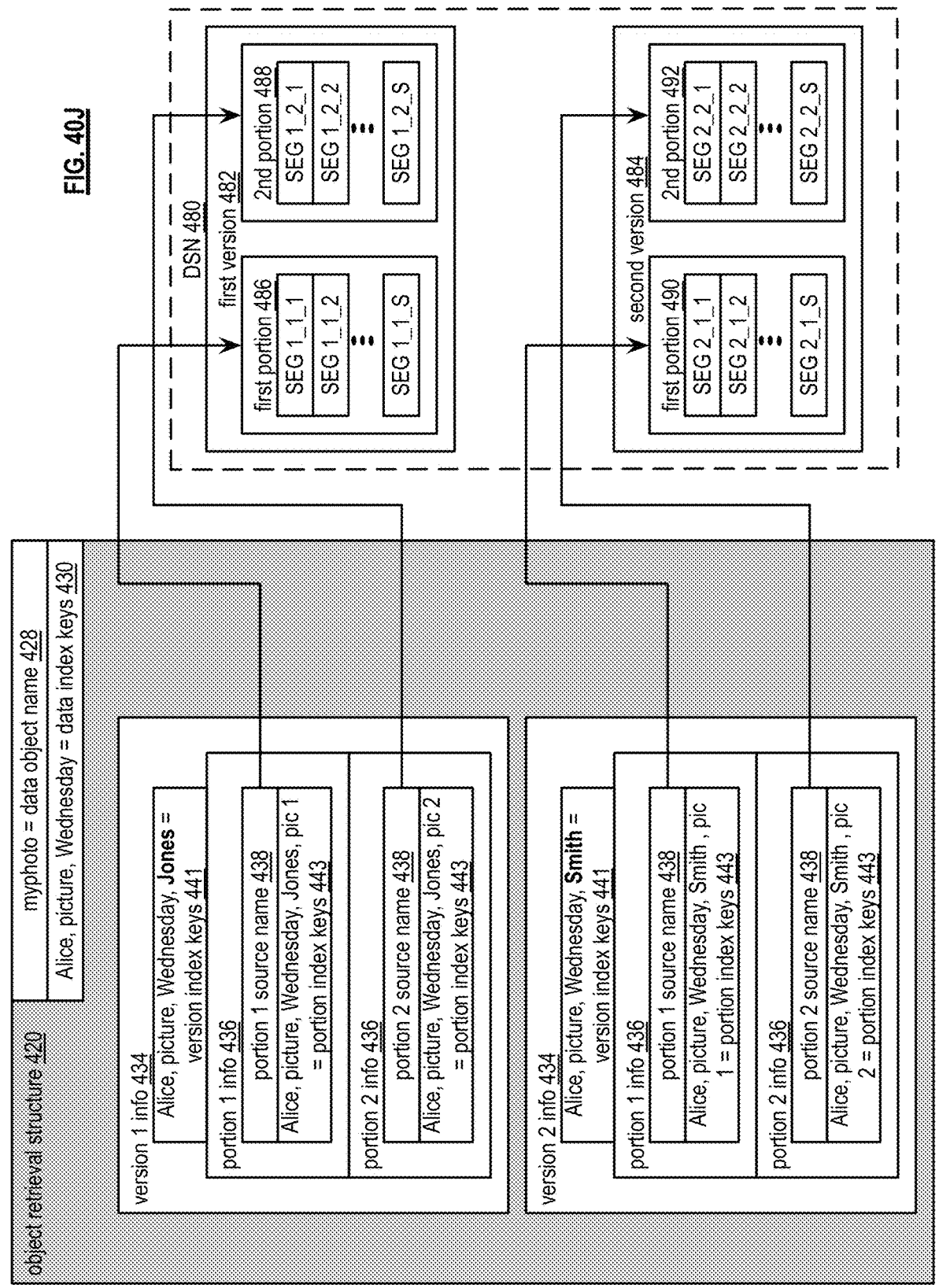
Figure 40K:
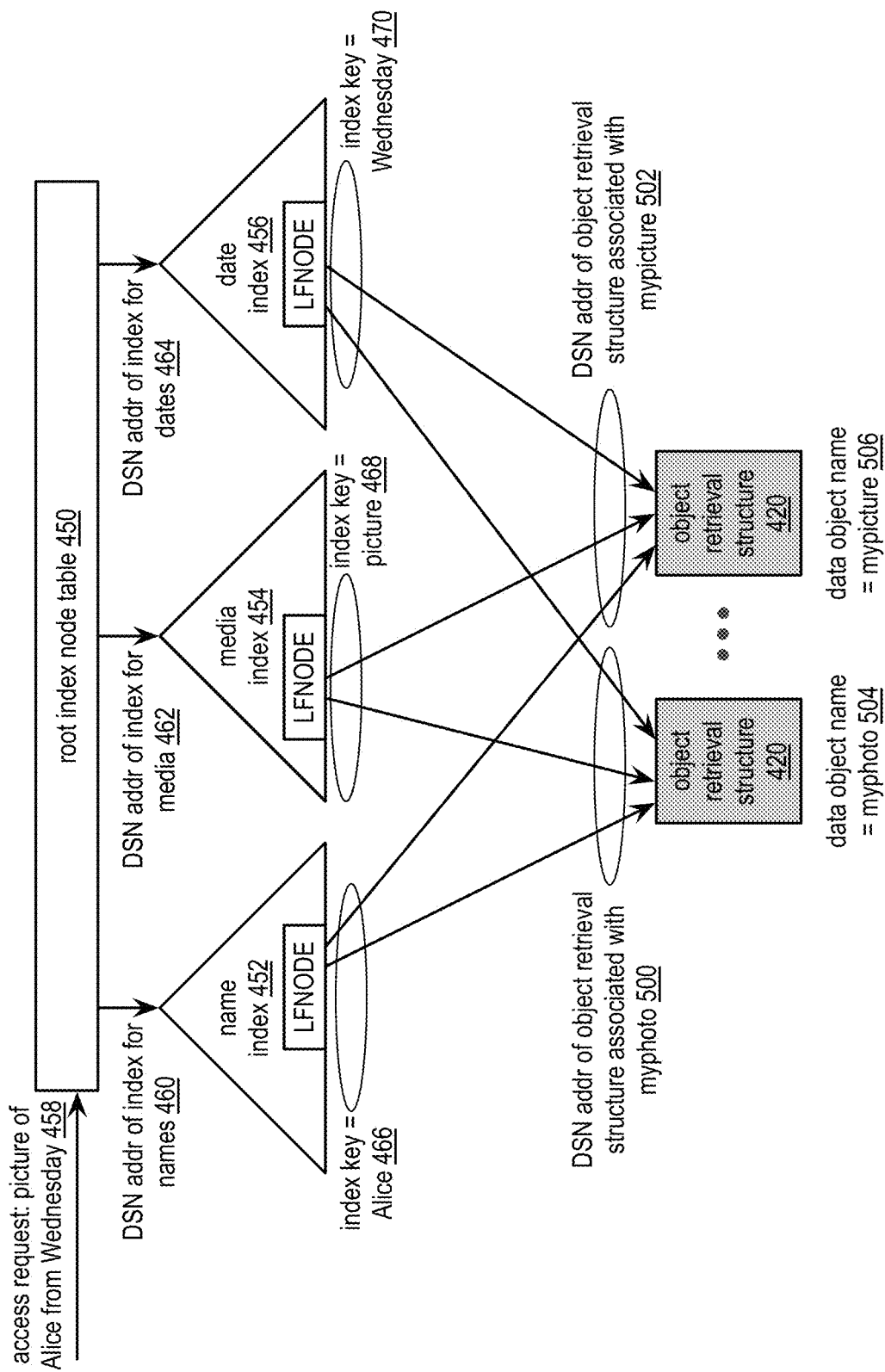
Figure 40L:
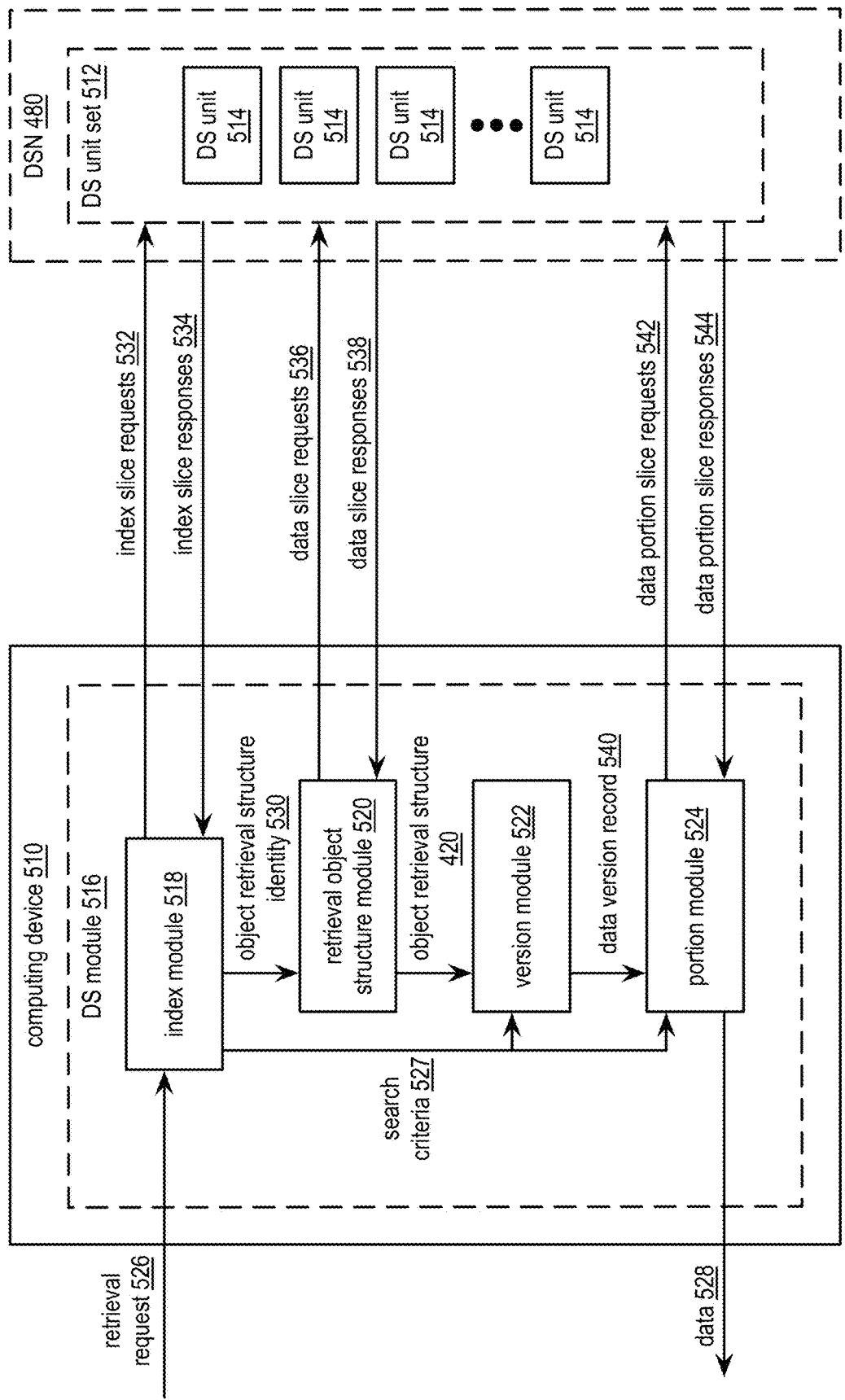
Figure 40M:
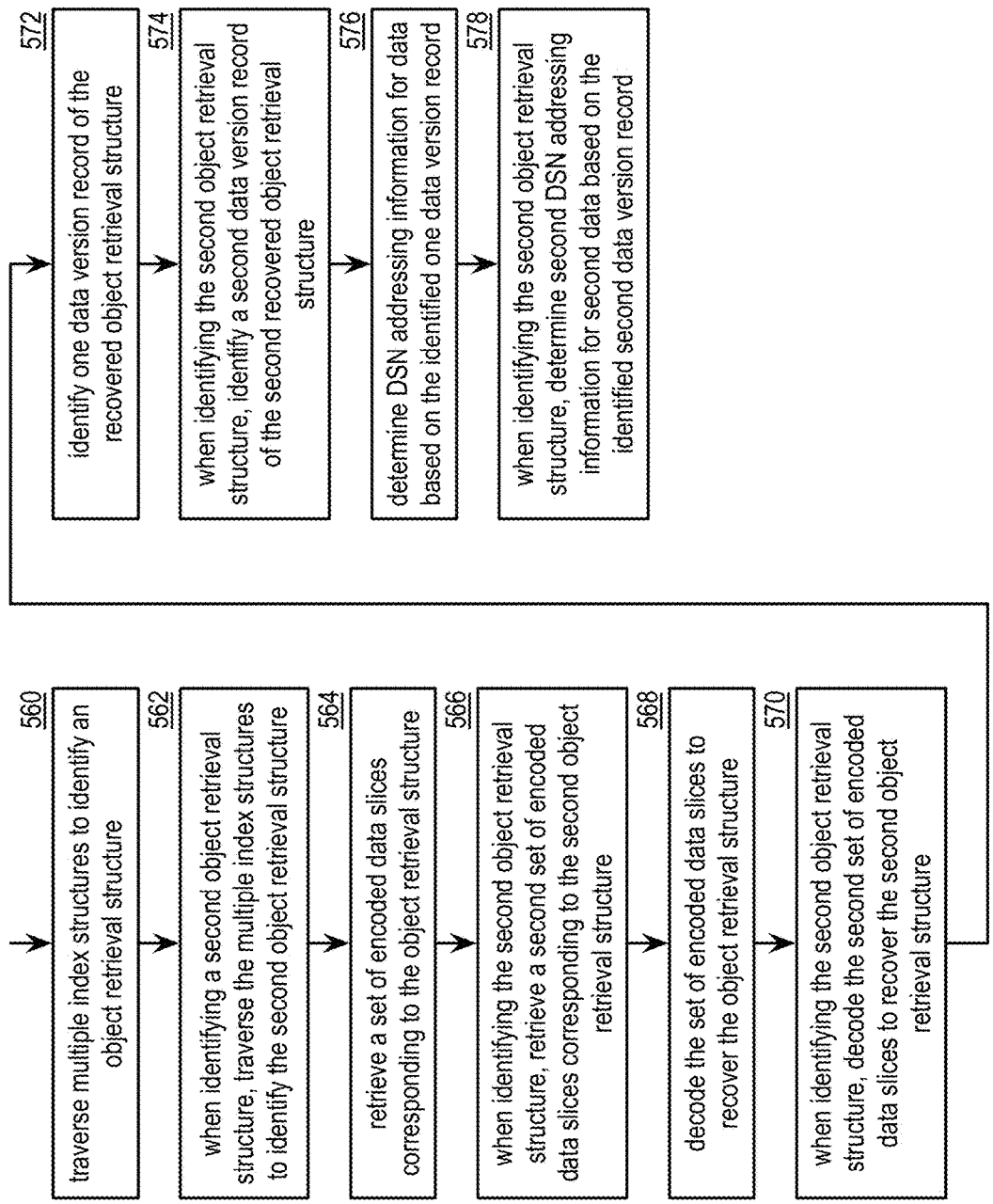
Figure 41A:
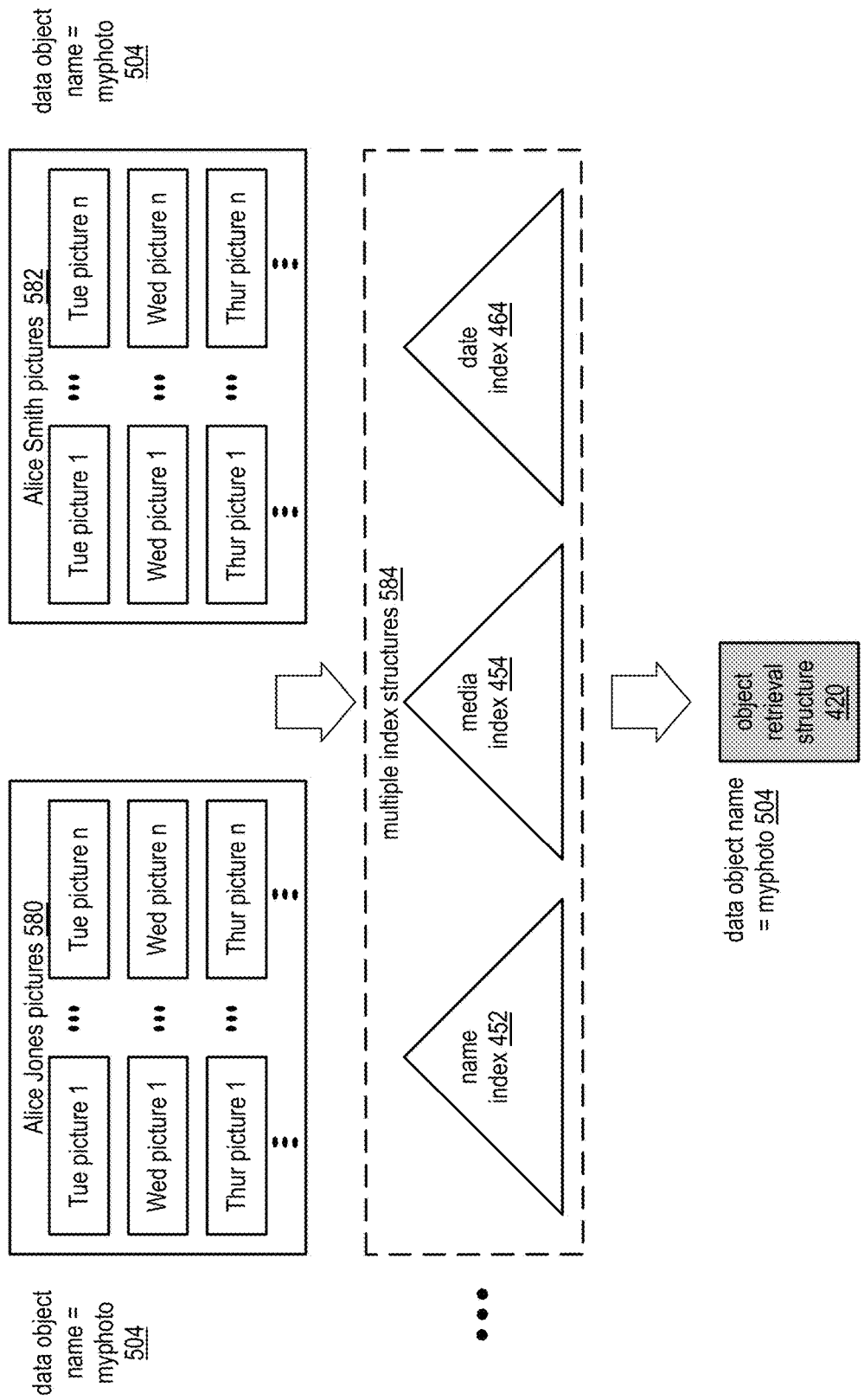
Figure 41B:
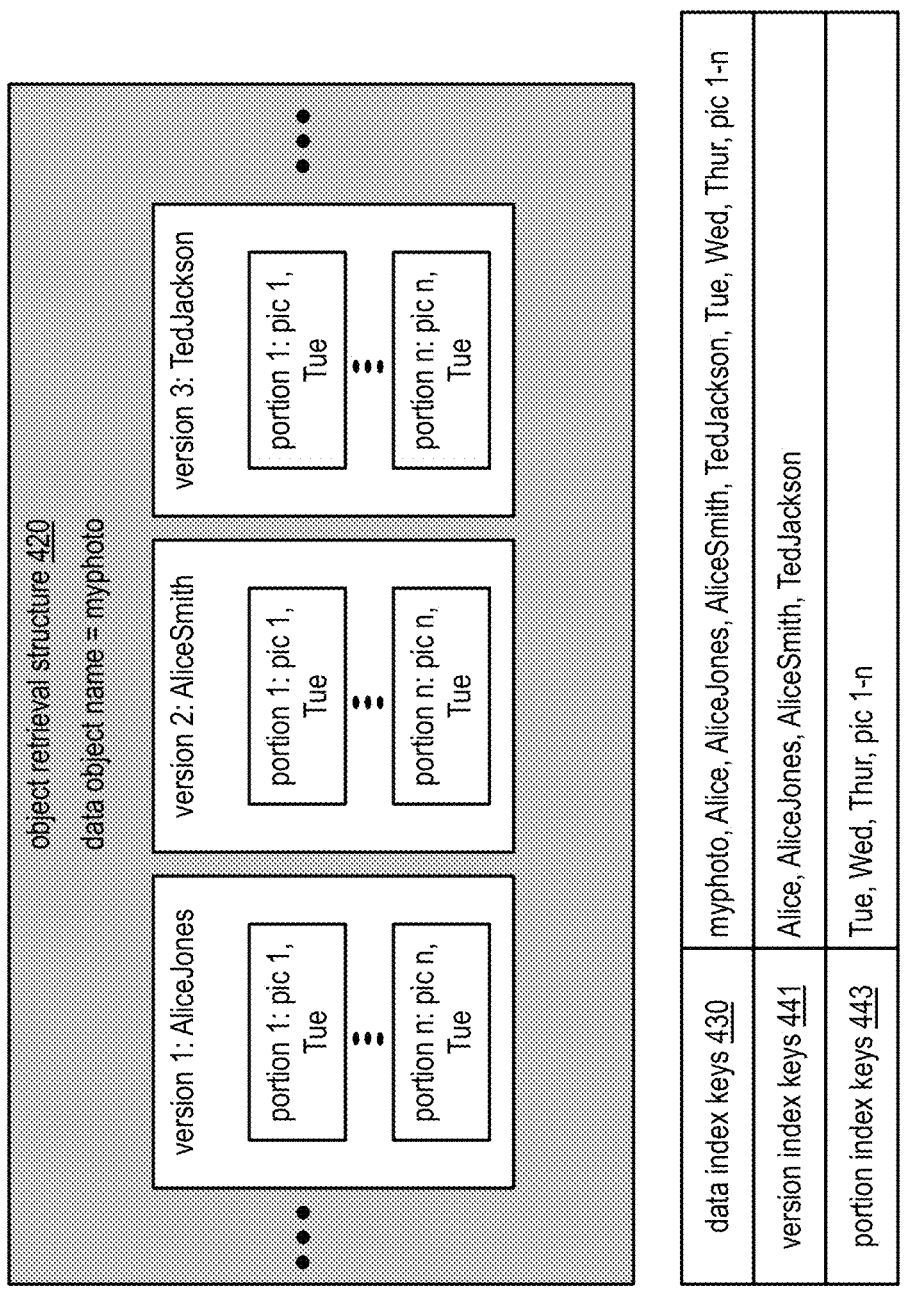
Figure 41C:
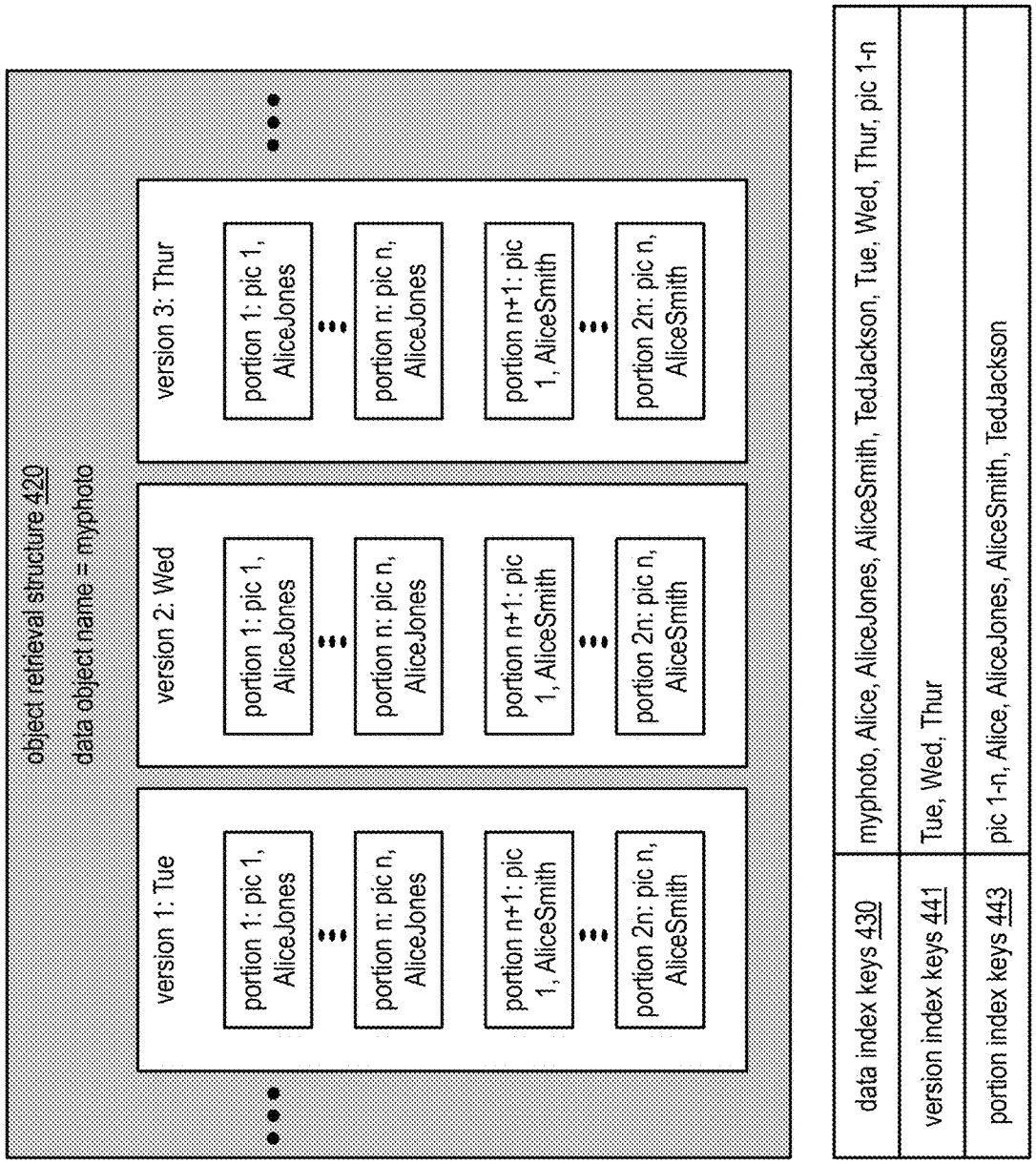
Figure 41D:
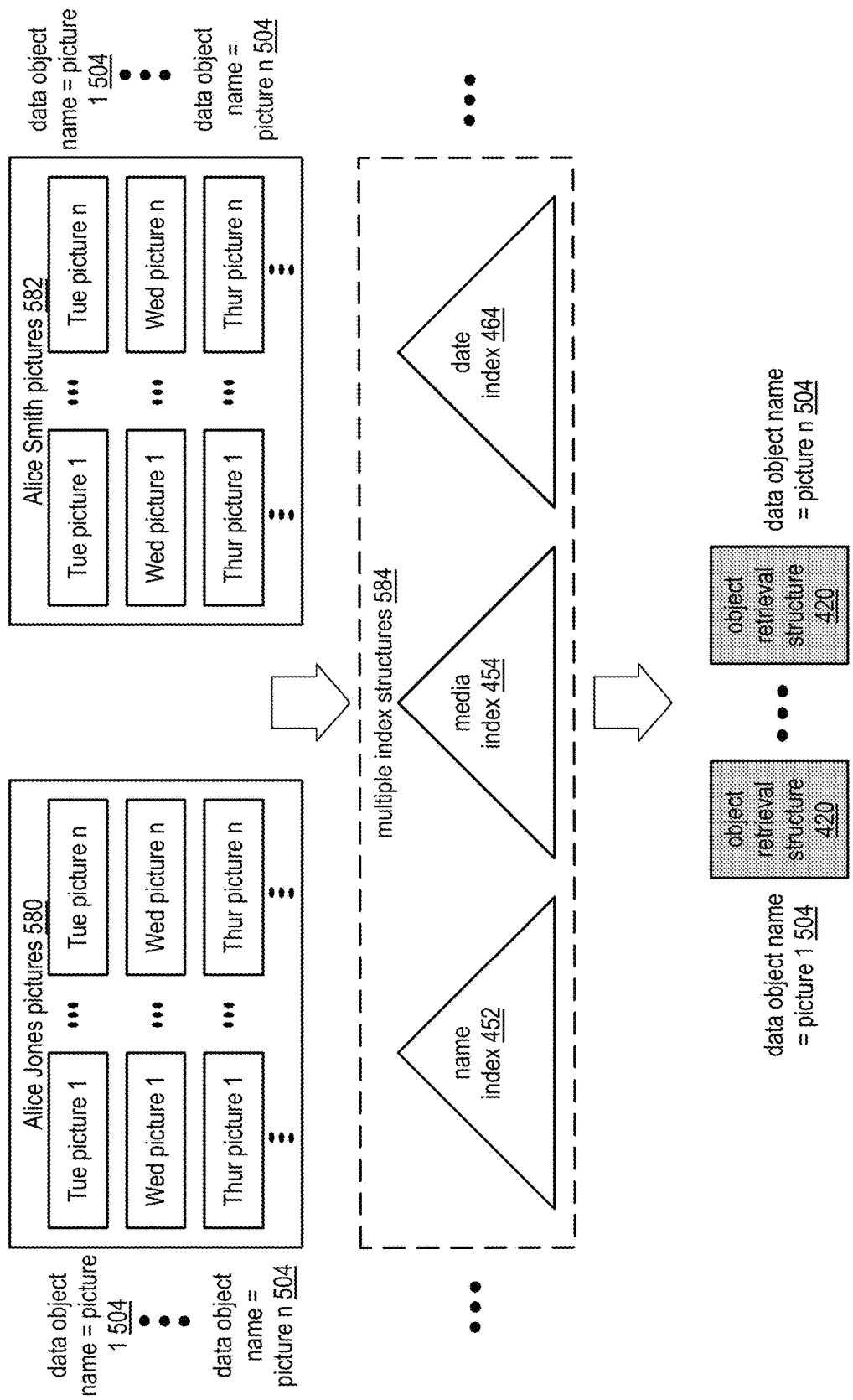
Figure 41E:
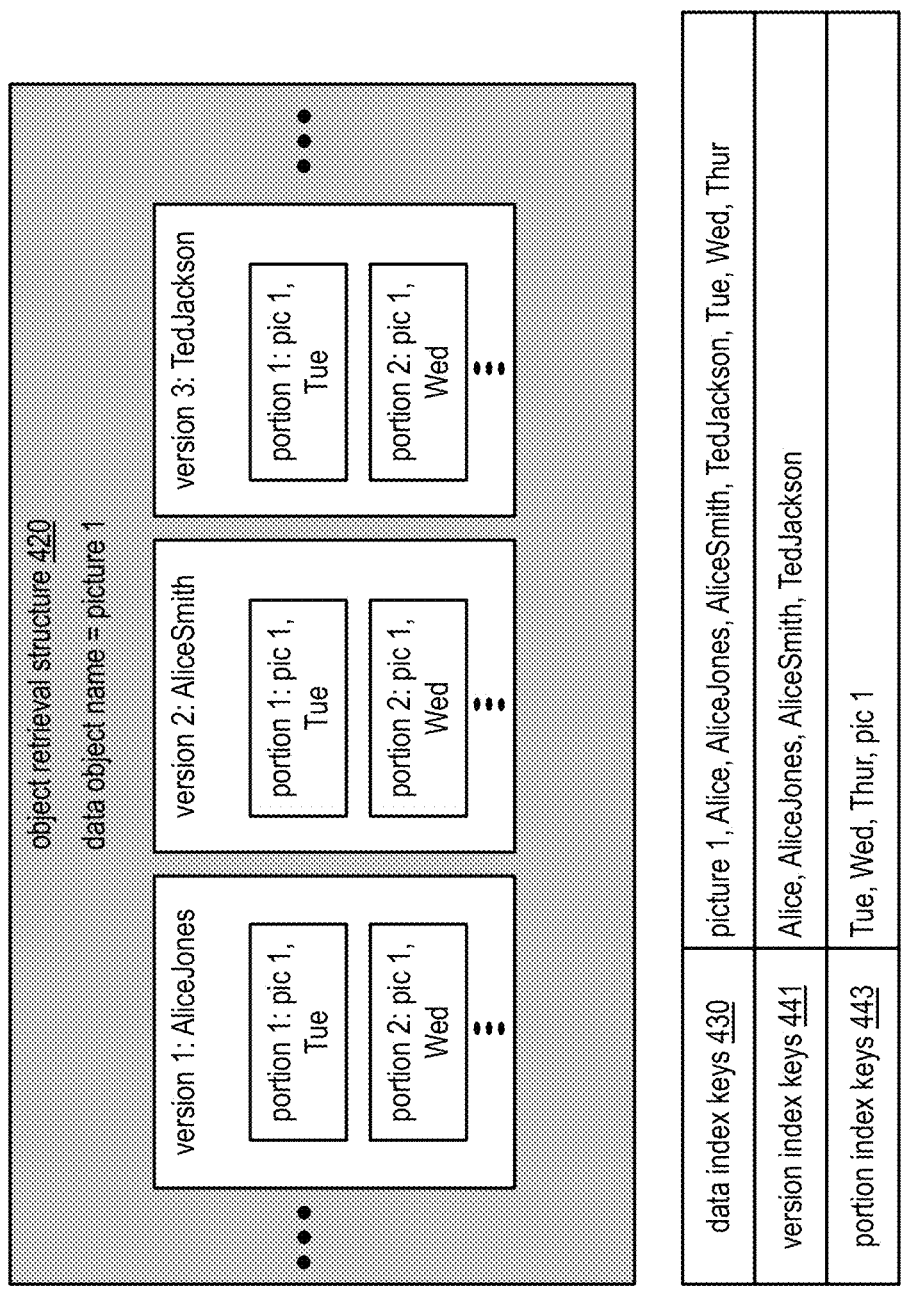
Figure 41F:
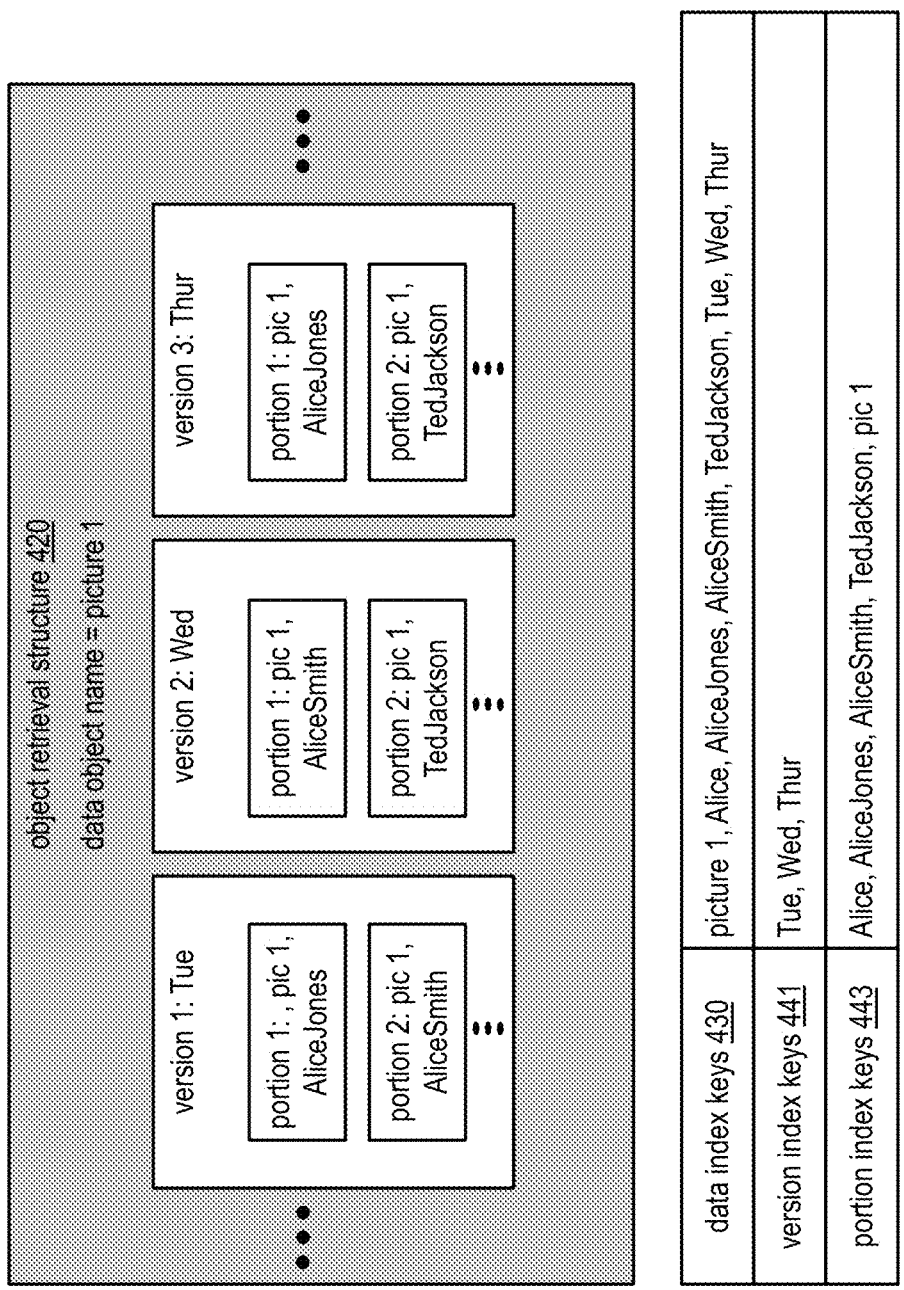
Figure 41G:
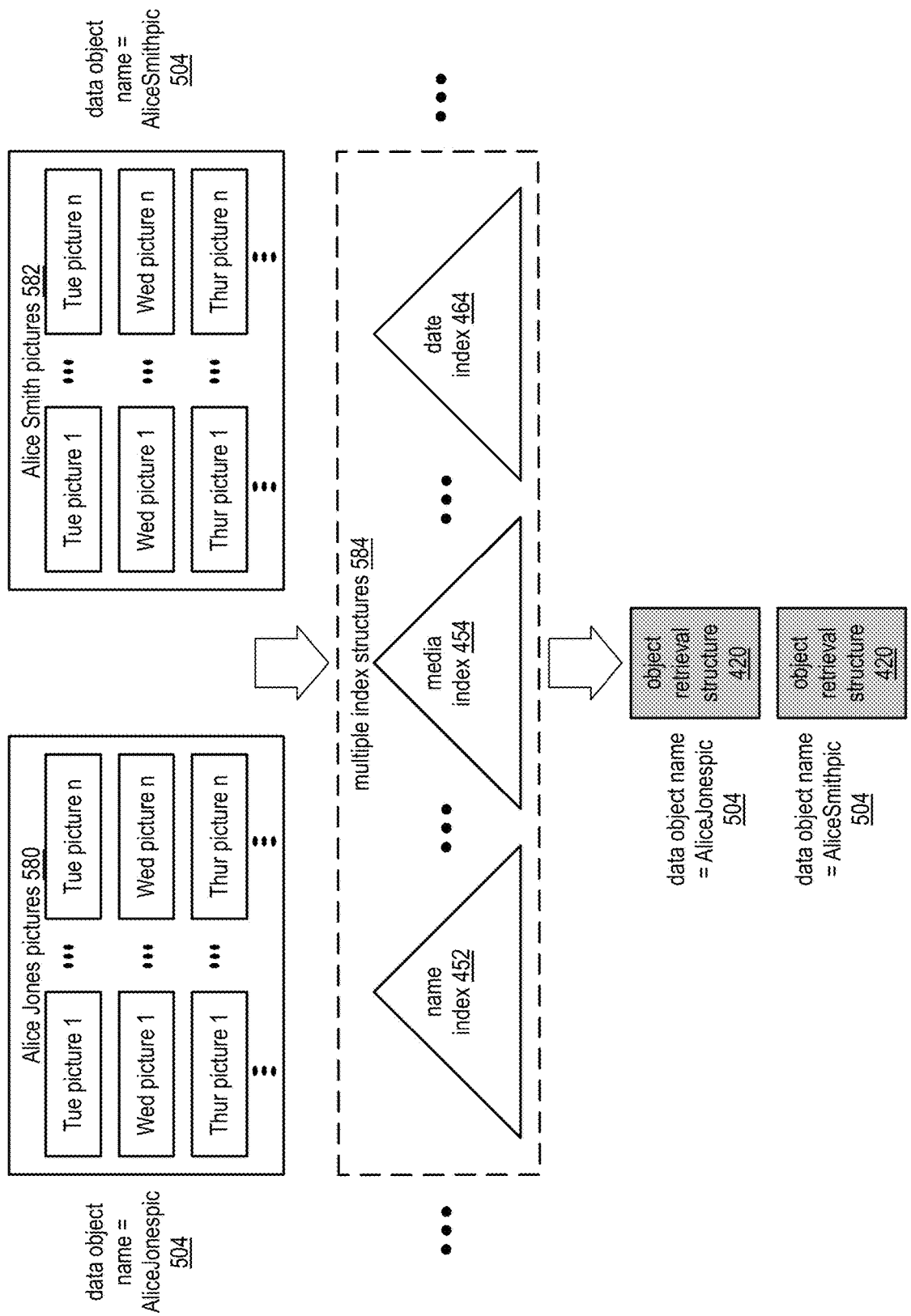
Figure 41H:
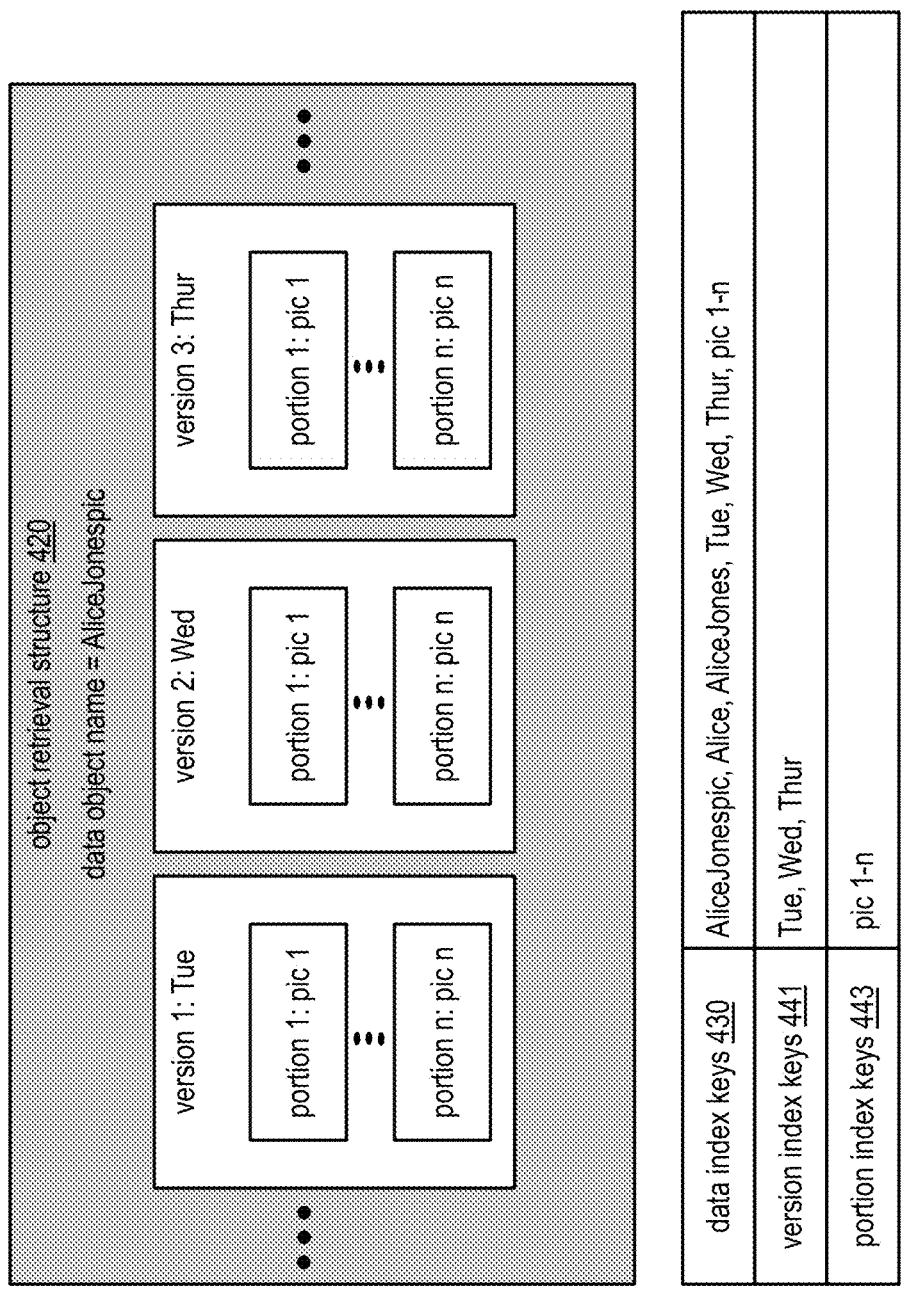
Figure 41I:
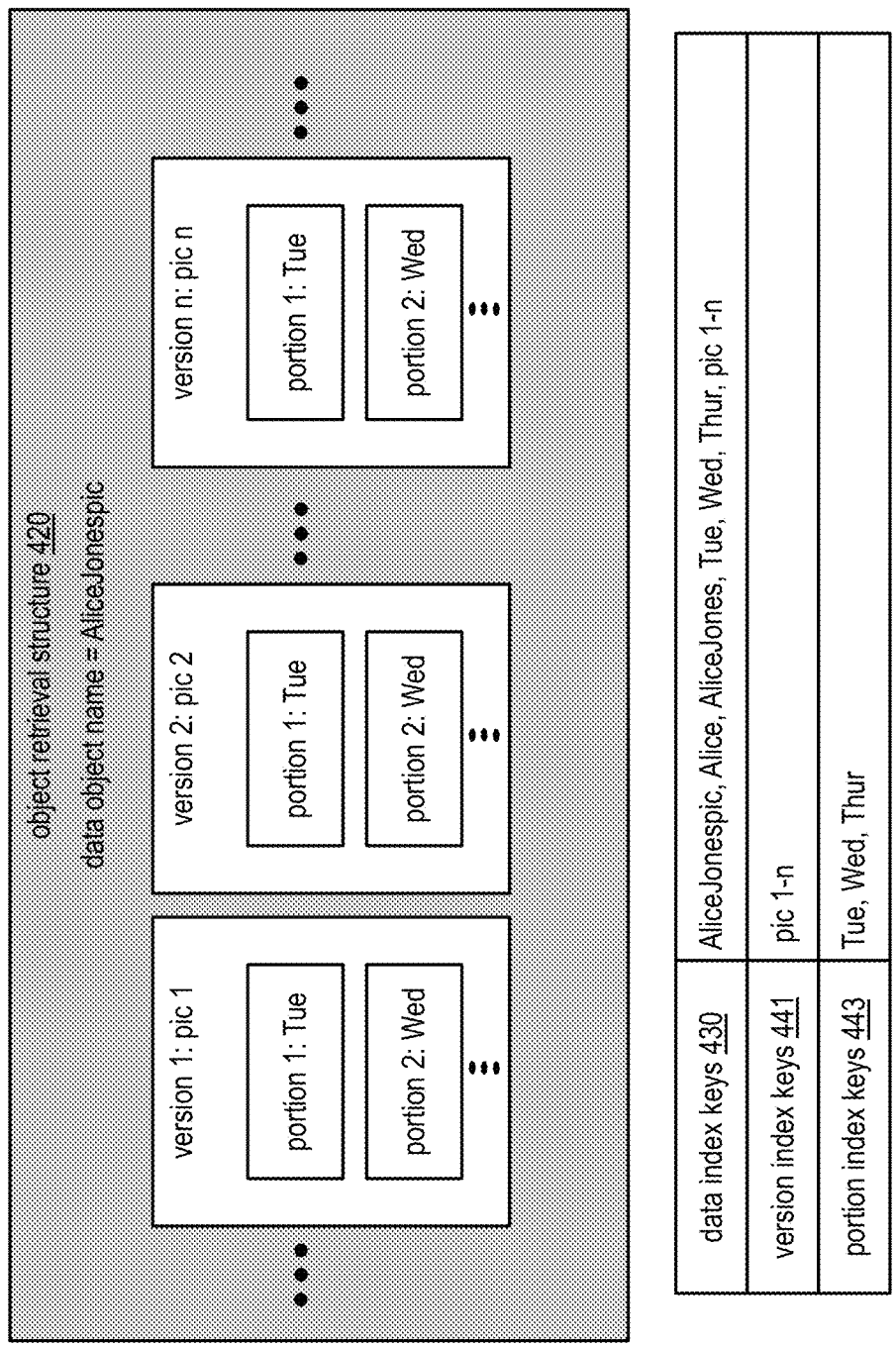
Figure 41J:
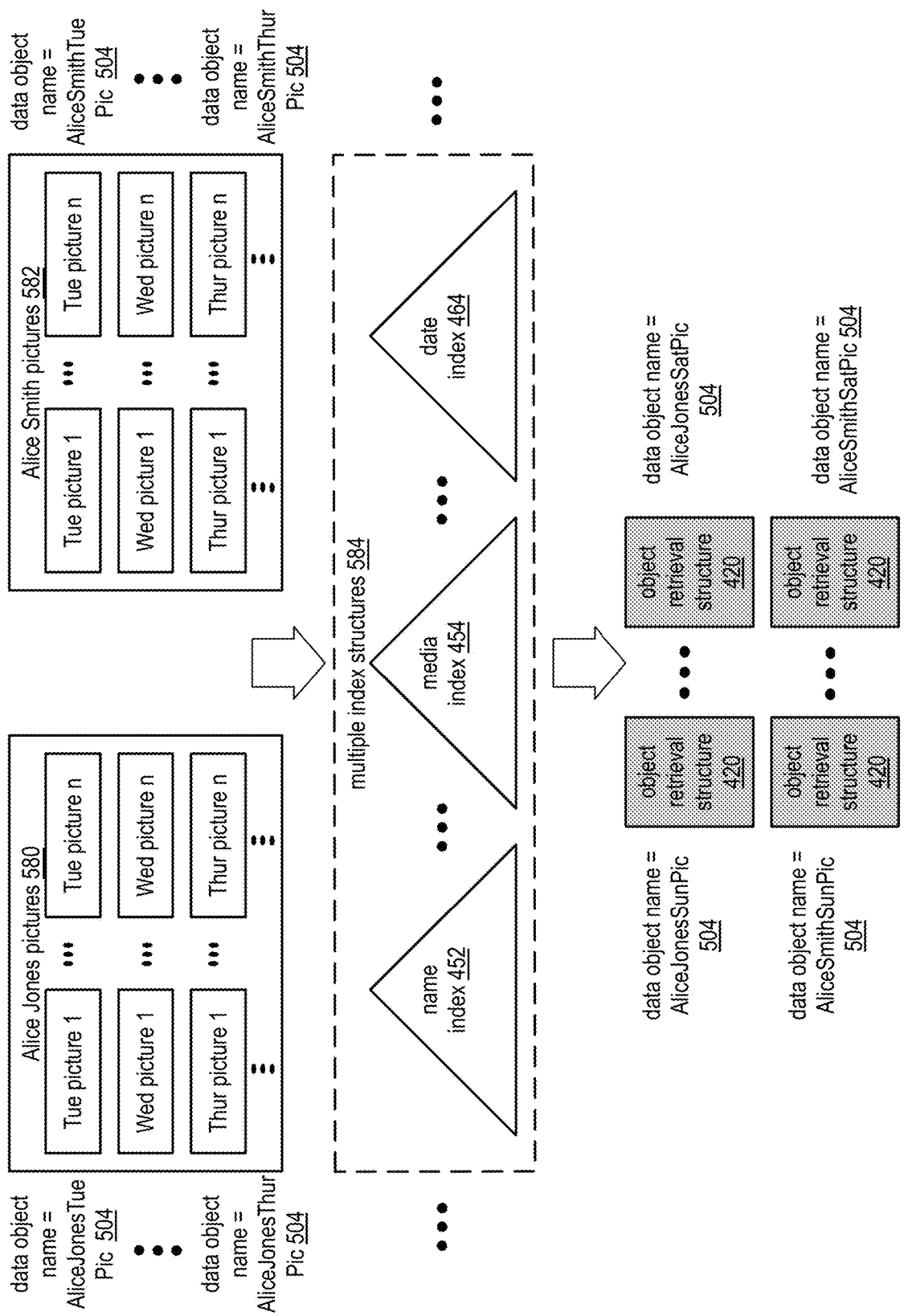
Figure 41K:
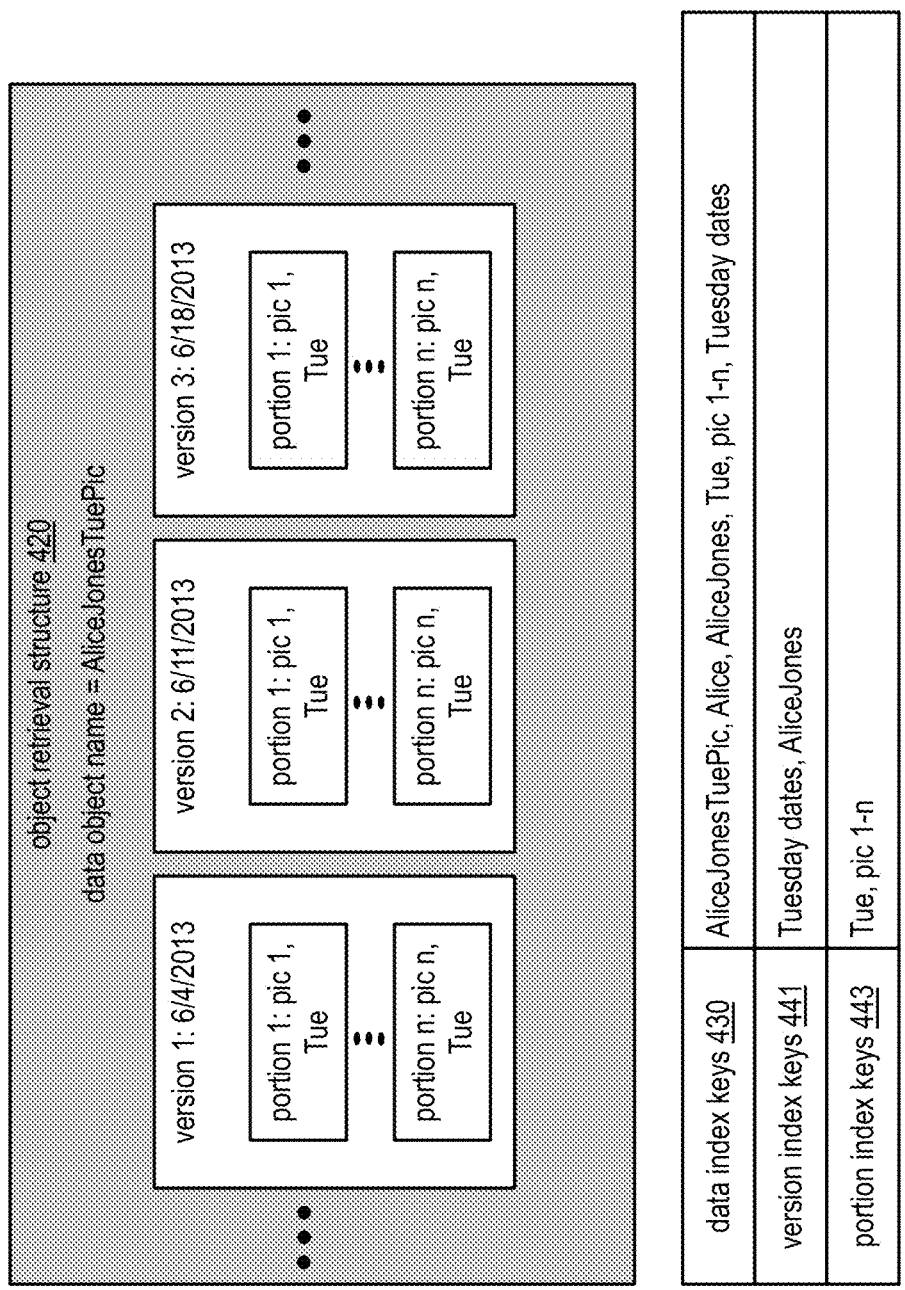
Figure 41N:
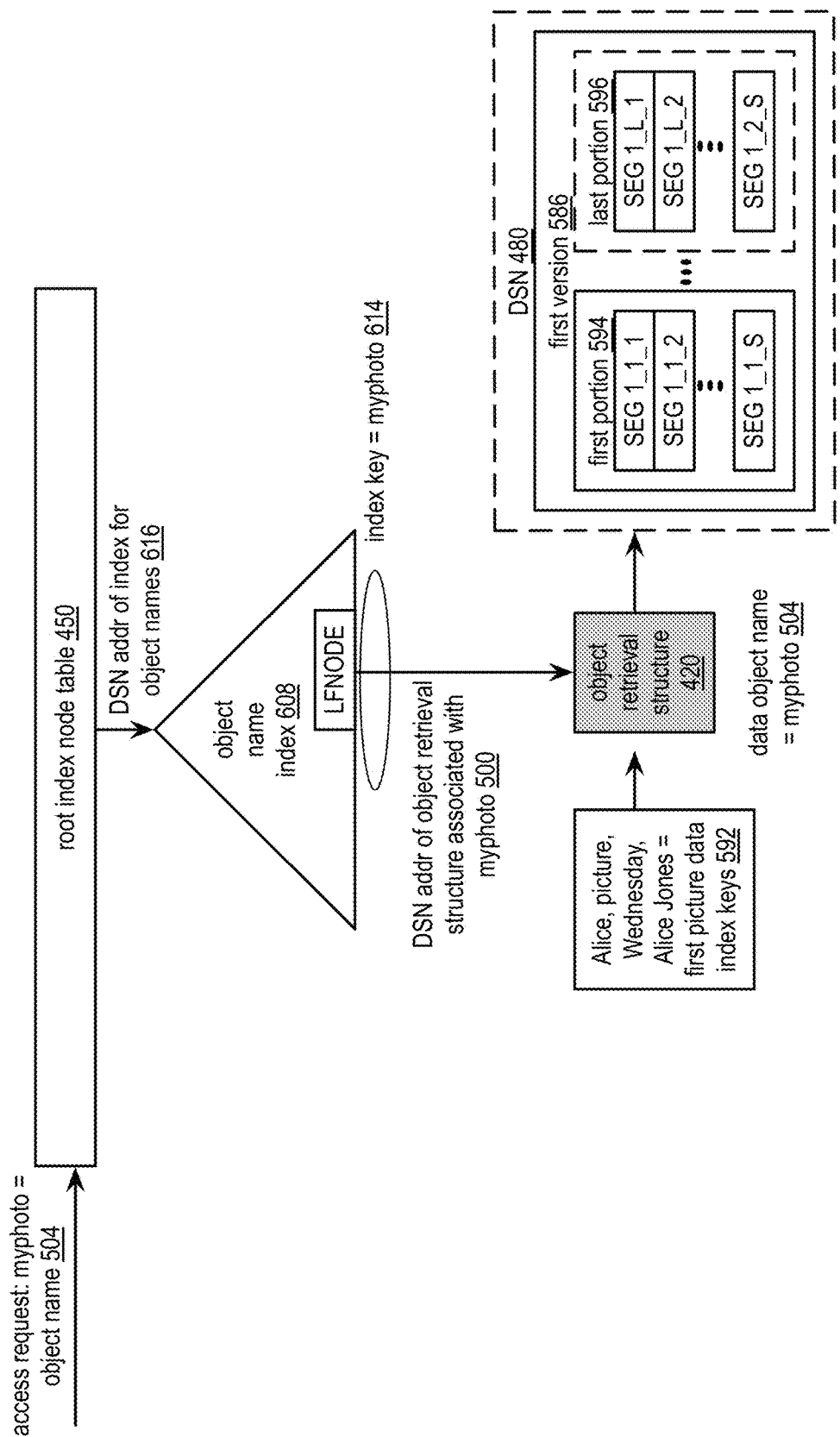
Figure 41P:
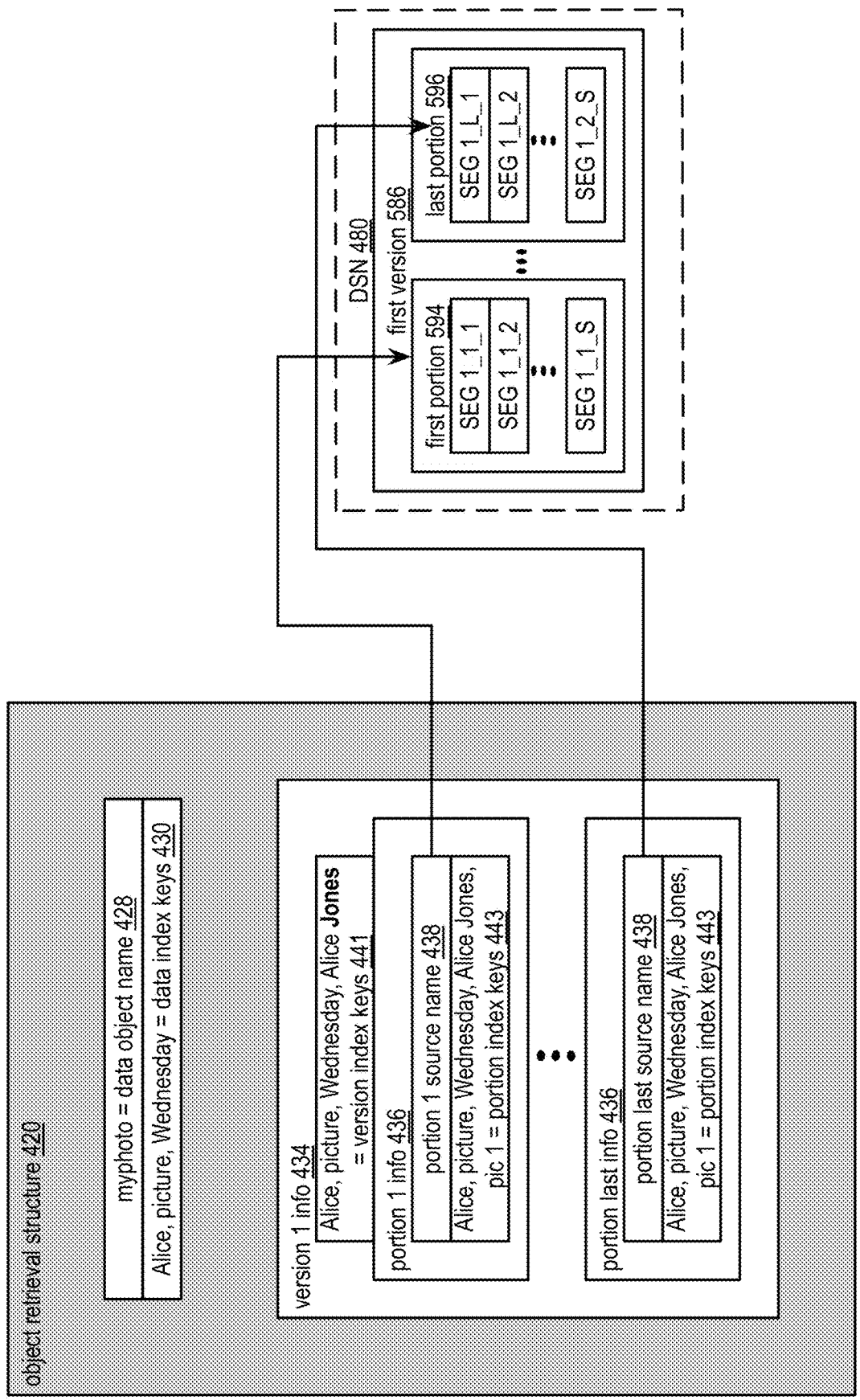
Figure 41Q:
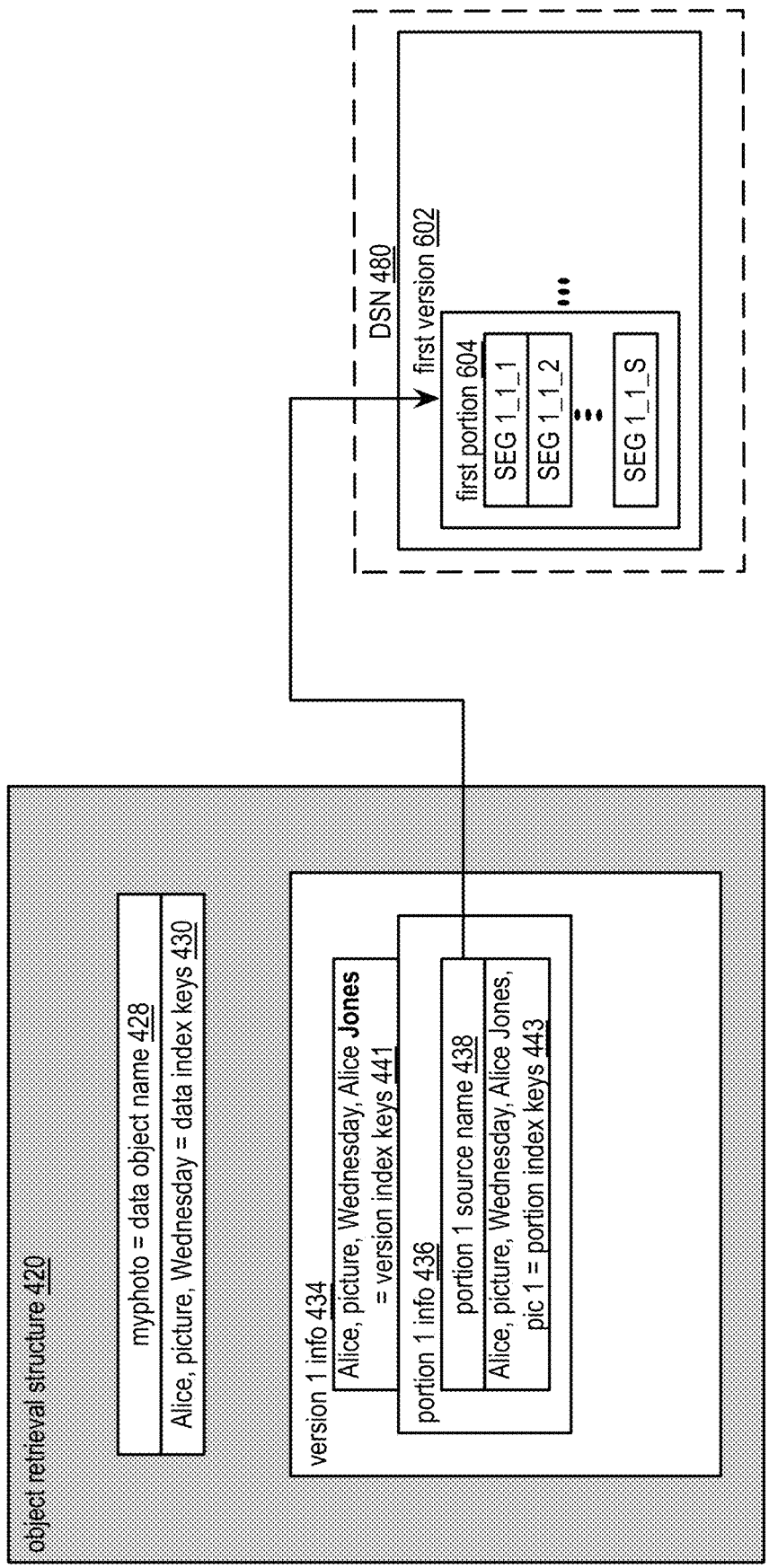
Figure 41R:
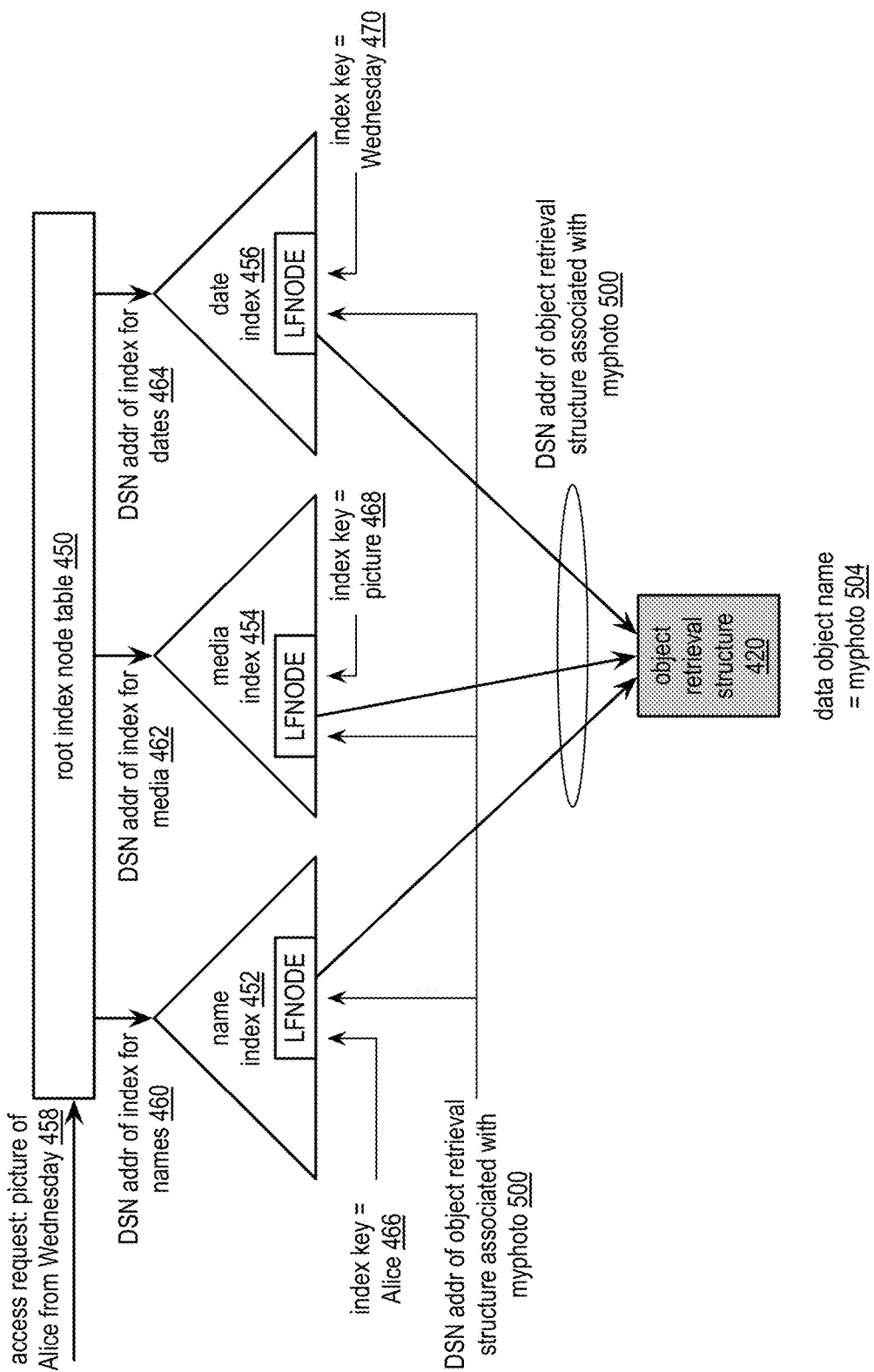
Figure 41S:
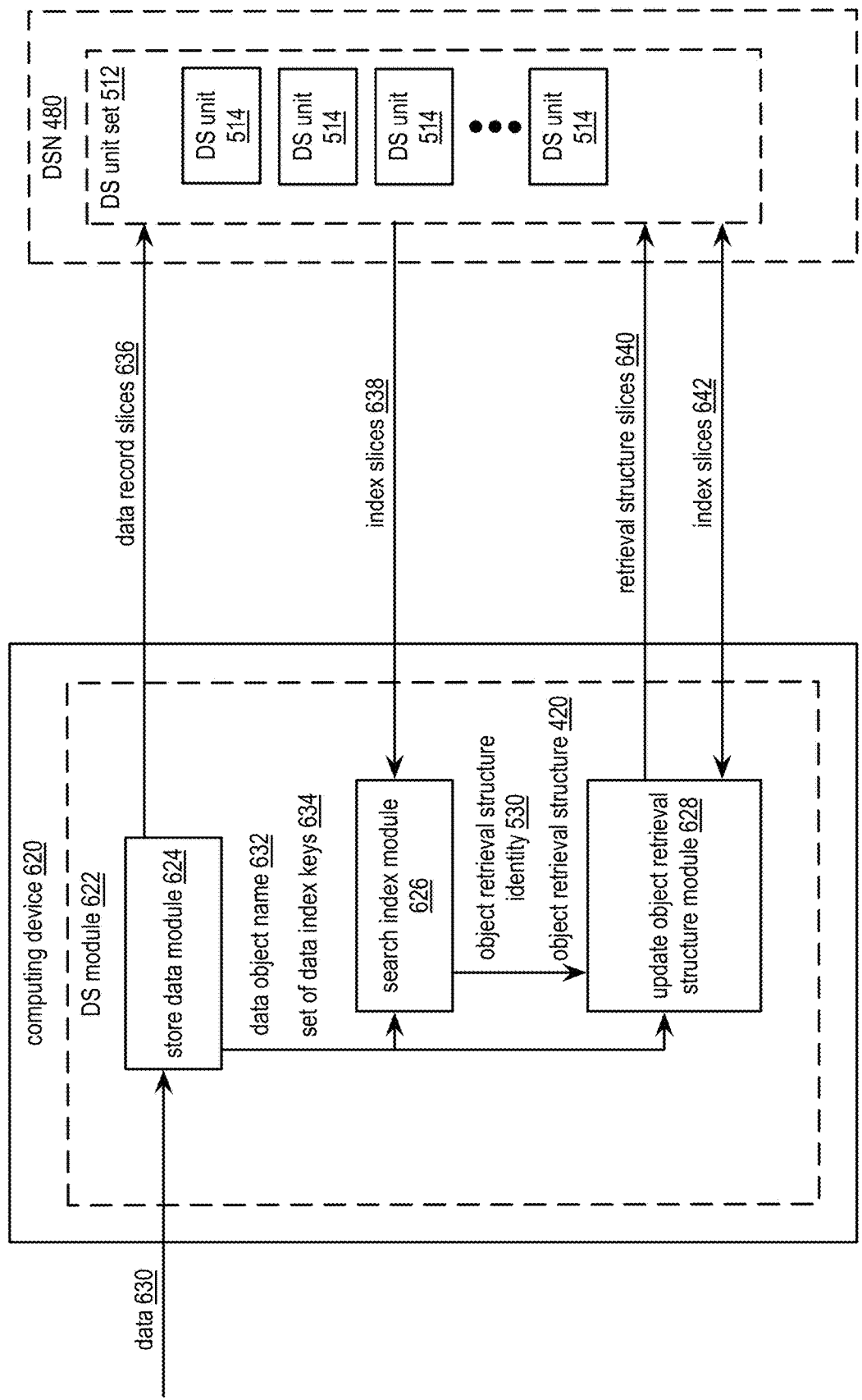
Figure 41T:
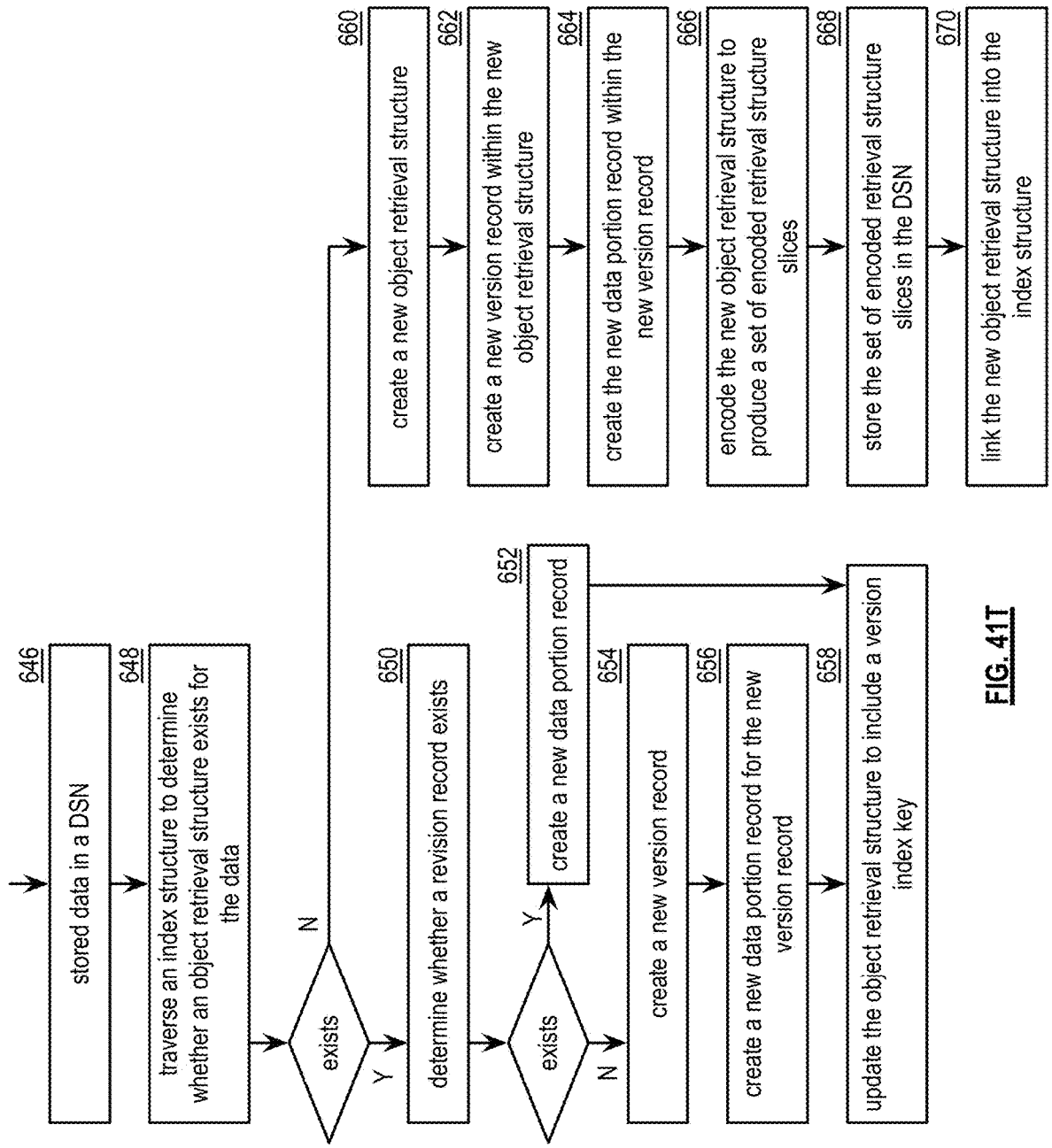
Figure 42:
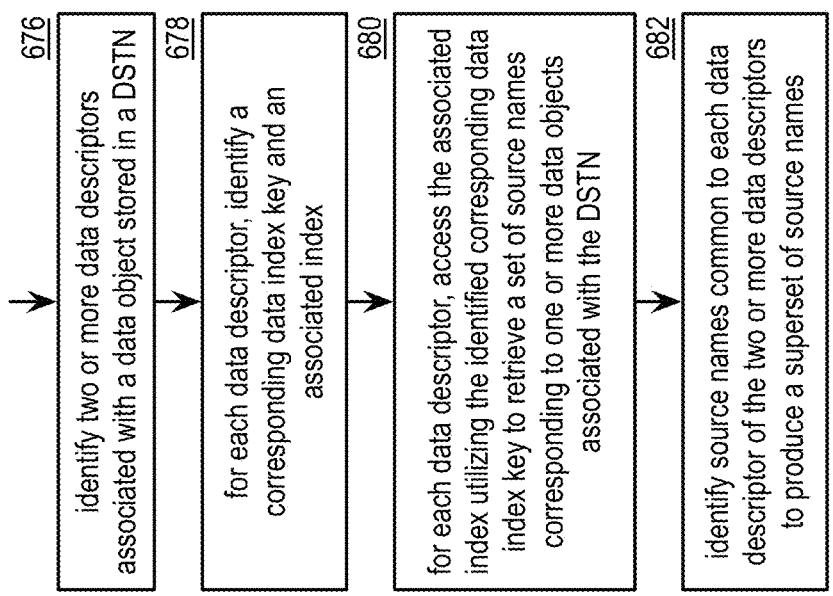
Figure 43:
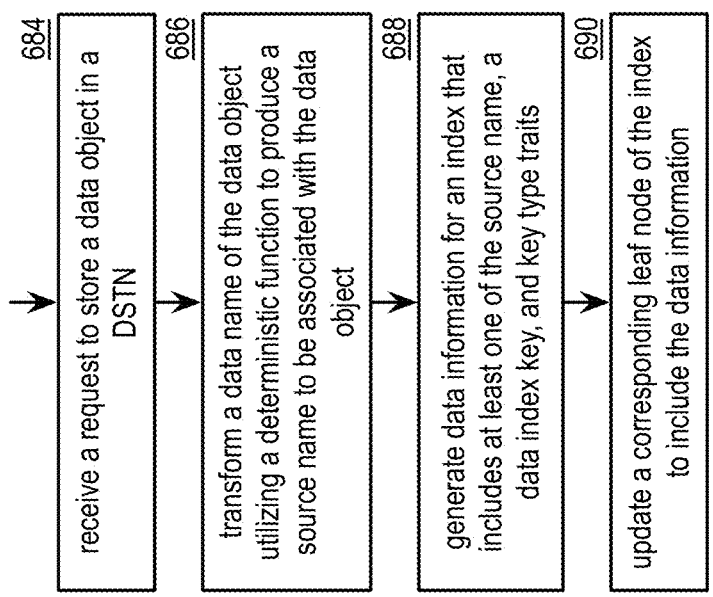
Figure 44:
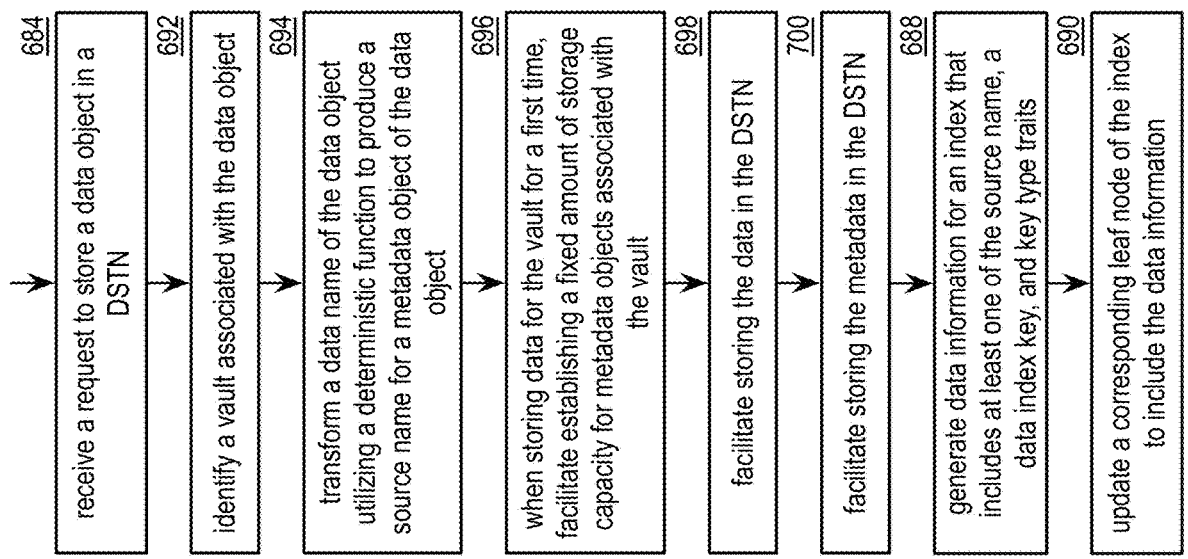

FIGS. 40H, I, J are diagrams illustrating more examples of an object retrieval structure in accordance with the present invention;

FIG. 40K is a diagram illustrating another example of multiple index structures in accordance with the present invention;

FIG. 40L is a schematic block diagram of an embodiment of a data retrieval system in accordance with the present invention;

FIG. 40M is a flowchart illustrating an example of retrieving data in accordance with the present invention;

FIG. 41A is a diagram illustrating an example of indexing data in accordance with the present invention;

FIGS. 41B-C are diagrams illustrating more examples of an object retrieval structure in accordance with the present invention;

FIG. 41D is a diagram illustrating another example of indexing data in accordance with the present invention;

FIGS. 41E-F are diagrams illustrating more examples of an object retrieval structure in accordance with the present invention;

FIG. 41G is a diagram illustrating another example of indexing data in accordance with the present invention;

FIGS. 41H-I are diagrams illustrating more examples of an object retrieval structure in accordance with the present invention;

FIG. 41J is a diagram illustrating another example of indexing data in accordance with the present invention;

FIG. 41K is a diagram illustrating another example of an object retrieval structure in accordance with the present invention;

FIG. 41L is a diagram illustrating an example of data partitioning in accordance with the present invention;

FIG. 41M is a diagram illustrating another example of data partitioning in accordance with the present invention;

FIG. 41N is a diagram illustrating another example of indexing data in accordance with the present invention;

FIGS. 41P-Q are diagrams illustrating more examples of an object retrieval structure in accordance with the present invention;

FIG. 41R is a diagram illustrating another example of multiple index structures in accordance with the present invention;

FIG. 41S is a schematic block diagram of an embodiment of a data storage system in accordance with the present invention;

FIG. 41T is a flowchart illustrating an example of storing data in accordance with the present invention;

FIG. 42 is a flowchart illustrating an example of accessing data in accordance with the present invention;

FIG. 43 is a flowchart illustrating another example of storing data in accordance with the present invention; and FIG. 44 is a flowchart illustrating another example of storing data in accordance with the present invention.

DETAILED DESCRIPTION OF THE INVENTION

Figure 1:
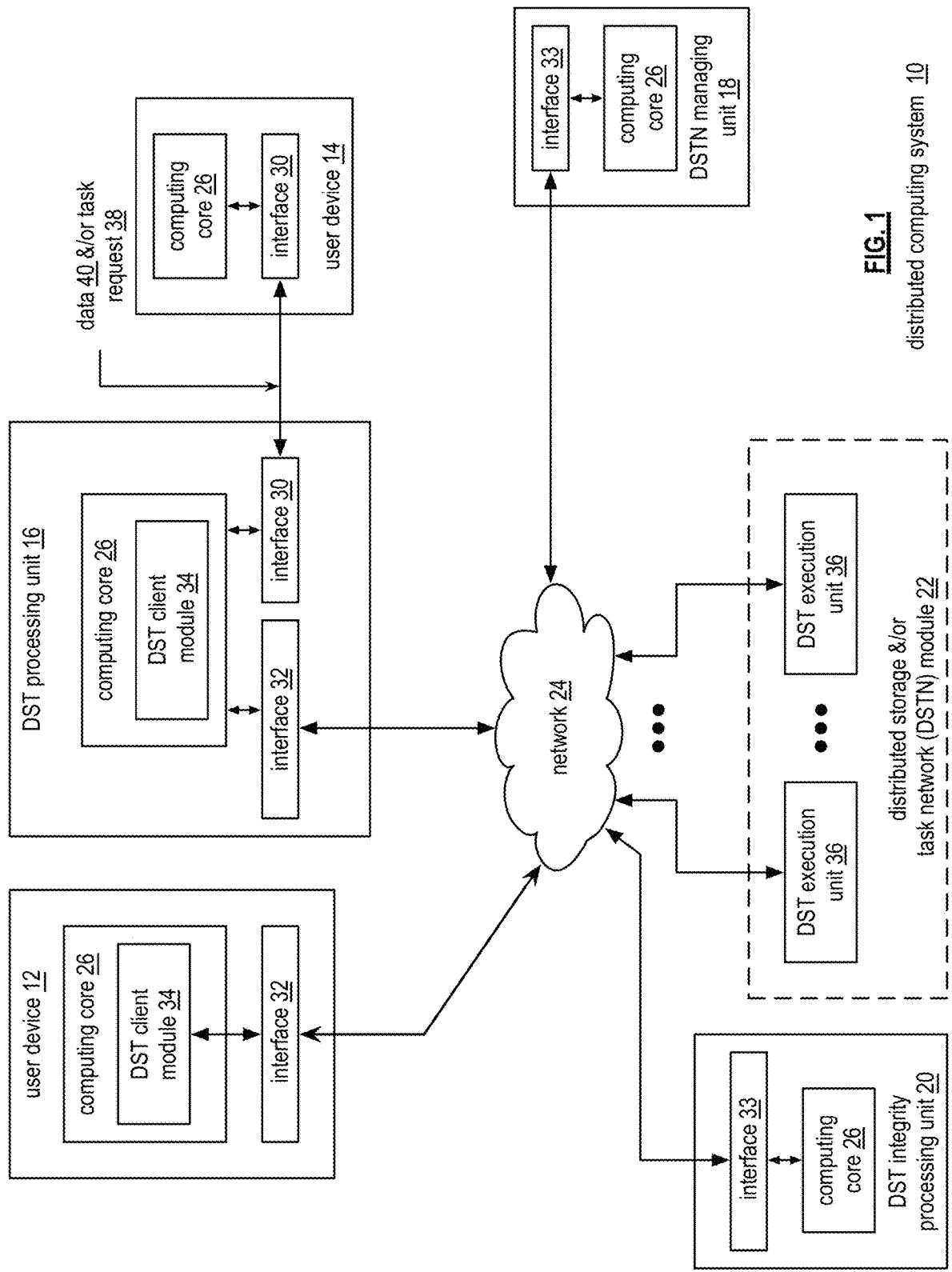
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing module 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations includes, but is not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
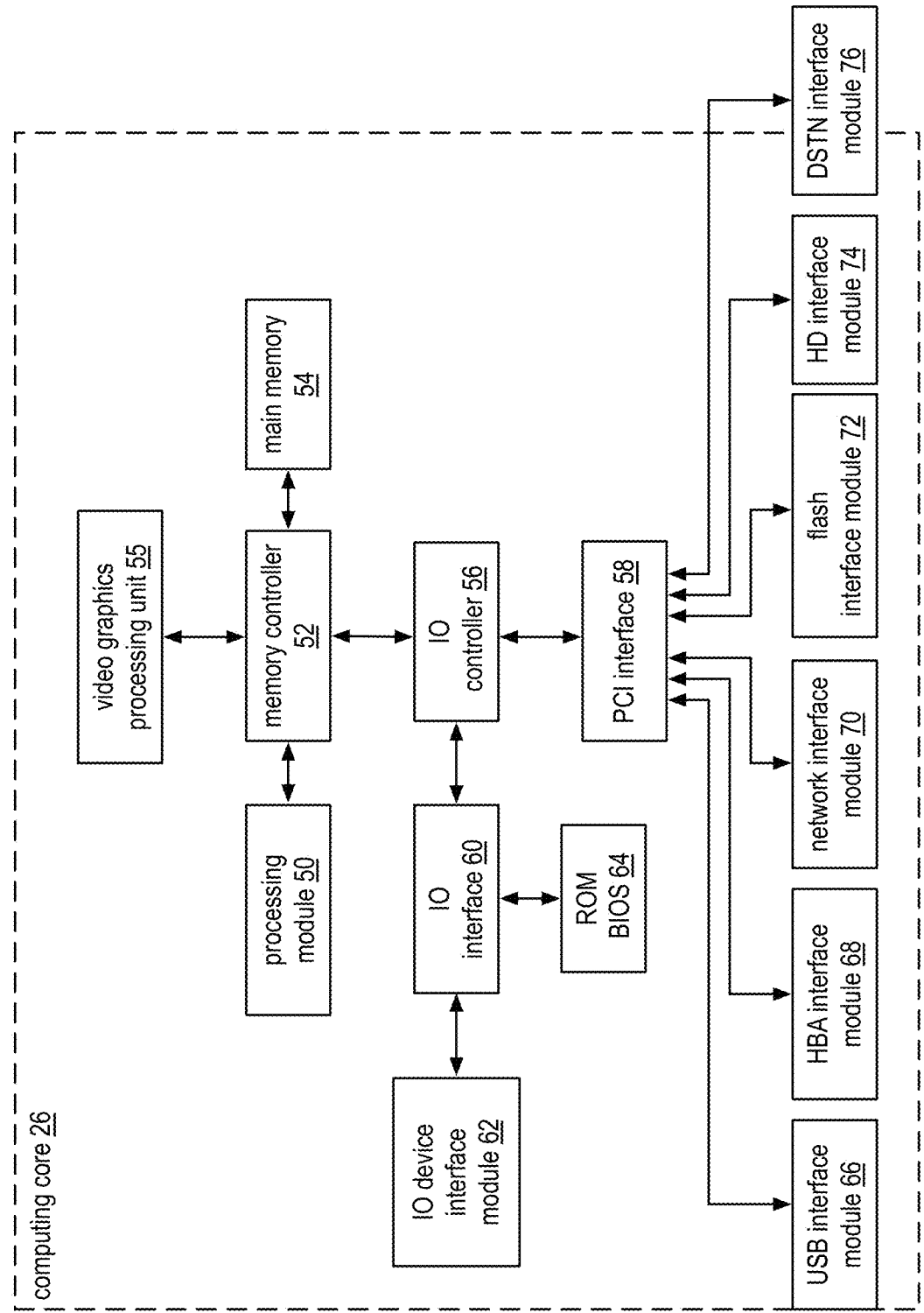
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
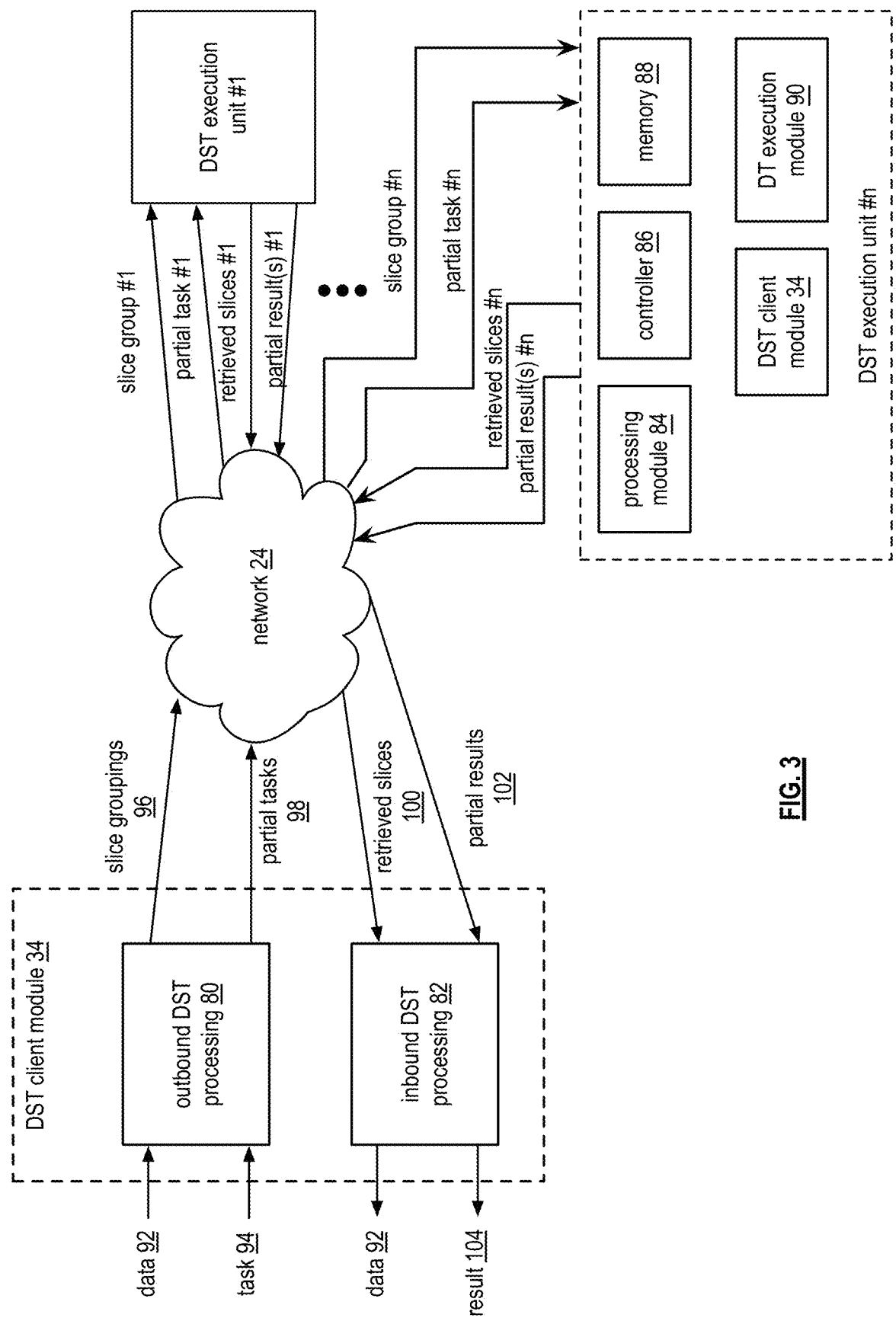
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 12 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group # n and partial task # n to DST execution unit # n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
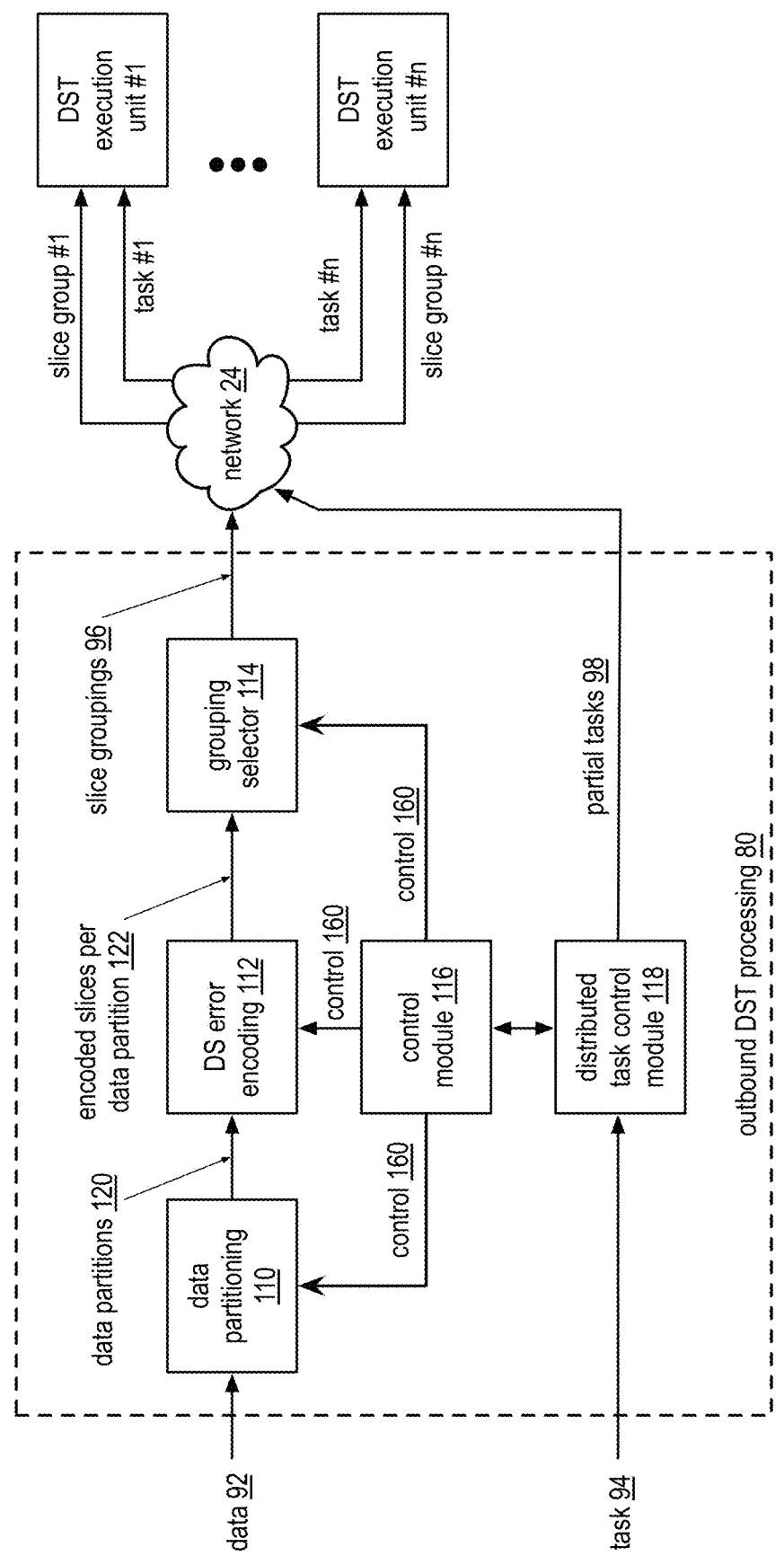
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recources, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The group selecting module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the group selecting module groups the encoded slices 122 of a data partition into five slice groupings 96. The group selecting module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, wherein in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
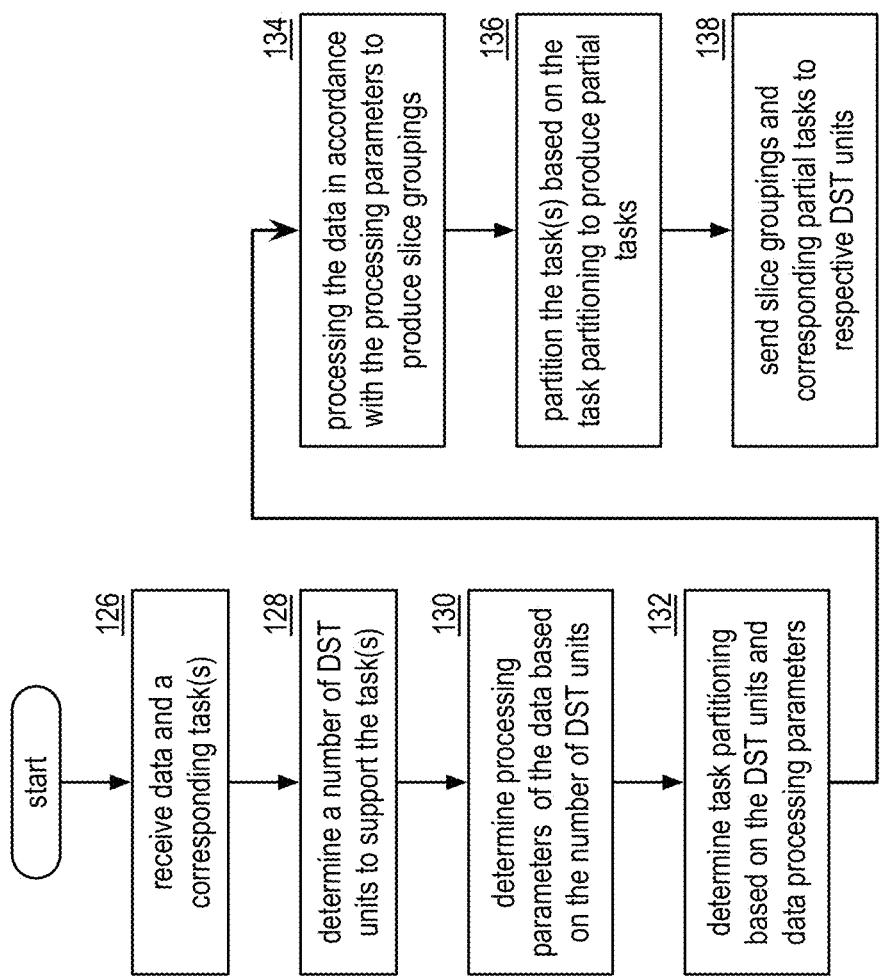
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
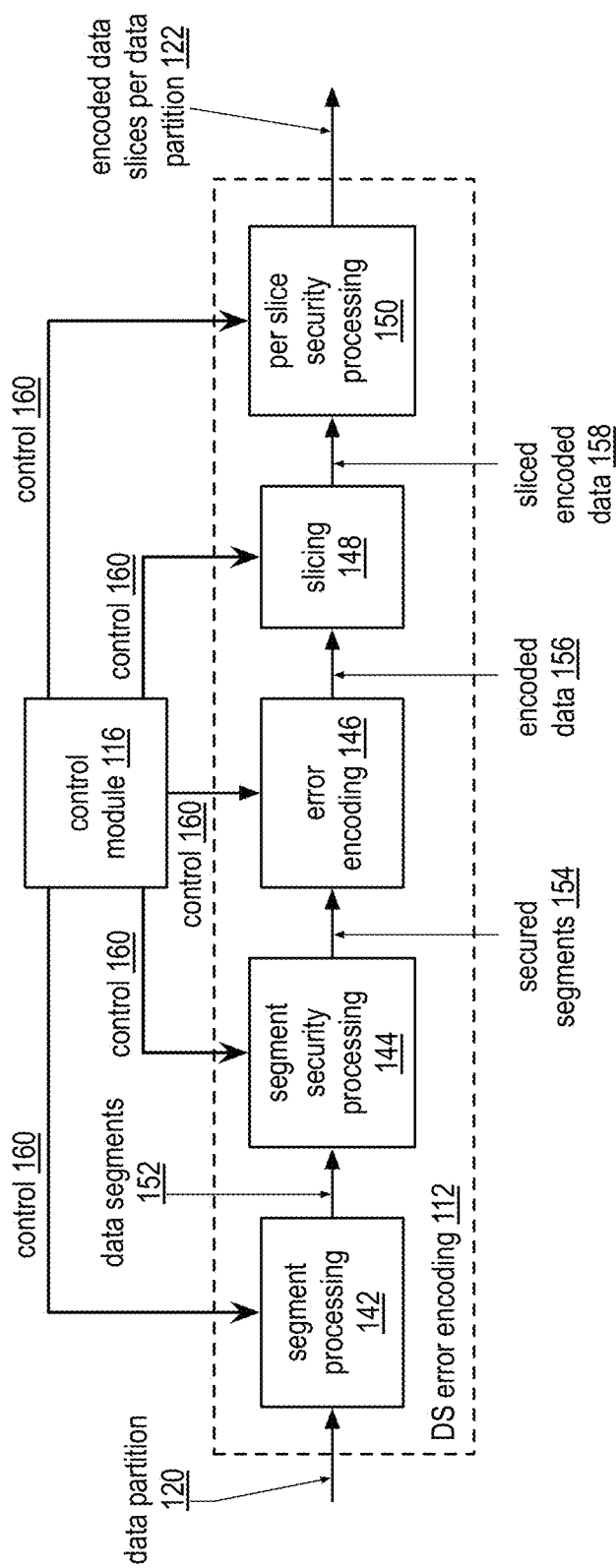
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
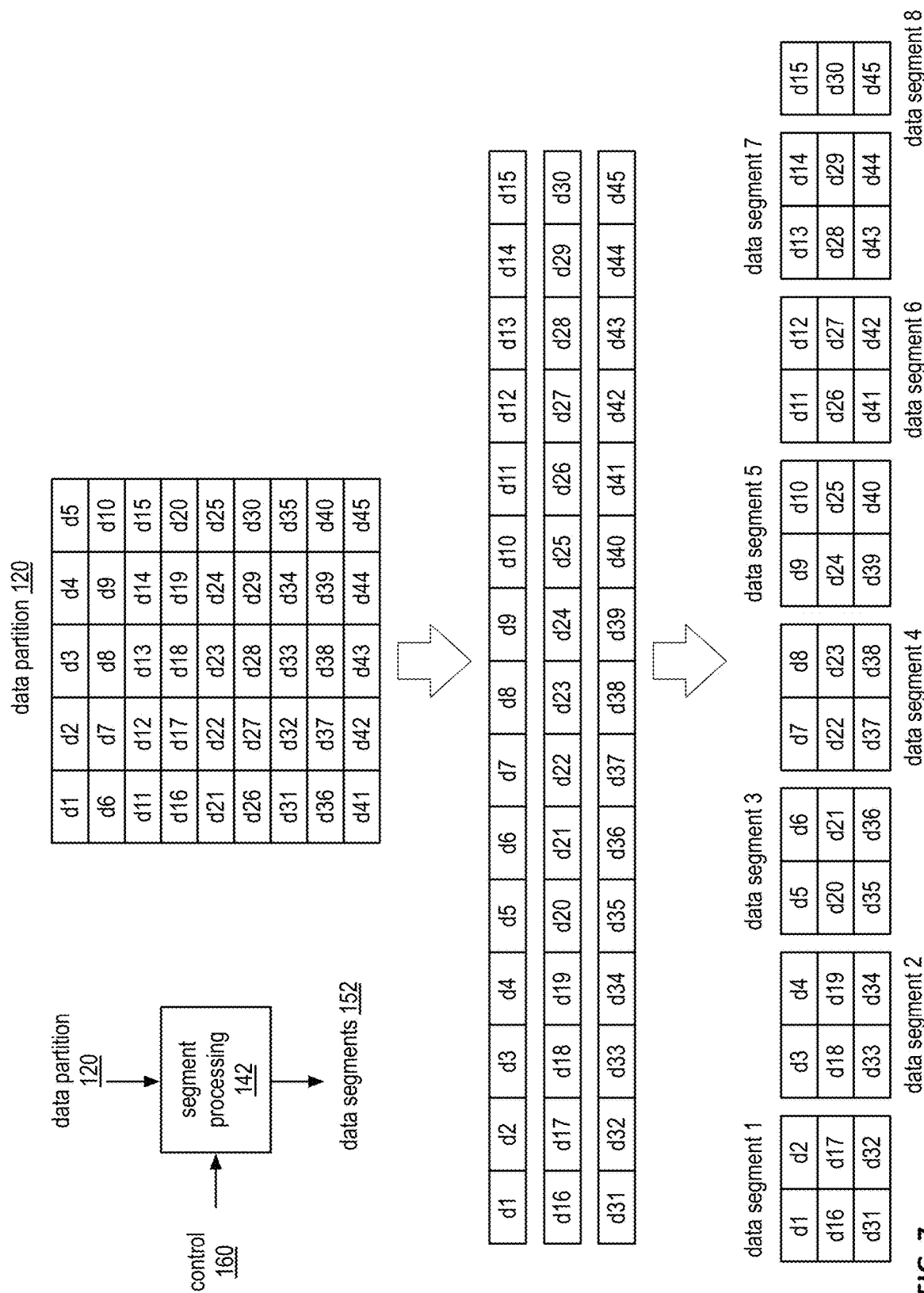
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
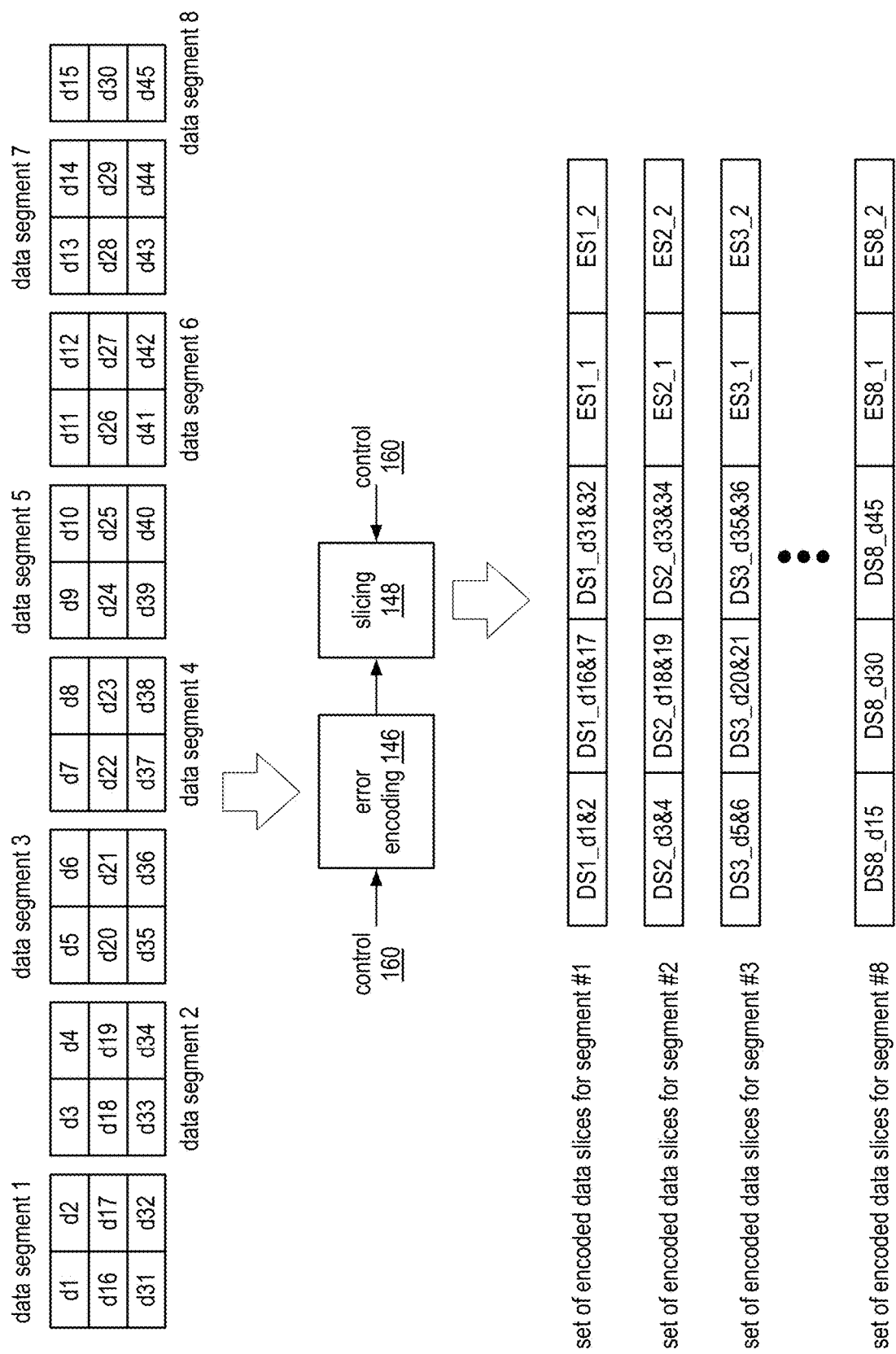
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
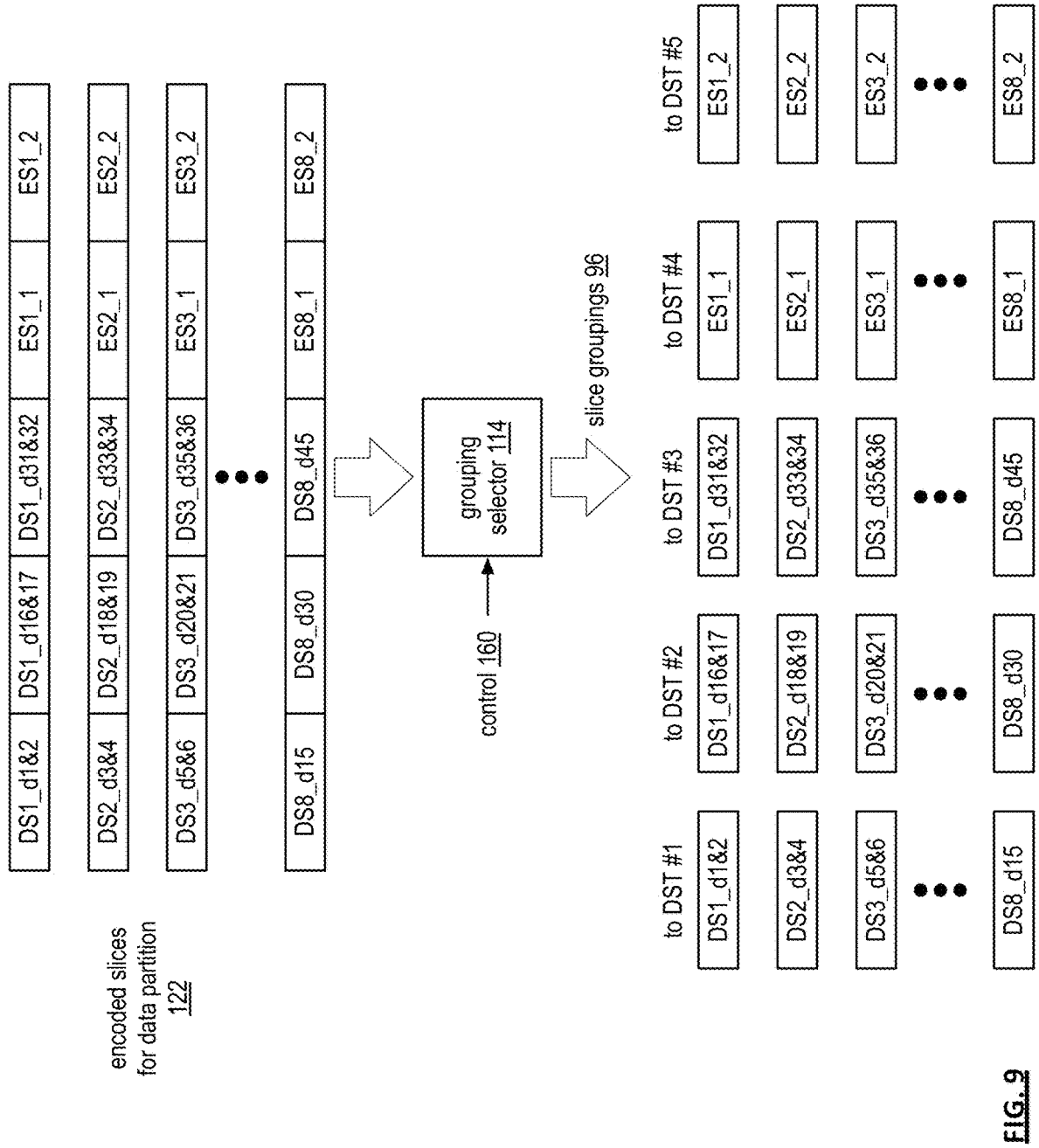
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
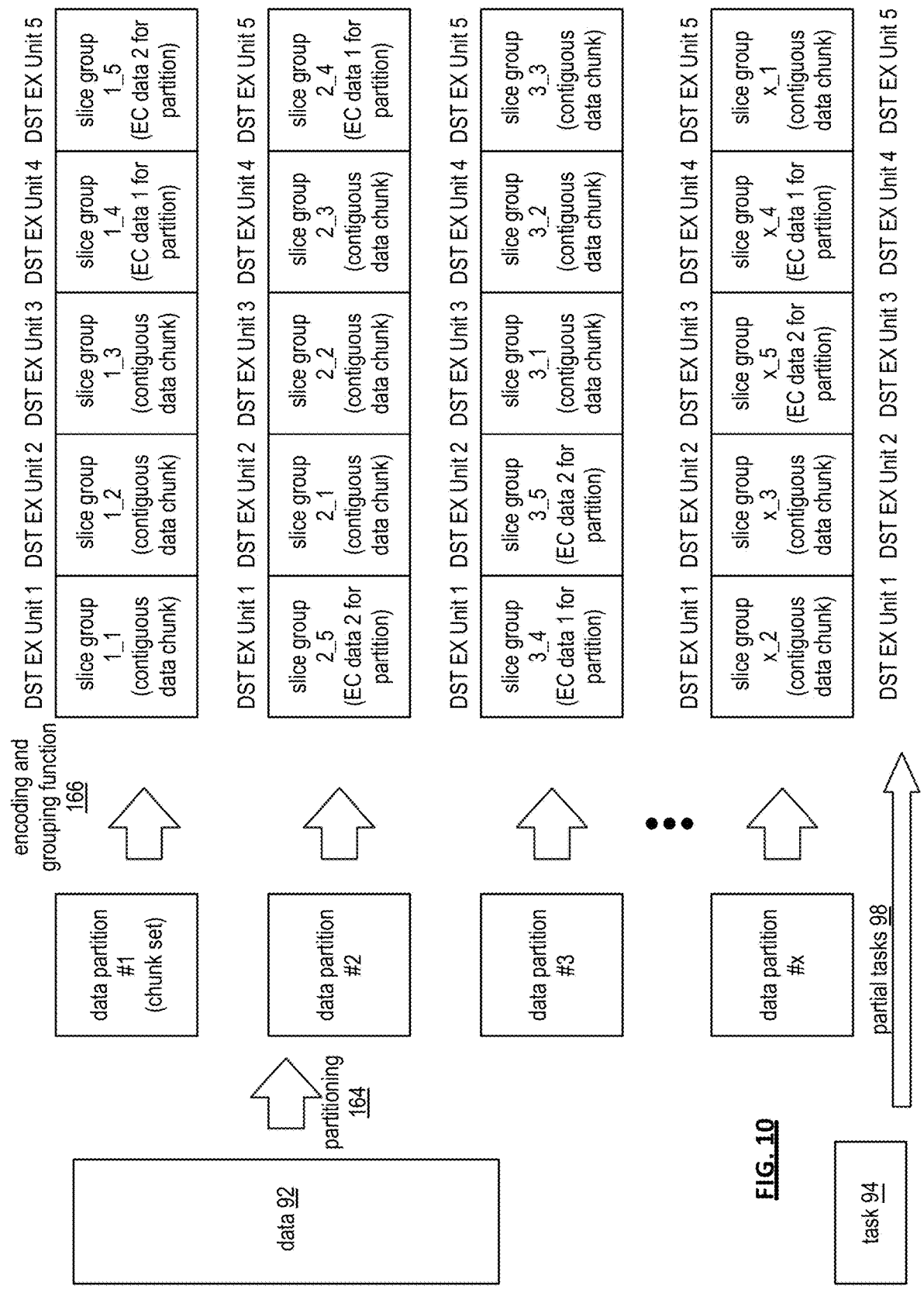
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
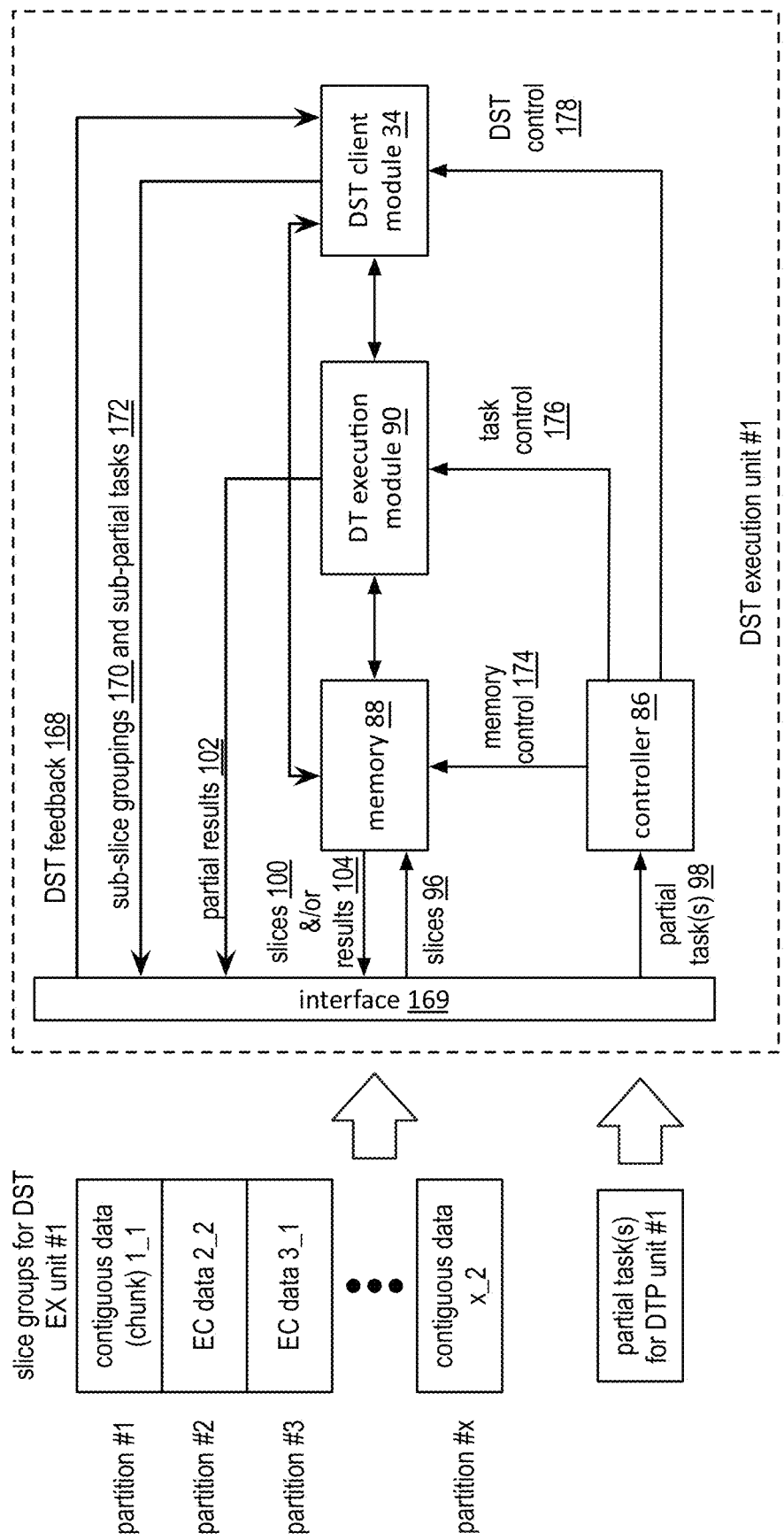
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and # x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identity of other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
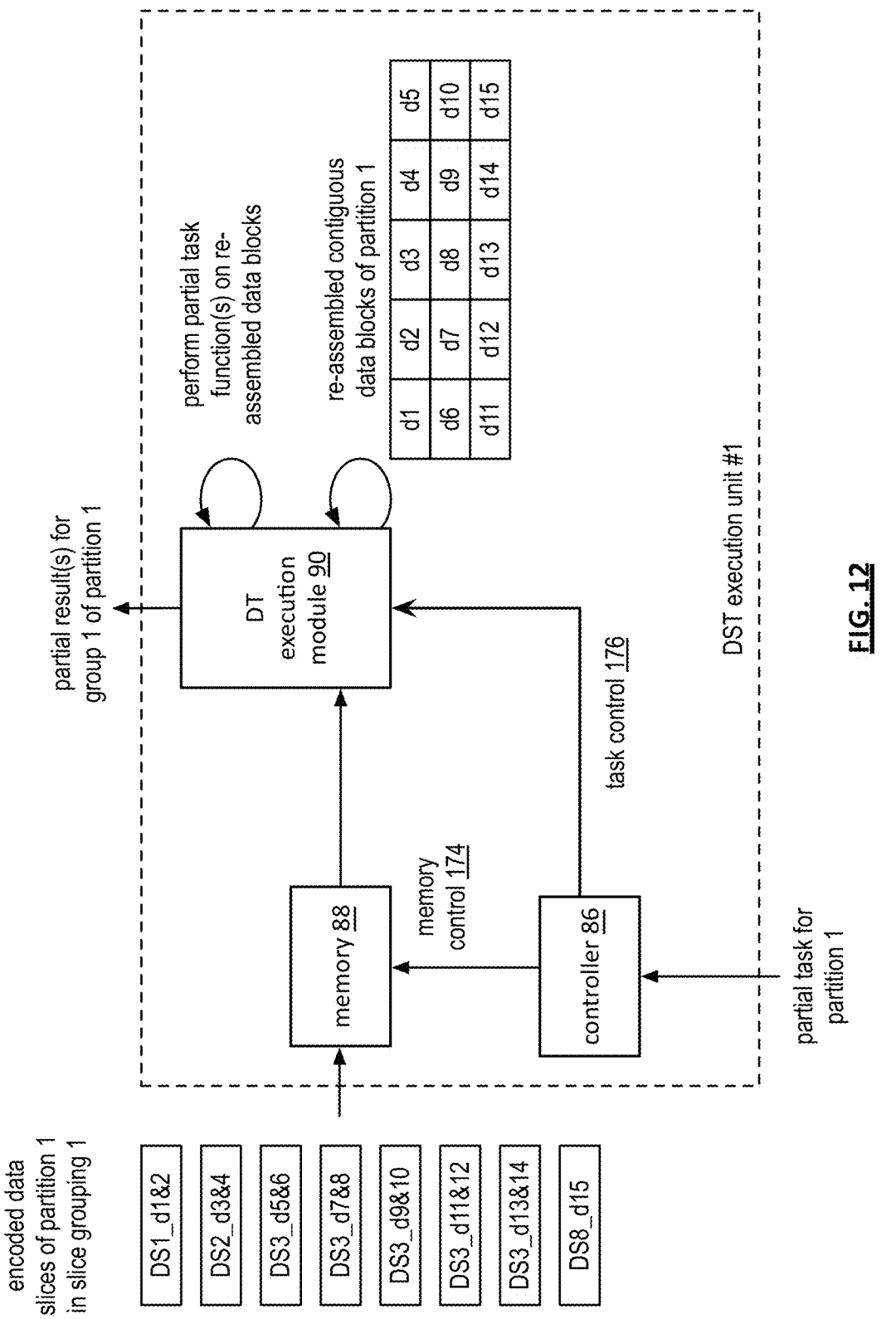
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
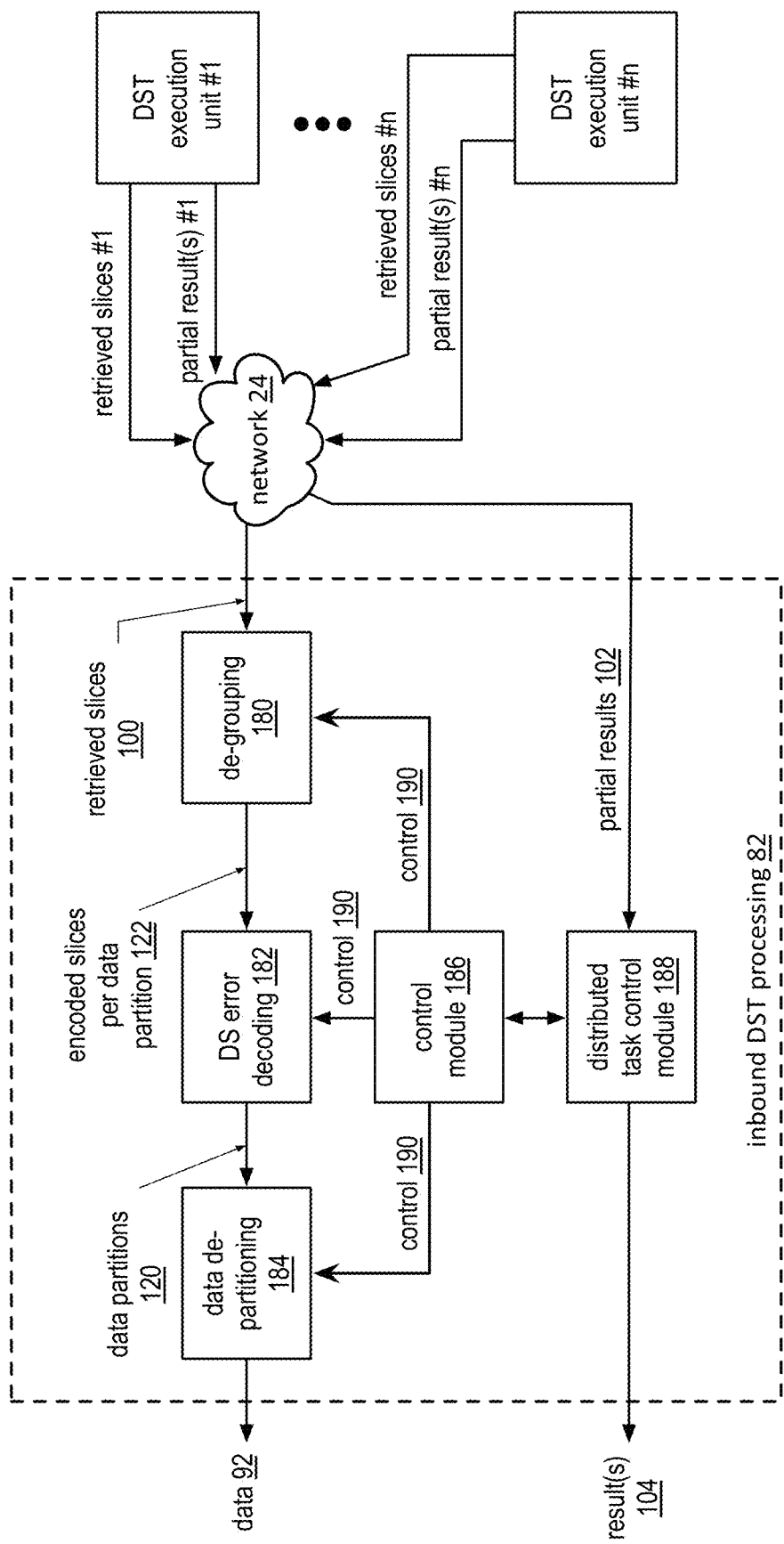
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbounded DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
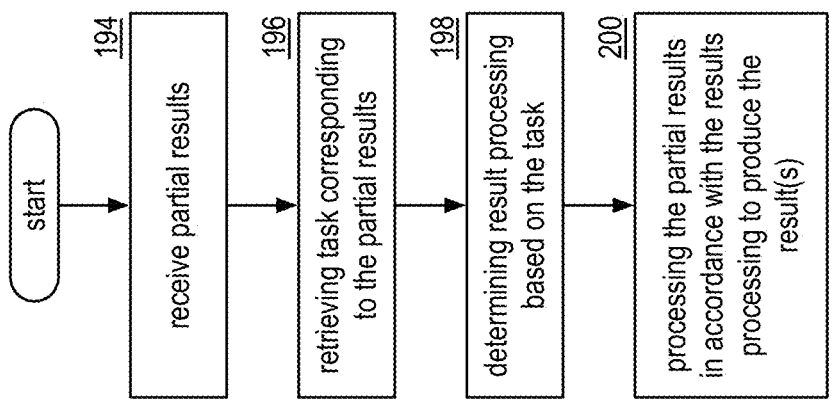
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
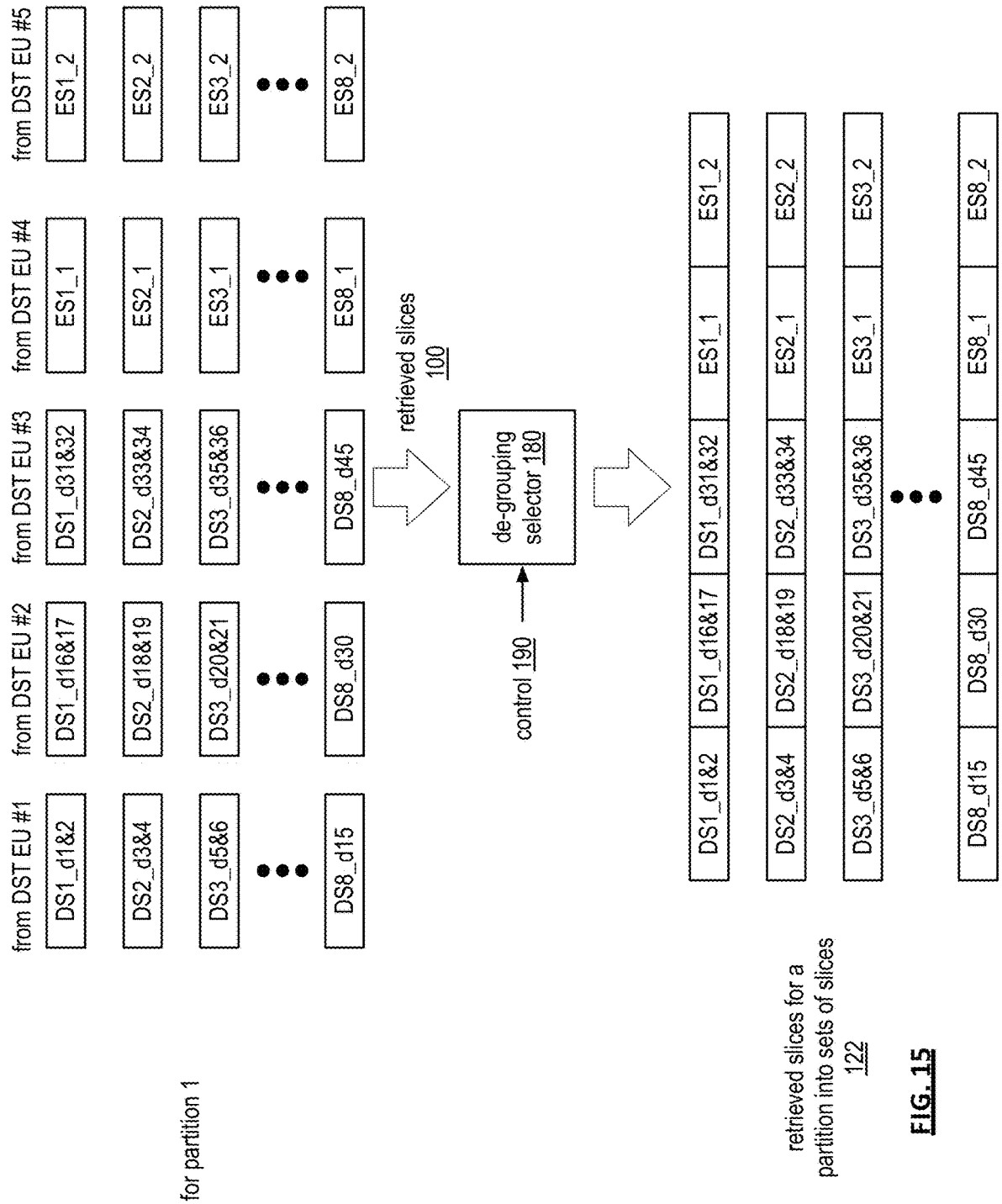
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
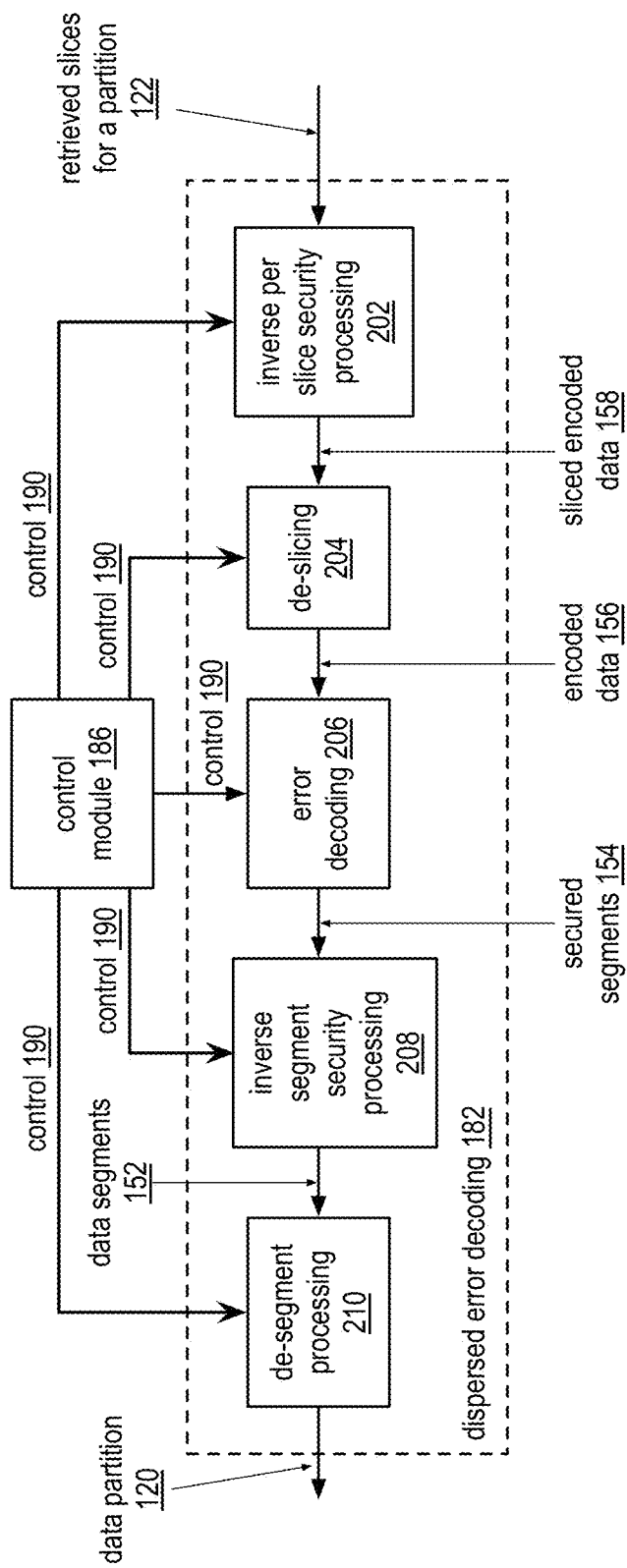
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Salomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
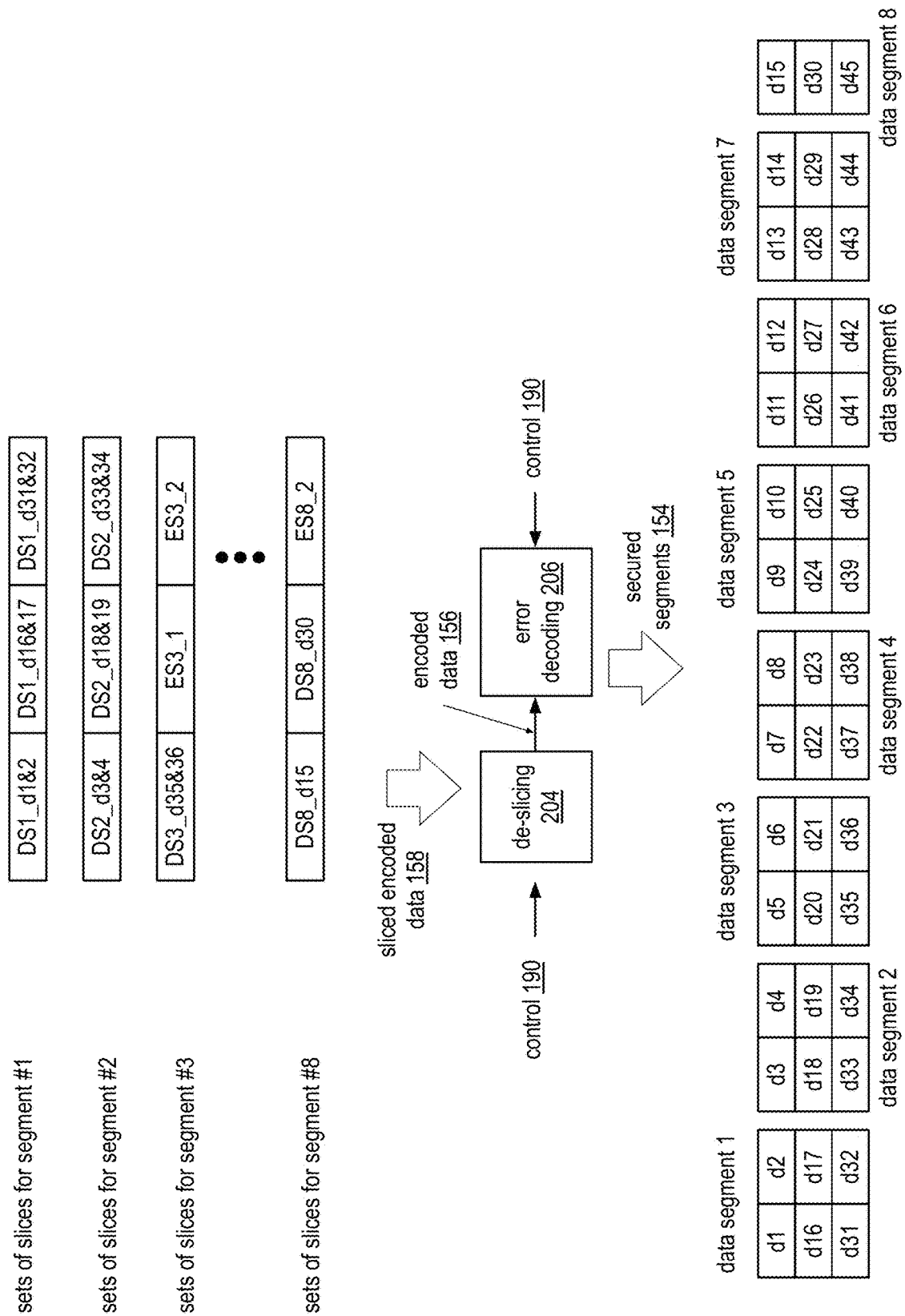
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
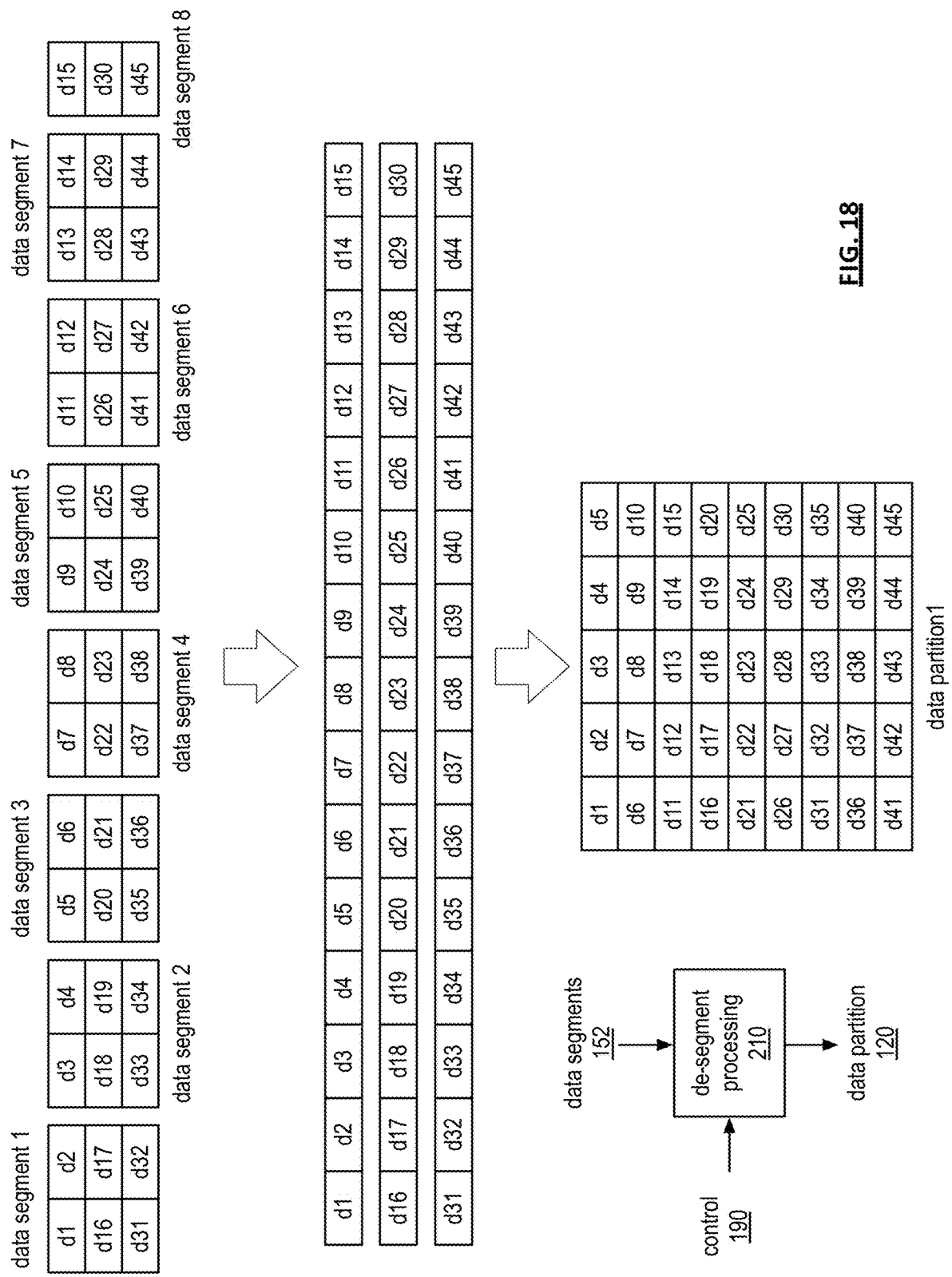
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
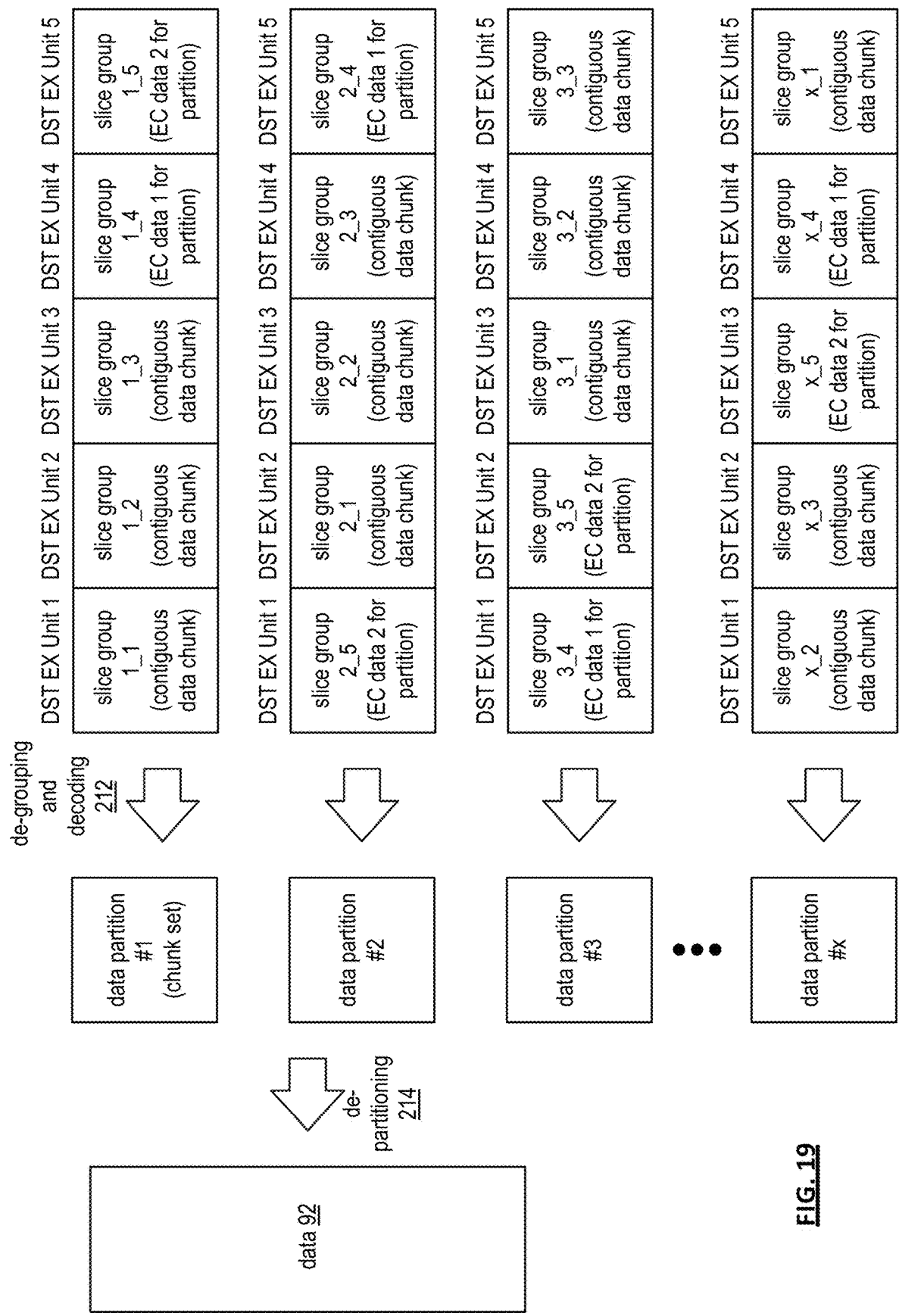
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
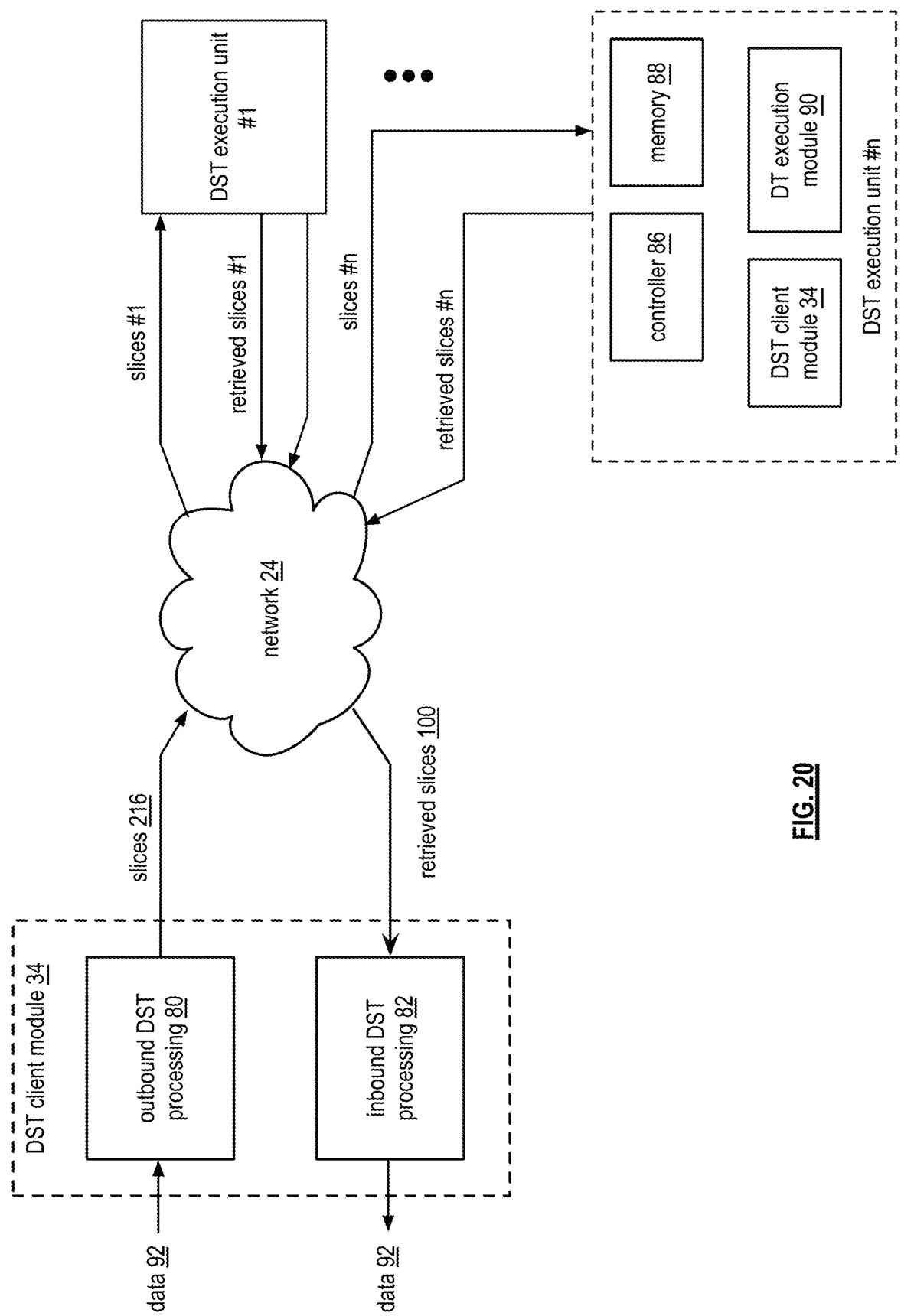
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
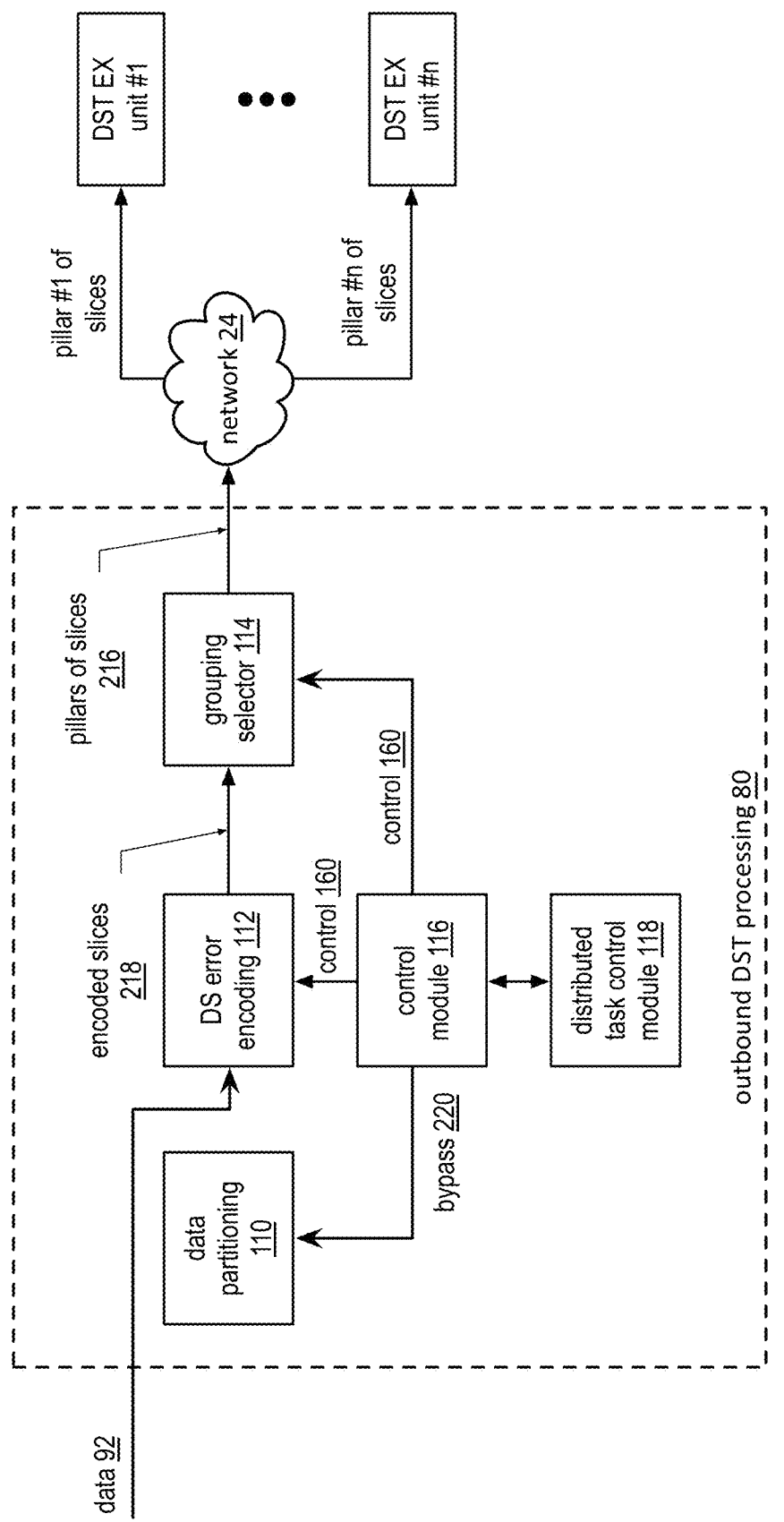
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a group selection module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The group selecting module 114 groups the encoded slices 218 of the data segments into pillars of slices 216. The number of pillars corresponds to the pillar width of the DS error encoding parameters. In this example, the distributed task control module 118 facilitates the storage request.

Figure 22:
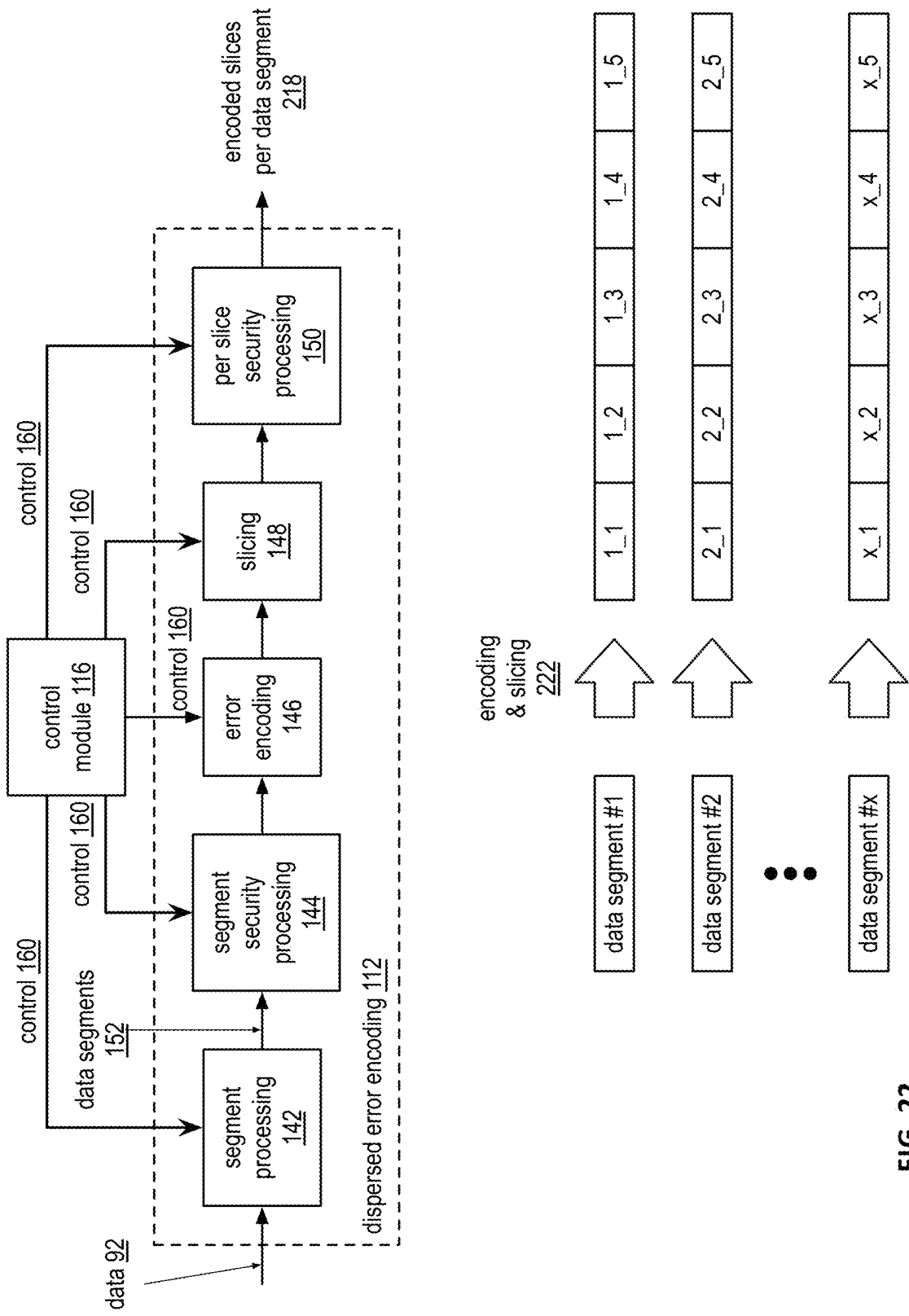
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
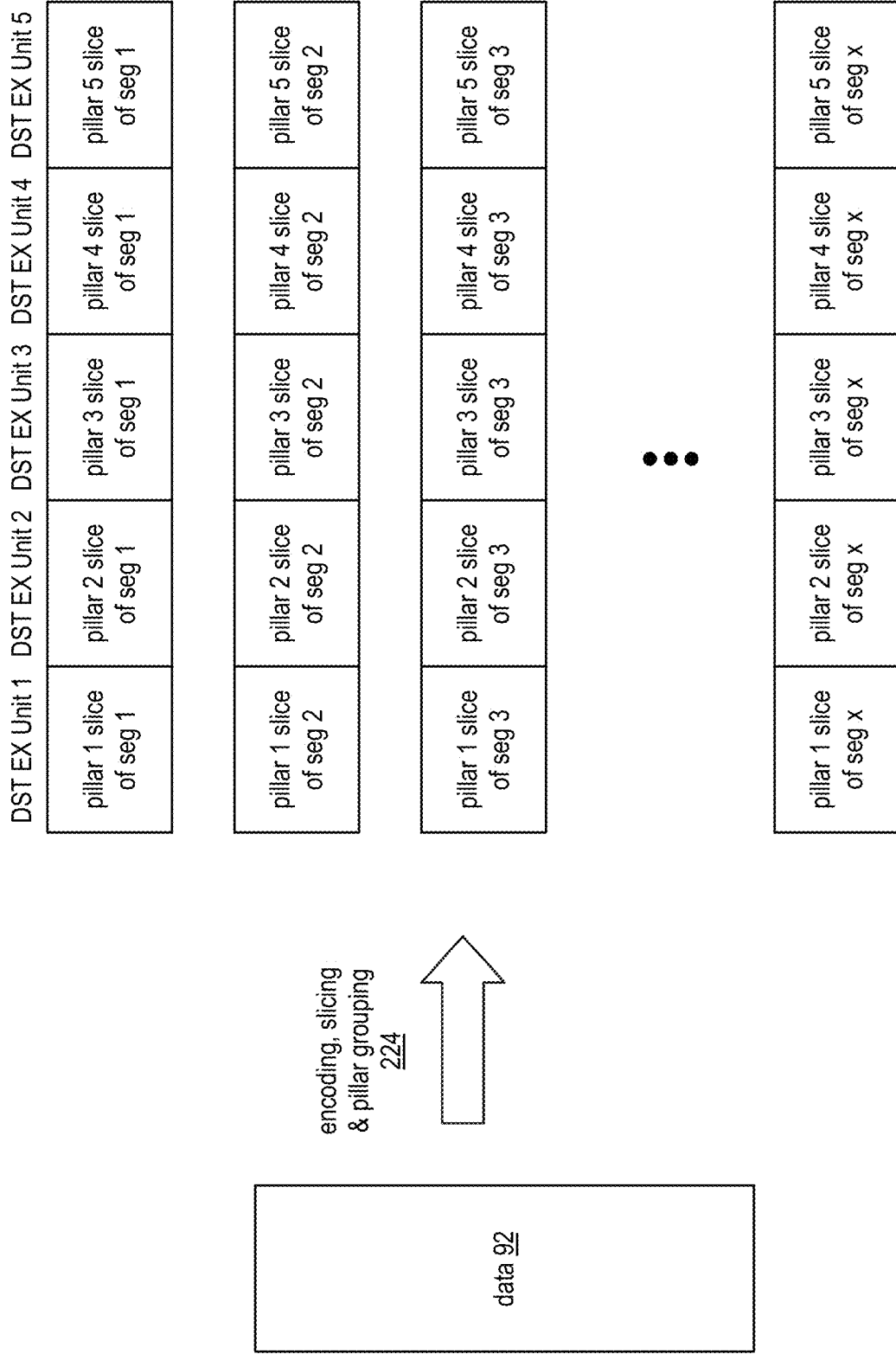
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
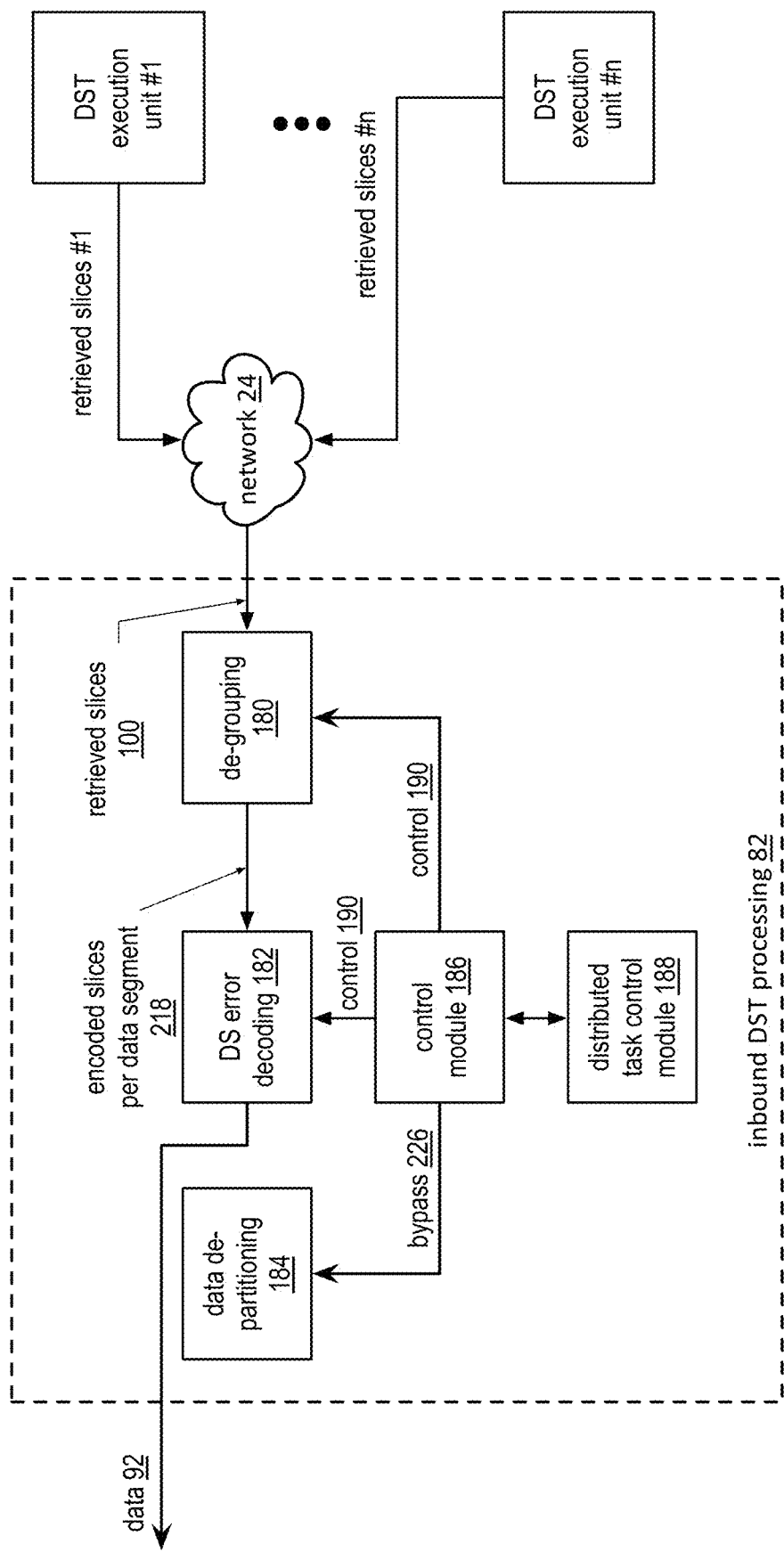
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
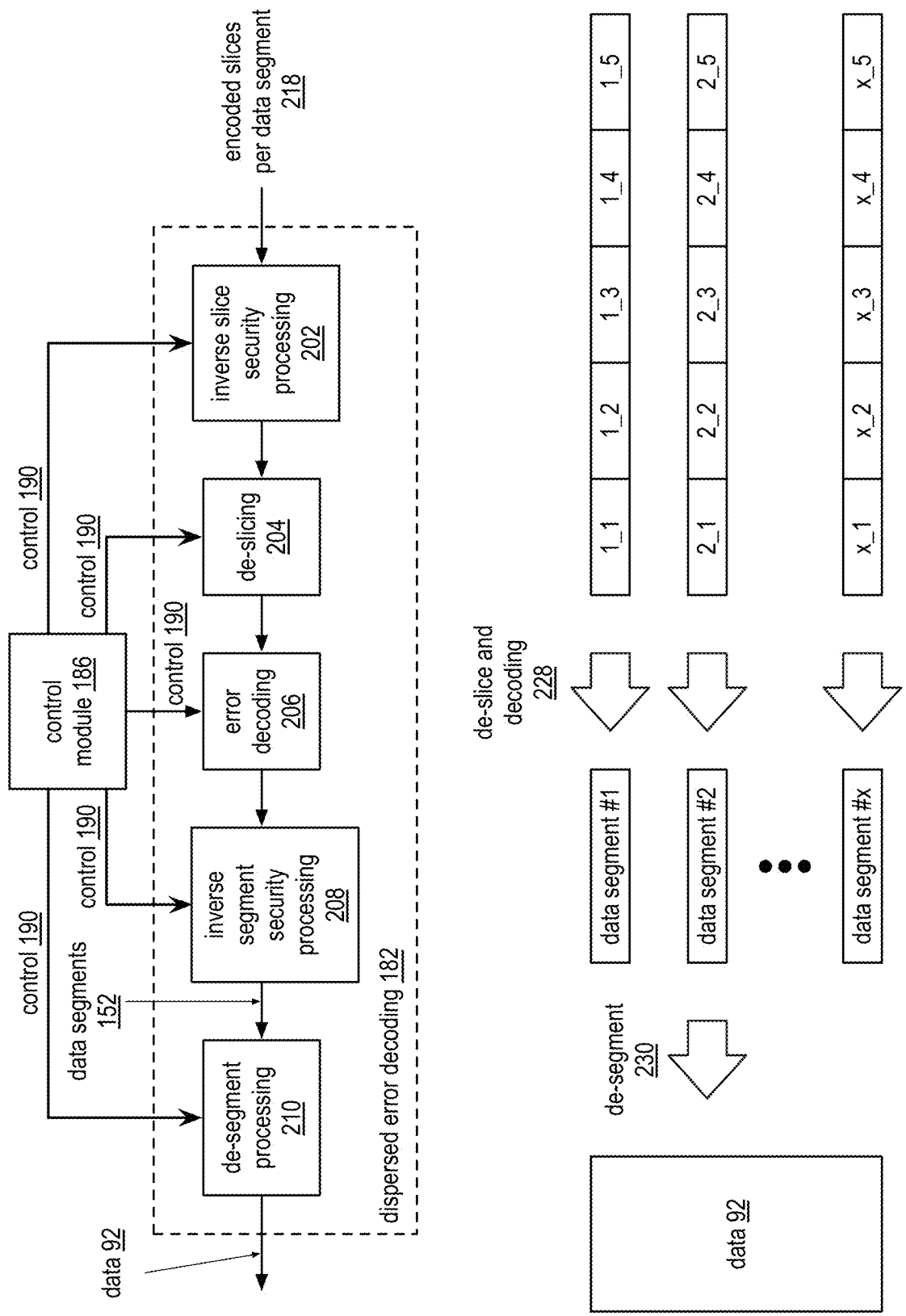
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
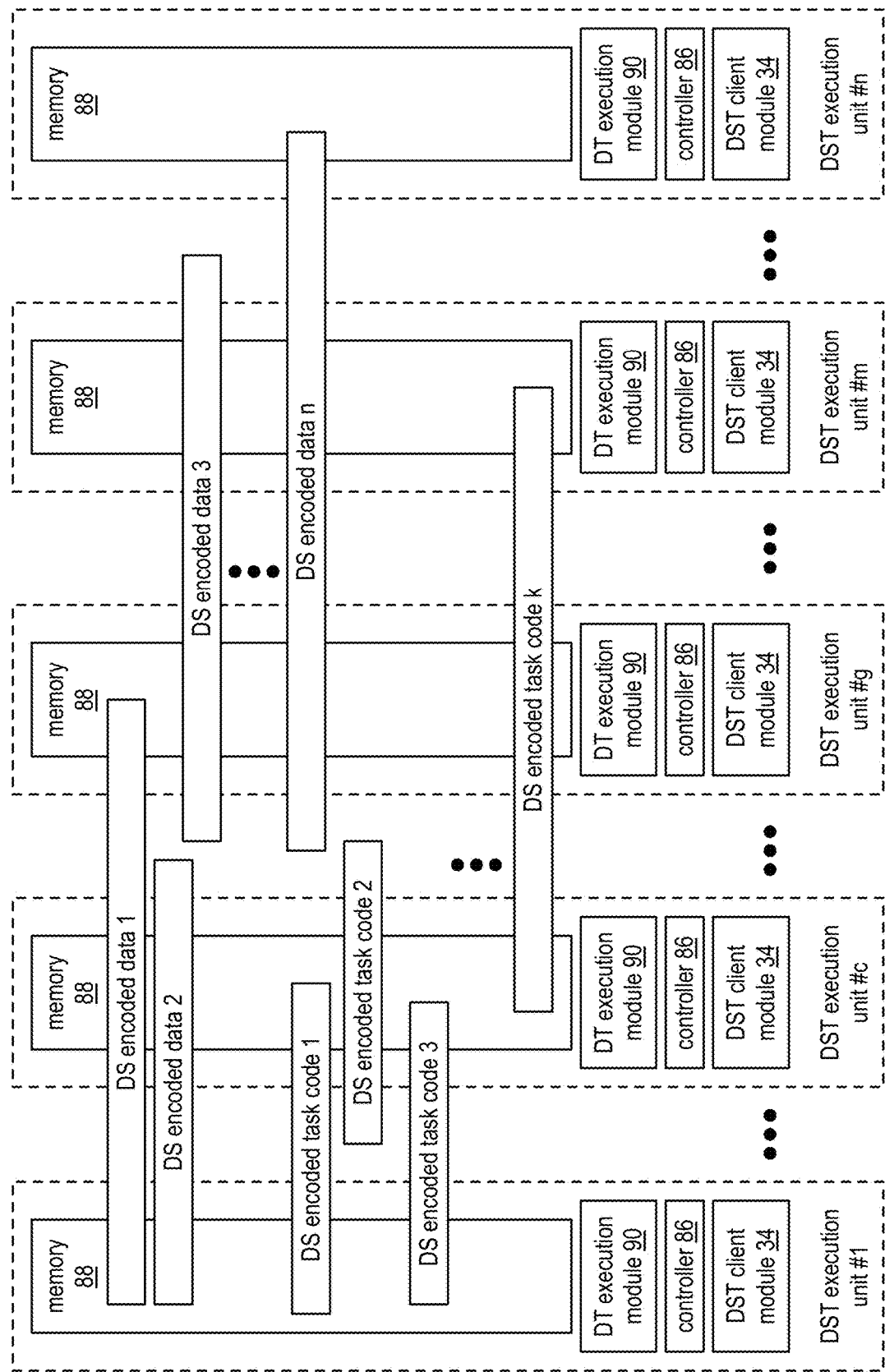
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through # n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
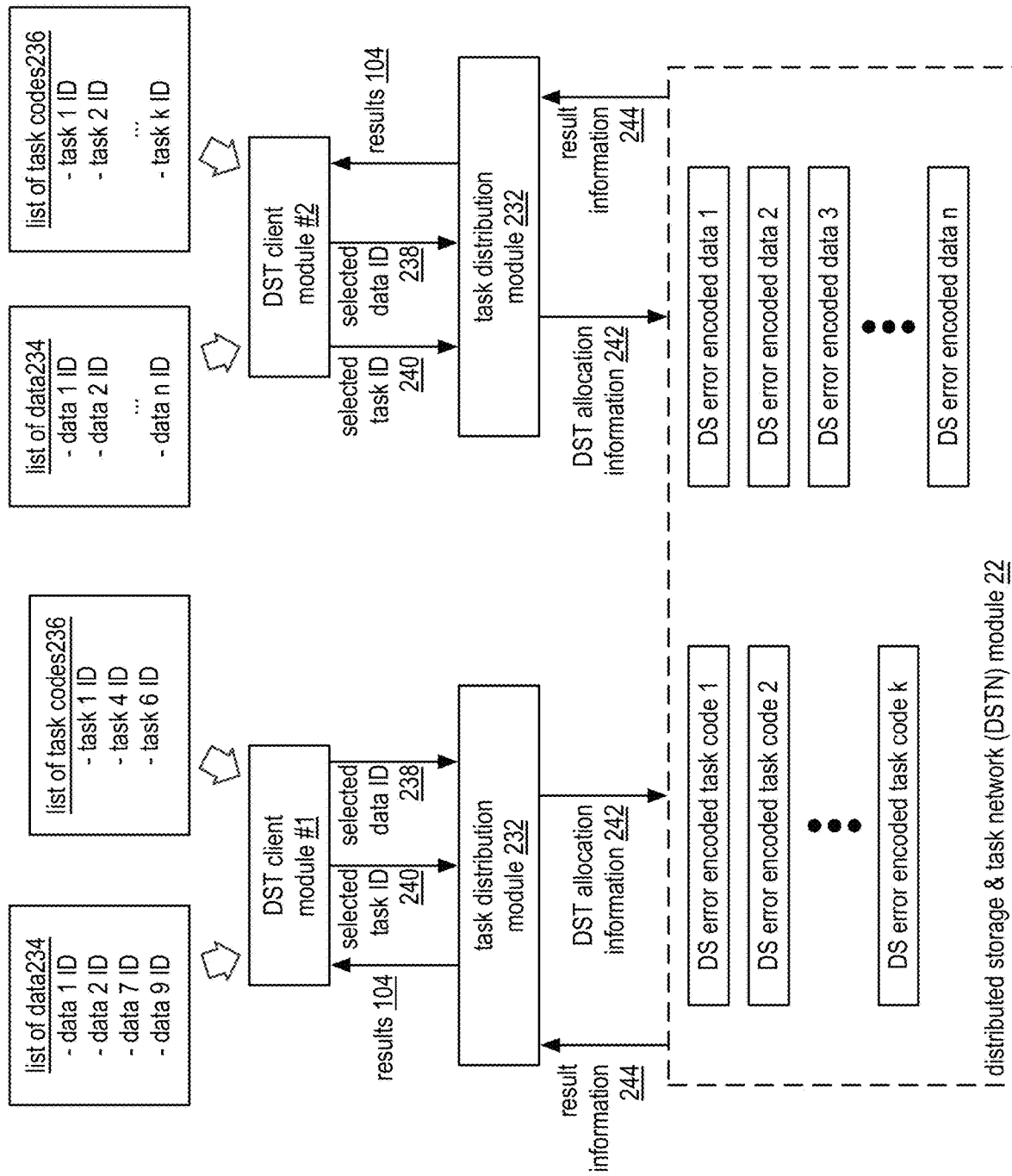
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distributions modules location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
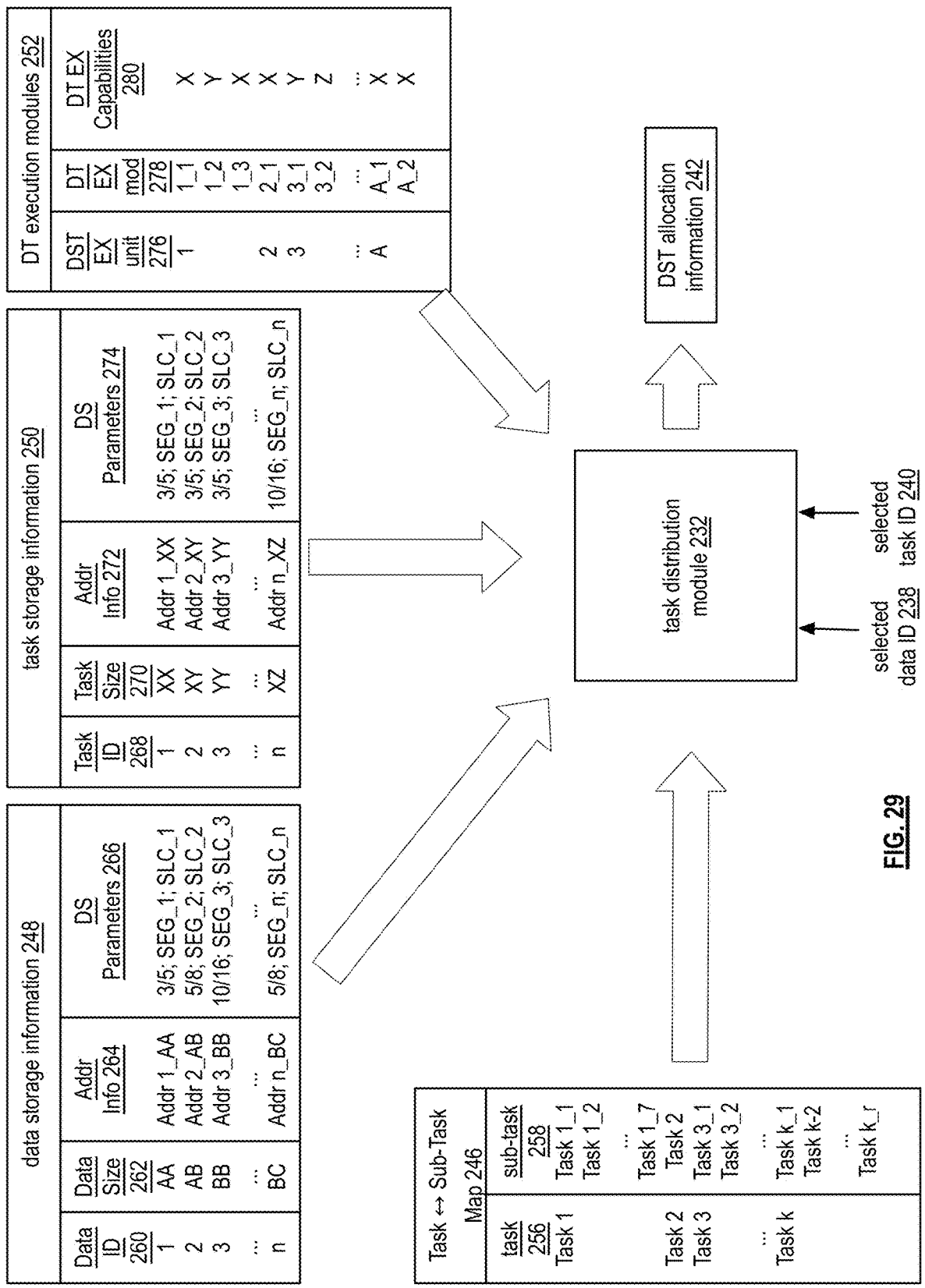
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or and other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
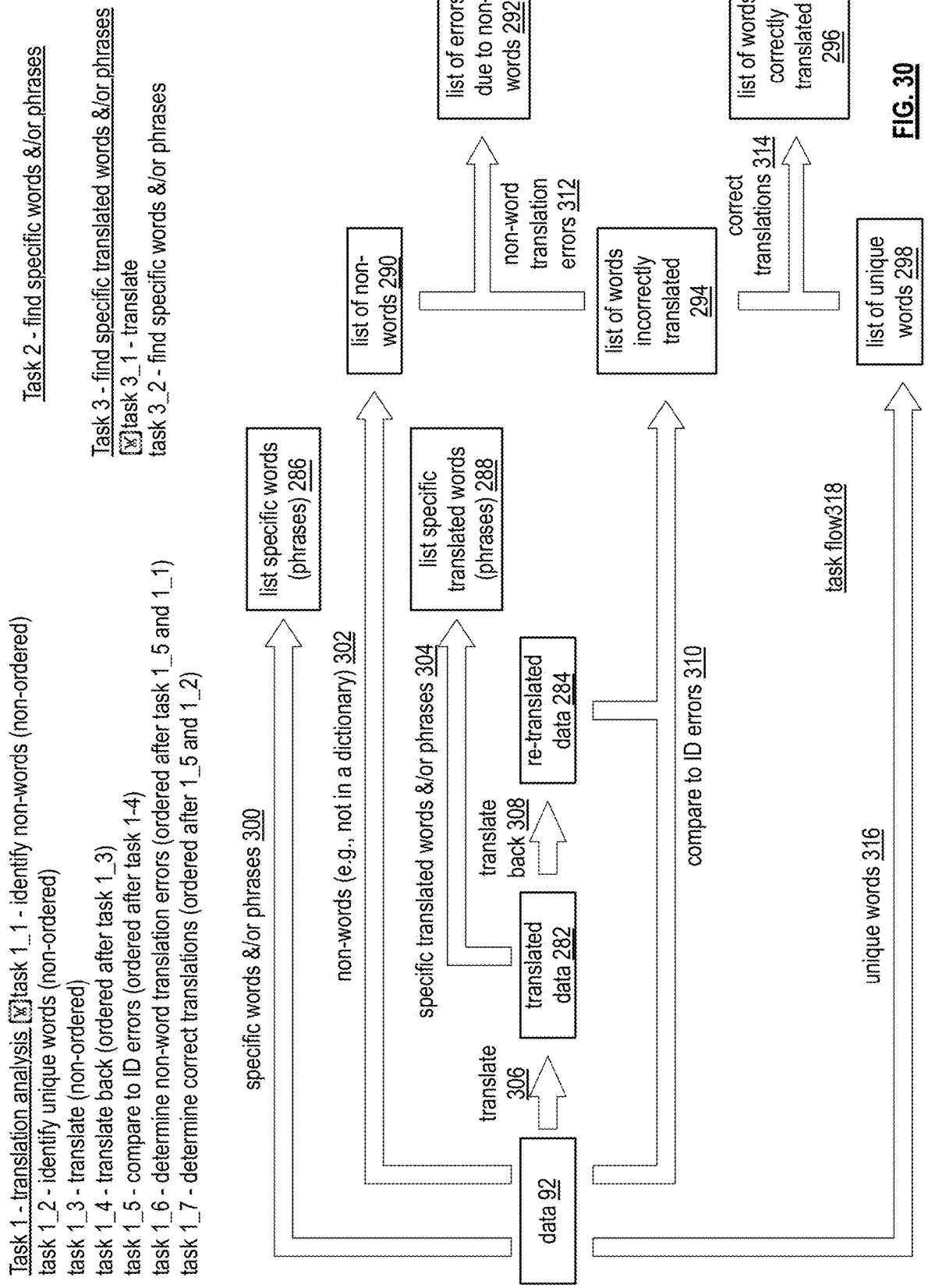
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
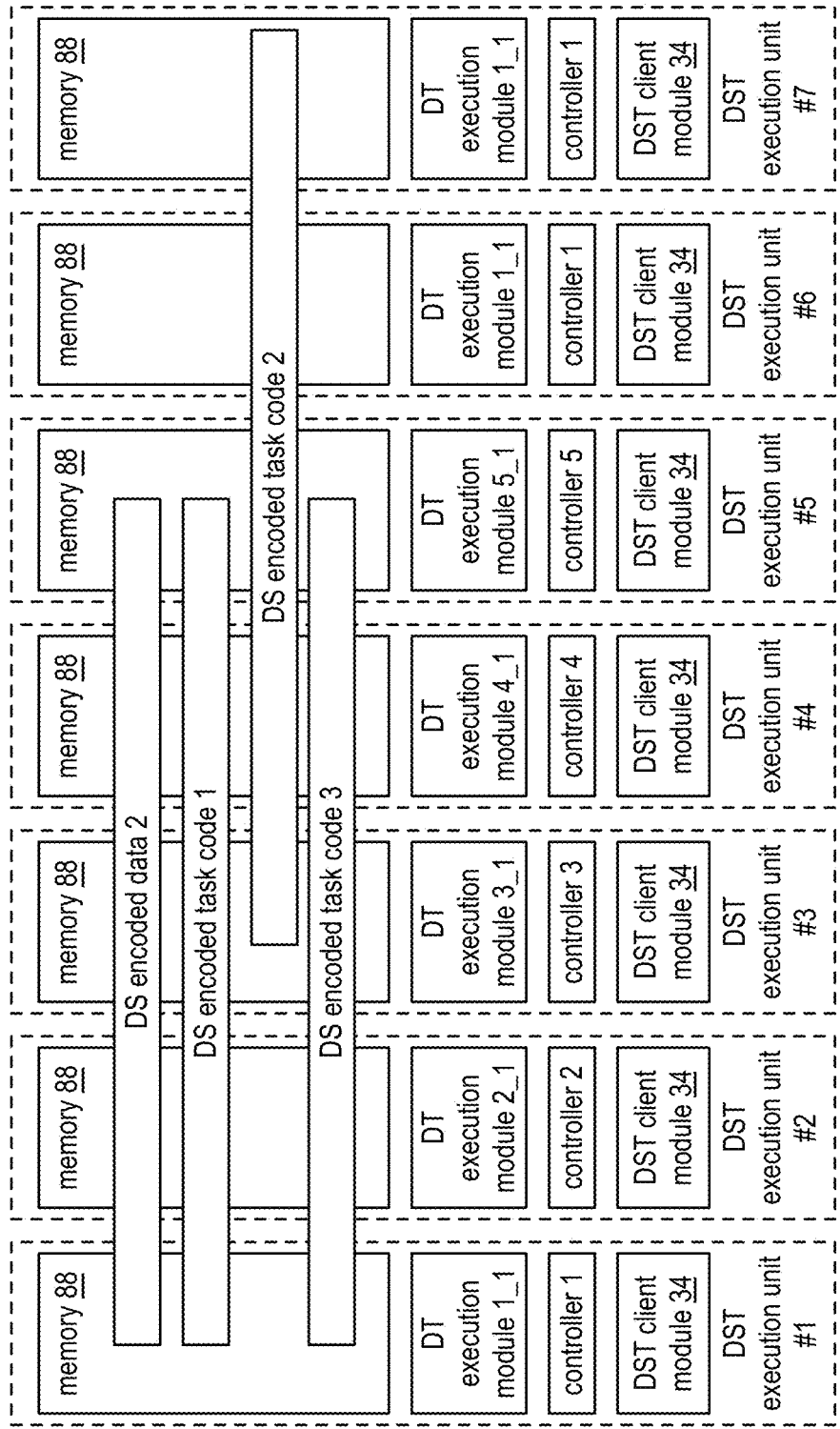
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
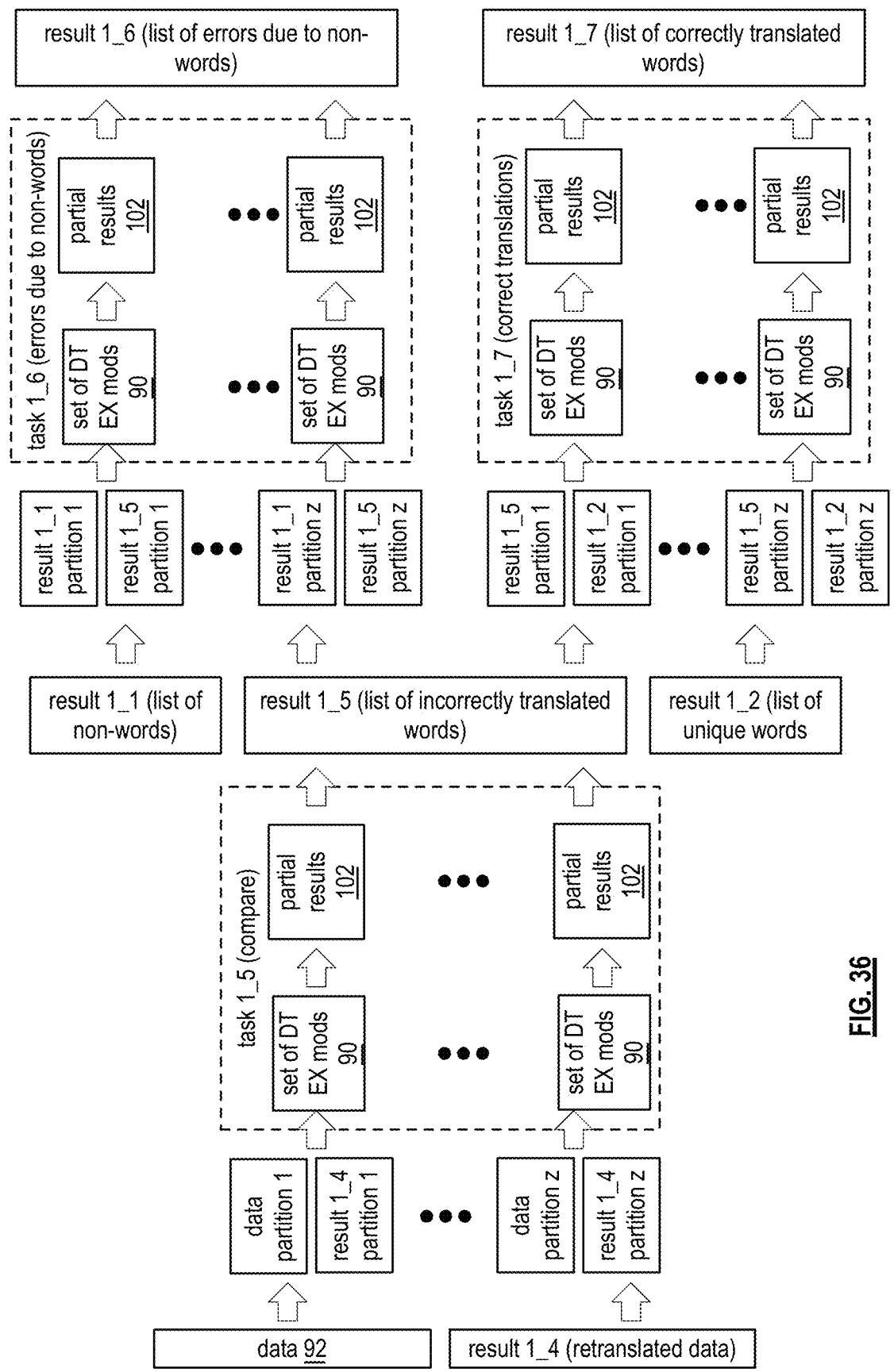

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information 244 into final results 104 for the example of FIG. 30. In this example, the result information 244 includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

FIG. 40A is a diagram illustrating an example of an index structure 350 of multiple index search structures. Each index structure relates to a particular topic, phrase, name, date, data type, etc. and includes a root index node (e.g., 1_1), one or more layers of index nodes (e.g., 2_1 through 2_3 and 3_1 through 3_5), a layer of leaf nodes (e.g., 4_1 through 4_8), and object retrieval structures (1_1 through 8_1). Each level may include any number of nodes, where a node in a level points to one or more child nodes (e.g., a node at a lower level, leaf nodes point to one or more object retrieval structures), is pointed to by one or more parent nodes (e.g., a node at a higher level; expect for a root node, it has no parent nodes), and points to one or more sibling nodes (e.g., a node at the same level; expect a root node, it has no siblings).

The number of nodes and number of levels in an index structure depends on the desired search granularity and the number of data objects that are searchable via this index structure. For example, if the index structure relates to "names" for a small company (e.g., a few hundred employees), the index structure may include a root index that is identifiable based on the search criteria "names", a single layer of index nodes, and a layer of leaf nodes. The index nodes of the single layer are identifiable based on a partitioning of the names (e.g., index node 2_1 for names that begin with letters A-C; index node 2_2 for names that begin with the letters D-G; etc.). The leaf nodes are identifiable based on a further partitioning of the names (e.g., leaf node 4_1 for names beginning with the letter A; leaf node 4_2 for names beginning with the letter B, etc.). As another example, if the index structure relates to "names" for a large company (e.g., tens of thousands of employees), the index structure may include a root index that is identifiable based on the search criteria "names", multiple layers of index nodes, and a layer of leaf nodes.

In general, nodes of the index structure 350 are traversed to identify an object retrieval structure that stores storage location information of a data object stored in a dispersed storage network (DSN) or similar (e.g., such as a distributed storage and task network (DSTN) based on search criteria (e.g., Alice Smith). The storage location includes a source name, a DSN address, and/or a set of slice names. For example, the index structure 350 is utilized to access object retrieval structure 1_1, which includes storage locations for data objects 1_1_1 through 1_1_x (e.g., data objects of Alice Smith). As another example, the index structure 350 is utilized to access object retrieval structures 3_1 through 3_y, which includes storage locations for data objects 3_1_1 through 3_1_x (e.g., data objects of Adam Jackson) up through data objects 3_y_1 through 3_y_x (e.g., data objects of Zach Jackson).

To protect the index structure from hacking and loss of data, each node may be individually dispersed storage error encoded, grouped and dispersed storage error encoded as a group of nodes, or collectively dispersed storage error encoded. The resulting encoded nodes, encoded groups of nodes, or encoded index structure is stored as one or more sets of encoded index slices in local memory, a DSN memory, and/or a distributed storage and task network (DSTN) module. For example, each node of a 100 node index structure is individually dispersed storage error encoded to produce 100 sets of encoded index slices. As another example, the nodes of the 100 node index structure are aggregated into one index file and the index file is dispersed storage error encoded to produce a set of encoded index slices. To further protect the index structure, each object retrieval structure may be individually or group dispersed storage error encoded and stored in the DSN memory.

FIG. 40B is a diagram illustrating an example of a structure of an index node 352 for an index node of the layers of index nodes (e.g., 2_1 through 2_3 and 3_1 through 3_5 of FIG. 40A). The structure includes index node information 356, sibling node information 358, and children node information 360. The index node information 356 includes an index node source name field 362, an index node revision field 364, and/or a node type field 366.

The sibling node information 358 includes a sibling node source name field 368, a sibling minimum index key field 370, and/or a sibling key type traits field 372. The children node information 360 includes one or more child node information sections 374, 376, etc. corresponding to each child node of the index node. Each child node information section includes a corresponding child node source name field 378, a corresponding child minimum index key field 380, and/or a corresponding child key type traits field 382.

The index node source name field 362 may include an index node dispersed storage network (DSN) address 354 entry (e.g., source name) corresponding to a storage location for the index node. The DSN address 354 facilitates entry to a dispersed hierarchical index when the index node is a root index node of the dispersed hierarchical index. The index node revision field 364 may include an index node revision entry corresponding to a revision number of information contained in the index node. Use of the index node revision field 364 enables generating two or more similar indexes while saving each revision of the two or more similar indexes. The node type field 366 includes a node type entry, where the node type entry indicates whether the node is a leaf node or not a leaf node. The node type indicates that the node is not a leaf node when the node is the index node.

The sibling node source name field 368 includes a sibling node source name entry (e.g., sibling node DSN address) corresponding to where a sibling node is stored in a DSN memory and/or a distributed storage and task network (DSTN) module when the index node has the sibling node as a sibling. The sibling node is another index node when the index node has the sibling. The sibling node source name field 368 may include a null entry when the index node does not have a sibling. The sibling minimum index key field 370 includes a sibling of minimum index key corresponding to the sibling node when the index node has the sibling node as the sibling. The sibling key type traits field 372 may include sibling key type traits corresponding to the sibling node when the index node has the sibling node as the sibling and when the sibling key type traits field is utilized. Alternatively, index structure metadata (e.g., part of a root index node table held in a local memory) may include key type traits utilized globally for each node of the index structure.

The index structure metadata may include one or more of key type traits to be utilized for all nodes of a corresponding index, key type traits to be utilized for all index nodes of the corresponding index, key type traits to be utilized for all leaf nodes of the corresponding index, a source name of a root node of the index structure, a maximum number of index structure levels, a minimum number of the next level structures, a maximum number of elements per index structure level, a minimum number of elements per index structure level, an index revision number, and an index name. The index structure metadata may be utilized for one or more of accessing the index, generating the index, updating the index, saving the index, deleting portions of the index, adding a portion to the index, cloning a portion of the index, and searching through the index. The index structure metadata may be stored as the root index node table in one or more of a local memory, one or more nodes of the index structure, and as encoded metadata slices in at least one of the DSTN module and the DSN memory.

The child node source name field 378 includes a child node source name entry (e.g., child node DSN address) corresponding to a storage location for the child node. For example, a child 1 node source name field 378 of a child 1 node information section 374 includes a child 1 node source name. The child minimum index key field 380 includes a child minimum index key corresponding to the child node. For example, a child 1 minimum index key field 380 of the child 1 node information section 374 includes a child 1 minimum index key. The child key type traits field 382 may include child key type traits corresponding to the child node when the index node has the child node as the child and when the child key type traits field is utilized. Alternatively, the index structure metadata may include key type traits utilized globally for each node of the index structure.

FIG. 40C is a diagram illustrating an example of a leaf node structure 384 that includes leaf node information 388, sibling node information 358, and data information 392. The leaf node information 388 includes one or more of a leaf node source name field 394, a leaf node revision field 396, and a node type field 366. The sibling node information 358 includes a sibling node source name field 368, a sibling minimum index key field 370, and a sibling key type traits field 372. Inclusion and/or use of the sibling key type traits field 372 is optional. The data information 392 includes one or more data information sections 398, 400, etc. corresponding to each metadata object associated with the leaf node. Alternatively, the data information 392 includes null information when no metadata object is presently associated with the leaf node. Each data information section of the one or more data information sections includes a corresponding DSN address of object retrieval structure 402, a corresponding data index key field 404, and a corresponding data key type traits field 406. For example, the corresponding DSN address of the object retrieval structure 402 of a data 1 node information section 398 includes an object retrieval structure 1 source name entry. Inclusion and/or use of the corresponding data key type traits field 406 is optional.

The leaf node source name field 394 may include a leaf node source name entry (e.g., leaf node distributed storage and task network (DSTN) address and/or a dispersed storage network (DSN) address) corresponding to a storage location of the leaf node. The leaf node revision field 396 may include a leaf node revision entry corresponding to a revision number of information contained in the leaf node. Use of the leaf node revision enables generating two or more similar indexes while saving each revision of the two or more similar indexes. The node type field 366 includes a node type, where the node type indicates whether the node is a leaf node or not a leaf node. The node type indicates that the node is a leaf node when the node is the leaf node.

The sibling node source name field 368 includes a sibling node source name entry (e.g., sibling node DSN address) corresponding to a storage location for a sibling when the leaf node has the sibling node as a sibling. The sibling node is another leaf node when the leaf node has the sibling. The sibling node source name field 368 may include a null entry when the leaf node does not have a sibling. The sibling minimum index key field 370 includes a minimum index key associated with the sibling node when the leaf node has the sibling node as the sibling. The sibling key type traits field 372 may include sibling key type traits corresponding to the sibling node when the leaf node has the sibling node as the sibling and when the sibling key type traits field 372 is utilized. Alternatively, index structure metadata may include key type traits utilized globally for each leaf node of the index structure.

The DSN address of object retrieval structure field 402 includes at least one of an object retrieval structure source name entry (e.g., a DSN address) corresponding to a storage location of an object retrieval structure. For example, a data 1 DSN address of object retrieval structure field 402 of a data 1 information section 398 includes a DSN address of a first object retrieval structure. As another example, the data 1 DSN address of object retrieval structure 402 of the data 1 information section includes the object retrieval structure. The data index key field 404 includes a data index key corresponding to one or more data objects associated with the object retrieval structure. For example, a data 1 index key field entry of the data 1 information section 398 includes a data 1 index key associated with a data object 1. The data key type traits field 406 may include data key type traits corresponding to the data object when the data key type traits field 406 is utilized. Alternatively, the index structure metadata may include key type traits utilized globally for each data object associated with the index structure.

FIG. 40D is a diagram illustrating another example of an index structure of an example index utilized to access data stored in at least one of a dispersed storage network (DSN) memory and a distributed storage and task network (DSTN) module. In the example, the index structure includes three leaf nodes and three index nodes. Each of the three leaf nodes and the three index nodes are individually encoded using a dispersed storage error coding function to produce a set of corresponding node slices that are stored in the DSTN module. The index structure provides an index for three object retrieval structures associated with three data objects stored in the DSTN module, where the object retrieval structures are stored in the DSTN module at storage locations associated with source names 76B, 8F6, and 92D. The example index structure is associated with global key type traits includes a comparing function to sort string type index keys alphabetically. The object retrieval structure stored at source name 76B is associated with an index key of "a" of and associated data object (e.g., data a4928) begins with a character "a". The object retrieval structure stored at source name 8F6 is associated with an index key of "d" as an associated data object (e.g., data d49ab35) begins with a character "d". The object retrieval structure stored at source name 92D is associated with an index key of "j" as an associated data object (e.g., j29ab40) begins with a character "j".

A leaf node stored at source name 5AB includes a node type indicating a leaf node, a sibling node source name pointing to a leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d". The leaf node stored at source name 539 includes a node type indicating a leaf node, a null sibling node source name (e.g., since last leaf node of leaf node level), a null sibling minimum index key, a data 1 source name of 92D, and a data 1 index key of "j".

An index node stored at source name 4F7 includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The index node stored at source name 42C includes a node type indicating not a leaf node (e.g., index node), a null sibling node source name (e.g., since last index node of an index node level), a null sibling minimum index key, a child 1 source name of 539, and a child 1 minimum index key of "j". An index node (e.g., a root node) stored at source name 2FD includes a node type indicating not a leaf node (e.g., index node), a null sibling node source name (e.g., since root node), a null sibling minimum index key, a child 1 source name of 4F7, a child 1 minimum index key of "a", a child 2 source name of 42C, and a child 2 minimum index key of "j". A search utilizing the index structure starts at source name 2FD 407 of the root index node to identify storage locations of the three data objects. An example of utilizing the index is discussed with reference to FIG. 40E.

FIG. 40E is a diagram illustrating an example of searching the index represented by the index structure of FIG. 40D. The index structure of FIG. 40 D indicated that six index nodes are stored as six index files in a distributed storage and task network (DSTN) module where the six index files correspond to the three index nodes and the three leaf nodes. The searching example includes retrieving an object retrieval structure based on a search criteria to identify a storage location of a corresponding data object associated with the object retrieval structure that is stored within the DSTN module. The retrieving includes a series of steps 409-414. Such steps includes starting the search at step 409 where a data object associated with search criteria that includes "d" is desired, a first step 410 to access a root node of the index, a second step 412 to access and search one or more index nodes to identify a leaf node corresponding to the data object, a third step 414 to obtain a DSTN address of the metadata object from the identified leaf node, and a final step to retrieve the data object from the DSTN module utilizing a DSTN address of the data object extracted from a recovered object retrieval structure. Each of the retrieving steps includes retrieving one index file of the six index files at a time based on one or more of the search criteria and a result of a preceding retrieving step. As such, a system synchronization and performance improvement is provided since only one index file of the six index files is retrieved at a given step without a need to recover all index nodes of the index structure.

In the data object retrieval example, the object retrieval structure (e.g., associated with data object d49ab35) is to be retrieved from the DSTN module using DSTN address 8F6. The search criteria includes the letter "d" as the desired data object starts with the letter "d". In a first step 410, a root node source name of 2FD is extracted from index metadata (e.g., a root index node table) associated with alphabetical searches for data content and the root node is retrieved from the DSTN module using the source name 2FD (e.g., a set of root slice names are generated using the source name 2FD, a set of read slice requests are generated that includes the set of root slice names, the set of read slice requests are output to the DSTN module, root slices are received, and the root slices are decoded using a dispersed storage error coding function to produce the root node). Next, the search attribute letter "d" is compared to minimum index key entries of the root node utilizing a comparing function to select a child 1 source name of 4F7 since "d" is greater than "a" but less than "j".

At second step 412, an index node stored at source name address 4F7 is retrieved and the letter "d" is compared to minimum index entries of the index node utilizing the comparing function to select a child 2 source name of 52D since "d" is greater than "a", greater than or equal to "d", and less than the sibling minimum index key of "j". At third step 414, a leaf node stored at source name 52D is accessed and the node type is determined to be a leaf node. When the node is the leaf node, the letter "d" is compared to index key entries of the leaf node to identify the object retrieval structure stored at source name 8F6. The object retrieval structure stored at source name 8F6 is retrieved and a DSN address 415 of the desired data object is extracted. Next, the data object (e.g., data d49ab35) is retrieved from the DSTN module using the DSN address 415 of the desired data object.

FIG. 40F is a diagram illustrating an example of an object retrieval structure 420 that includes data object information 424 and segment allocation table information 426. The object retrieval structure 420 describes one or more associated data objects stored as one or more versions in a dispersed storage and task network (DSTN), where each version shares a common data object name. The object retrieval structure is stored in the DSTN utilizing an object retrieval structure DSTN address 422. Each version of the one or more versions of the data object is stored as two or more portions in the DSTN. The data object information 424 includes common information with regards to the data objects. The segment allocation table information 426 includes information relating to the two or more portions of each of the versions.

The data object information 424 includes a data object name field 428, a data index keys field 430, and a total size of data field 432. The data object name field 428 includes the common data object name associated with all the data objects (e.g., all versions and all revisions of a version). The data index keys field 430 includes one or more data index keys associated with the data objects (e.g., providing efficient searchability using a dispersed hierarchical index), where each data index key is associated with at least one portion at least one version of the data objects. Search criteria may be utilized when searching the index structure and the object retrieval structure to locate a data object by comparing aspects of the search criteria to the data index keys. The total size of data field 432 includes a total size of data value associated with the data objects. For example, the total size data value may represent a number of bytes of a most recent version of the data objects. As another example, the total size data value represents a number of bytes of all versions of the data objects.

The segment allocation table information 426 includes version information for each of the one or more versions of the data objects. Version information 434 includes portion information 436 for each of one or more portions of the data, a version number field 437 (e.g., a unique identifier of the version), a version size field 439 (e.g., number of bytes of all the portions of the version), and a version index keys field 441. The version index keys field 441 includes data index keys associated with each portion of the version. The portion information 436 includes a portion source name field 438, a portion size field 440, a portion number of segments field 442, a segmentation method field 444, and a portion index keys field 443. The portion index keys field 443 includes data index keys associated with the portion to facilitate finding a particular desired portion of a version.

The portion source name field 438 includes a starting source name of a first segment of a sequence of one or more segments of a corresponding portion of the version of the data object. The portion size field 440 includes a portion size of the portion (e.g., total number of bytes of the portion). The portion number of segments field 442 includes a number of segments for the portion. The segmentation method field 444 includes a segmentation method identifier (e.g., fixed size segmentation, variable size segmentation, ramping size up segmentation, ramping size down segmentation, etc.).

FIG. 40G is a diagram illustrating an example of a computing device using multiple index structures to process a specific access request. To begin, the computing device receives an access request (e.g., find a picture(s) that Alice took on Wednesday). The computing device processes the access request to identify searchable criteria (or the searchable criteria could be received along with the access request). For this request, the computing device identifies "Alice", "picture", and "Wednesday" as the searchable criteria. The computing device then accesses a root index node table 450 based on the searchable criteria to identify relevant index structures (e.g., a name index structure 452, a media index structure 454, and a date structure index 456) from a plurality of index structures (only three shown).

Each of the index structures points to object retrieval structures that correspond to the search criteria. For example, the name index structure 452, based on the index key of "Alice", points to object retrieval structures 472 that include "Alice" as a key index for a data object name (e.g., my photos); the media index structure, based on the index key of "picture", points to object retrieval structures 474 that include "picture" as a key index for the same data object name; and the date index structure, based on the index key of "Wednesday", points to object retrieval structures 476 that include "Wednesday" as a key index for the same data object name. In this example, only one object retrieval structure includes all three key indexes "Alice", "picture", and "Wednesday" for the data object name of "my photos".

To identify the one object retrieval structure that includes key indexes of "Alice", "picture", and "Wednesday", each index structure 452, 454, 456 is traversed to find the leaf node, or nodes, (LFNODE) that correspond to the relevant search criteria. For example, a leaf node of the name index 452 is identified for the search criteria of Alice, a leaf node of the media index 454 is identified for the search criteria of picture, and a leaf node of the date index 456 is identified for the search criteria of Wednesday.

From each of the identified the leaf nodes, the computing device identifies a set of object retrieval structures by matching a key index with the relevant search criteria and identifying the corresponding source names for the object retrieval structures. For example, the computing device identifies a set of Alice object retrieval structures 472 based on the index key "Alice" 466, identifies a set of picture object retrieval structures 474 based on the index key "picture" 468, and identifies a set of Wednesday object retrieval structures 476 based on the index key "Wednesday" 470.

The computing device analyzes the sets of object retrieval structures to find an object retrieval structure 420 that has each of the index keys 466-470 (e.g., Alice, picture, and Wednesday), which is the shaded object retrieval structure. The computing device determines a DSN address for the highlighted object retrieval structure 420 from one of the leaf nodes that points to the highlighted object retrieval structure 420. The computing device then retrieves a set of encoded data slices based on the DSN address and decodes the slices to recover the object retrieval structure. The computing device interprets the recovered object retrieval structure to determine DSN addressing information for one or more pictures by Alice that were taken on a Wednesday.

The computing device utilizes the DSN addressing information to retrieve, for each picture, one or more sets of encoded data slices from the DSN memory. For each picture, the computing device decodes the set(s) of encoded data slices to recover the picture.

FIGS. 40H, I, and J are diagrams illustrating more examples of an object retrieval structure that includes the object retrieval structure 420 of FIG. 40F and a first version 482 and a second version 484 of data objects stored in a dispersed storage network 480. The first version 482 includes a first portion 486 and a second portion 488. Each of the portions includes one or more data segments of the data portion. For example, the first portion 486 includes segments 1_1_1 (e.g., version 1, portion 1, segment 1) through 1_1_S (e.g., version 1, portion 1, segment S) and the second portion 488 includes segments 1_2_1 (e.g., version 1, portion 2, segment 1) through 1_2_S (e.g., version 1, portion 2, segment S). The second version 484 includes a first portion 490 and a second portion 492. For example, the first portion 490 includes segments 2_1_1 (e.g., version 2, portion 1, segment 1) through 2_1_S (e.g., version 2, portion 1, segment S) and the second portion 492 includes segments 2_2_1 (e.g., version 2, portion 2, segment 1) through 2_2_S (e.g., version 2, portion 2, segment S).

FIGS. 40H, I, J further illustrates the object retrieval structure 420 of the access request for a picture of Alice from Wednesday 458 of FIG. 40F. The data object name field 428 includes an object name of myphoto and the data index keys field 430 includes data index keys of Alice, picture, and Wednesday. The FIGS. 40H, I, J further illustrates alternatives of mapping the object retrieval structure 420 to the first and second versions 482-484.

In particular, FIG. 40H illustrates a mapping example where each version is associated with a different Alice. For example, version 1 is associated with an Alice Jones and version 2 is associated with Alice Smith. The version 1 of Alice Jones includes version index keys 441 associated with version 1 information 434 includes another index key for Jones in addition to the index keys for Alice, picture, and Wednesday. The example of FIG. 40H further illustrates that all necessary portions of a version are utilized for storage of a single picture. For example, portion 1 information 436 includes a portion 1 source name 438 that points to the first portion 486 and includes portion index keys 443 of Alice, picture, Wednesday, Jones, and picture 1; and portion 2 information 436 includes a portion 2 source name 438 that points to the second portion 488 and includes portion index keys 443 of Alice, picture, Wednesday, Jones, and picture 1.

FIG. 40H further illustrates the version 2 of Alice Smith includes version index keys 441 associated with version 2 information 434 includes another index key for Smith in addition to the index keys for Alice, picture, and Wednesday. In the alternative of FIG. 40H, all necessary portions of the second version are utilized for storage of a single picture associated with Alice Smith. For example, portion 1 information 436 includes a portion 1 source name 438 that points to the first portion 490 and includes portion index keys 443 of Alice, picture, Wednesday, Smith, and picture 1; and portion 2 information 436 includes a portion 2 source name 438 that points to the second portion 492 and includes portion index keys 443 of Alice, picture, Wednesday, Smith, and picture 1.

FIG. 40I illustrates another mapping example where each version is associated with one picture of an Alice. For example, version 1 is associated with a first picture of Alice Jones and version 2 is associated with a second picture of Alice Jones. The version 1 of Alice Jones includes version index keys 441 associated with version 1 information 434 includes the index key for Jones in addition to the index keys for Alice, picture, and Wednesday. The example of FIG. 40I further illustrates that all necessary portions of a version are utilized for storage of a single picture. For example, portion 1 information 436 includes the portion 1 source name 438 that points to the first portion 486 and includes portion index keys 443 of Alice, picture, Wednesday, Jones, and picture 1; and portion 2 information 436 includes the portion 2 source name 438 that points to the second portion 488 and includes portion index keys 443 of Alice, picture, Wednesday, Jones, and picture 1.

FIG. 40I further illustrates the version 2 of Alice Jones includes version index keys 441 associated with version 2 information 434 includes the index key for Jones in addition to the index keys for Alice, picture, and Wednesday. In the alternative of FIG. 40I, all necessary portions of the second version are utilized for storage of a second picture associated with Alice Jones. For example, portion 1 information 436 includes a portion 1 source name 438 that points to the first portion 490 and includes portion index keys 443 of Alice, picture, Wednesday, Smith, and picture 2; and portion 2 information 436 includes a portion 2 source name 438 that points to the second portion 492 and includes portion index keys 443 of Alice, picture, Wednesday, Smith, and picture 2.

FIG. 40J illustrates another mapping example where each version is associated with multiple pictures of a different Alice. For example, version 1 is associated with picture 1 and picture 2 of Alice Jones and version 2 is associated with picture 1 and picture 2 of Alice Smith. The version 1 of Alice Jones includes version index keys 441 associated with version 1 information 434 includes the index key for Jones in addition to the index keys for Alice, picture, and Wednesday. The example of FIG. 40J further illustrates that each portion of each version is utilized for storage of one picture. For example, portion 1 information 436 includes the portion 1 source name 438 that points to the first portion 486 and includes portion index keys 443 of Alice, picture, Wednesday, Jones, and picture 1; and portion 2 information 436 includes the portion 2 source name 438 that points to the second portion 488 and includes portion index keys 443 of Alice, picture, Wednesday, Jones, and picture 2.

FIG. 40J further illustrates the version 2 of Alice Smith includes version index keys 441 associated with version 2 information 434 includes the index key for Smith in addition to the index keys for Alice, picture, and Wednesday. In the alternative of FIG. 40J, each portion is utilized for a different picture. For example, portion 1 information 436 includes a portion 1 source name 438 that points to the first portion 490 and includes portion index keys 443 of Alice, picture, Wednesday, Smith, and picture 1; and portion 2 information 436 includes a portion 2 source name 438 that points to the second portion 492 and includes portion index keys 443 of Alice, picture, Wednesday, Smith, and picture 2.

FIG. 40K is a diagram illustrating another example of multiple index structures that includes the root index node table 450, the name index 452, the media index 454, the data index 456, and the highlighted object retrieval structure 420 of FIG. 40G associated with a data object name of myphoto 504 as further illustrated in FIGS. 40H-J. Traversing of the indexes 452-456 produces a DSN address of object retrieval structure associated with myphoto 500 to facilitate recovery of the object retrieval structure 420 associated with the data object name of myphoto 504.

In a similar traversing of the index structures 452-456 of FIG. 40G, the access request for a picture of Alice from Wednesday 458 produces a second highlighted object retrieval structure 420 associated with a data object name of mypicture 506. For example, the root index node table 450 is accessed based on search criteria of the access request 458 to identify the DSN address of index for names 460, the DSN address of index for media 462, and the DSN address of index for dates 464. Each of the indexes 452-456 is traversed starting at the identified DSN addresses to identify leaf nodes that include entries associated with index key Alice 466, index key picture 468, an index key Wednesday 470. The entries produces a set of identified object retrieval structures that includes the highlighted object retrieval structure 420 and the second highlighted object retrieval structure 420. A first set of associated entries of the leaf nodes identify the DSN address of object retrieval structure associated with myphoto 500 and a second set of associated entries of the leaf nodes identify a DSN address of object retrieval structure associated with mypicture 502. The second highlighted object retrieval structure 420 may be recovered utilizing the DSN address of the object retrieval structure associated with my picture 502. The second highlighted object retrieval structure 420 may be utilized to gain access to portions of data objects as illustrated in FIGS. 40H,I,J.

FIG. 40L is a schematic block diagram of an embodiment of a data retrieval system that includes a computing device 510 and a dispersed storage network (DSN) 480. The DSN 480 includes a dispersed storage (DS) unit set 512. The DS unit set 512 includes a set of DS units 514. Each DS unit 514 may be DST execution unit 36. The computing device 510 includes a DS module 516 and may be a user device 14, a DST processing unit 16, or other device within the system.

The DS module 516 includes an index module 518, a retrieval object structure module 520, a version module 522, and a portion module 524.

In an example of traversing multiple index structures, the index module 518 receives a retrieval request 526 to retrieve data 528 from the DSN 480 where the retrieval requests 526 includes one or more of search criteria 527, a data object name, a pathname, a key type trait, a data index key, a user identifier, a version identifier, and a portion identifier. The index module 518 traverses multiple index structures based on the search criteria 527 to identify an object retrieval structure 420 associated with the data 528. The object retrieval structure 420 includes a data object section (e.g., data object information 424) and a data allocation table (e.g., segment allocation table information 426). The data object section includes a data object name 428 and one or more data index keys 430. The data allocation table 426 includes one or more data version records 434. A data version record 434 of the one or more data version records includes a data version identifier 437, one or more data version index keys 441, and one or more data portion records 436.

As a specific example of traversing the multiple index structures, the index module 518 interprets the search criteria 527 to identify a set of search index keys (e.g., one for each index structure such as Alice, picture, and Wednesday), identifies each index structure (e.g., matching to a corresponding search index key such as name, media, and date), and traverses each index structure (e.g., using the corresponding search index key) to identify the object retrieval structure 420. As a specific example of identifying the object retrieval structure, the index module 518, having interpreted the search criteria 527 to identify the set of search index keys, traverses the multiple index structures based on the set of search index keys to identify sets of object retrieval structures (e.g., a set for each index structure) and identifies a common object retrieval structure as the object retrieval structure 420 when the one or more data index keys of the object retrieval structure corresponds to the set of search index keys. For instance, the common object retrieval structure is associated with data index keys for Alice, picture, and Wednesday which matches the set of search index keys.

As a specific example of traversing one index structure, the index module 518 requests a set of root index slices (e.g., issuing index slice requests 532 to the DS unit set 512) and recovers a root index node of the one index structure from the set of root index slices (e.g., received as index slice responses 534 and decoded using a dispersed storage error coding function). Having recovered the root index node, a loop is entered where the index module 518 identifies a next index node of the one index structure based on the search criteria 527 from a current index node of the one index structure, where the current index node is the root index node when the loop is entered. The index module 518 requests a set of next index slices from the DSN 480 (e.g., issuing index slice request 532 for the identified next index node) and recovers the next index node from the set of next index slices (e.g., received as index slice responses 534 and decoded). The index module 518 determines whether the next index node is a leaf index node (e.g., based on a flag) and when the next index node is not the leaf index node, the loop is repeated with the next index node being the current index node. When the next index node is the leaf index node, the loop is exited. Having recovered the leaf index node, the index module 518 identifies one or more object retrieval structures to produce object retrieval structure identity 530 (e.g., a DSN address, a source name) as a set of object retrieval structures from the leaf index node based on the search criteria 527, where the one or more object retrieval structures includes the object retrieval structure 420.

In an example of recovering the object retrieval structure 420, the retrieval object structure module 520 retrieves a set of encoded data slices corresponding to the object retrieval structure from the DSN 480. As a specific example of retrieving the set of encoded data slices, the retrieval object structure module 520 determines DSN addresses for the set of encoded data slices (e.g., based on the identity of the object retrieval structure 530 such as the source name) and issues retrieval requests (e.g., data slice request 536) for the set of encoded data slices, where the retrieval requests 536 includes the DSN addresses. Having issued the retrieval requests 536, the retrieval object structure module 520 receives the set of encoded data slices from the DSN 480 (e.g., from data slice responses 538). For instance, the retrieval object structure module 520 generates a set of slice names based on the source name, generates a set of read slice requests as data slice requests 536 that includes the set of slice names, sends the set of read slice requests to the DS unit set 512, and receives the set of encoded data slices from as the slice responses 538 from the DS unit set 512 that includes at least a decode threshold number of encoded data slices. Having retrieved the set of encoded data slices, the retrieval object structure module 520 decodes the set of encoded data slices in accordance with the dispersed storage error coding function to recover the object retrieval structure 420.

In an example of identifying one of the one or more data version records, the version module 522 identifies the one data version record of the recovered object retrieval structure 420 based on the search criteria 527 to produce an identified data version record 540. As a specific example, the version module 522, having interpreted the search criteria 527 to identify the set of search index keys, identifies the one data version record 540 when the one or more data version index keys of the one data version record 540 corresponds to the set of search index keys. For instance, the one data version record 540 is associated with data version index keys for Alice, picture, and Wednesday which matches the set of search index keys.

In an example of determining DSN addressing information for at least a portion of data (e.g., data 528), the portion module 524 determines the DSN addressing information for the at least the portion of data 528 based on information of the identified data version record 540. The data version record 540 includes the data version identifier, the one or more data version index keys, and a plurality of data portion records. Each data portion record includes a data portion identifier and one or more data portion index keys. As a specific example of determining the DSN addressing information for the portion of data, the portion module 524, having interpreted the search criteria 527 to identify the set of search index keys, identifies one of the plurality of data portion records when the one or more data portion index keys of the one data portion record corresponds to the set of search index keys, where the one data portion record references the portion of the data (e.g., provides a source name and/or a DSN address of a first data segment associated with the data portion). For instance, the one data portion record is associated with data portion index keys for Alice, picture, and Wednesday which matches the set of search index keys. Having identified the one data portion record, the portion module 524 interprets the data portion identifier of the one data portion record to determine the source name for the portion of the data and converts the source name into the DSN addressing information (e.g., generates data slice names). Having converted the source name into the DSN addressing information, the portion module 524 recovers the portion of the data 528 from the DSN 480 (e.g., issues, for each data segment of the portion of the data, data portion slice requests 542 to the DS unit set 512, receives at least a decode threshold number of data portion slice responses 544 that includes encoded data slices of the data segment, decodes the received slices to reproduce the data segment).

Alternatively, or in addition to, the index module 518 may traverse the multiple index structures based on the search criteria 527 to identify a second object retrieval structure. Having identified the second object retrieval structure, the retrieval object structure module 520 retrieves a second set of encoded data slices corresponding to the second object retrieval structure from the DSN and decodes the second set of encoded data slices in accordance with the dispersed storage error coding function to recover the second object retrieval structure. Having recovered the second object retrieval structure, the version module 522 identifies a second data version record of the second recovered object retrieval structure based on the search criteria 527 to produce a second identified data version record. Having produced the second identified data version record, the portion module 524 determines second DSN addressing information for at least a portion of second data based on information of the second identified data version record.

FIG. 40M is a flowchart illustrating an example of retrieving data. The method begins at step 560 where a processing module traverses multiple index structures based on search criteria to identify an object retrieval structure. As an example of traversing, the processing module receives a data retrieval request that includes the search criteria. The processing module interprets the search criteria to identify a set of search index keys (e.g., identifying traits of the search criteria that match the index structures and trait values that of the search criteria to produce the search index keys). The processing module identifies an index structure associated with each search index key and traverses the index structure using the search index key to identify the object retrieval structure.

As a specific example of traversing the index structure, the processing module requests a set of root index slices from a dispersed storage network (DSN) using a DSN address associated with a root index node of the index structure. The processing module recovers the root index node from the set of root index slices (e.g., decodes the slices using a dispersed storage error coding function). Having recovered the root index node, the method of the processing module enters a loop where the processing module identifies a next index node of the index structure based on the search criteria from a current index node of the index structure, where the current index node is the root index node when the loop is entered. For instance, the processing module compares the search index key to minimum index keys associated with one or more child index nodes that includes the next index node and identifies a child index node as the next index node when the comparison is favorable (e.g., the search index key sorts greater than or equal to a minimum index key of the next index node and less than another minimum index key associated with another child index node that sorts next after the child index node).

Having identified the next index node, the processing module requests a set of next index slices from the DSN using a DSN address for the next index node extracted from the current index node. The processing module receives the set of next index slices and recovers the next index node (e.g., decodes at least a decode threshold number of the next index slices using the dispersed storage error coding function). The processing module determines whether the next index node is a leaf index node (e.g., inspection of a node type flag). When the next index node is not the leaf index node, the method of the processing module repeats the loop with the next index node being the current index node. When the next index node is the leaf index node, the method of the processing module exits the loop. Having determined that the recovered next index node is the leaf index node, the processing module identifies one or more object retrieval structures, that includes the object retrieval structure, from the leaf index node based on the search criteria. For instance, the search index key matches an index key of an entry of the leaf index node that corresponds to the object retrieval structure.

As another example of identifying the object retrieval structure, having interpreted the search criteria to identify the set of search index keys, the processing module traverses the multiple index structures based on the set of search index keys to identify sets of object retrieval structures (e.g., the traversing of each index structure produces a set of object retrieval structures). The processing module identifies a common object retrieval structure of the sets of object retrieval structures as the object retrieval structure when one or more data index keys of the object retrieval structure corresponds to the set of search index keys (e.g., compares favorably). For instance, traversing of a name index using a search index key=Alice produces a set of Alice object retrieval structures, traversing of a media index using a search index key=picture produces a set of picture object retrieval structures, and traversing of a date index using a search index key=Wednesday produces a set of Wednesday object retrieval structures. Next, the processing module identifies the common object retrieval structure associated with each of the sets of object retrieval structures.

The method continues at step 562 where the processing module identifies a second object retrieval structure by traversing the multiple index structures based on the search criteria. For example, the processing module identifies the second object retrieval structure when both the object retrieval structure and the second object retrieval structure corresponds to the set of search index keys and the object retrieval structure and the second object retrieval structure associated with different data object names (e.g., myphoto, mypicture).

The method continues at step 564 where the processing module retrieves a set of encoded data slices corresponding to the object retrieval structure from the DSN. For example, the processing module determines DSN addresses for the set of encoded data slices by extracting a source name for the object retrieval structure from the leaf node, generates a set of read slice requests as retrieval requests that includes a set of slice names based on the source name for the object retrieval structure, issues the set of read slice requests as retrieval requests for the set of encoded data slices, and receives the set of encoded data slices that includes at least a decode threshold number of encoded data slices.

When identifying the second object retrieval structure, the method continues at step 566 where the processing module retrieves a second set of encoded data slices corresponding to the second object retrieval structure from the DSN. The method continues at step 568 where the processing module decodes the set of encoded data slices in accordance with a dispersed storage error coding function to recover the object retrieval structure. When identifying the second object retrieval structure, the method continues at step 570 where the processing module decodes the second set of encoded data slices in accordance with the dispersed storage error coding function to recover the second object retrieval structure.

The method continues at step 572 where the processing module identifies one of one or more data version records of the recovered object retrieval structure based on the search criteria to produce an identified data version record. For example, having interpreted the search criteria to identify the set of search index keys, the processing module identifies the one data version record when one or more data version index keys of the data version record corresponds to the set of search index keys. When identifying the second object retrieval structure, the method continues at step 574 where the processing module identifies a second data version record of the second recovered object retrieval structure based on the search criteria to produce a second identified data version record.

The method continues at step 576 where the processing module determines DSN addressing information for at least a portion of data based on information of the identified data version record. The data version record includes a data version identifier, one or more data version index keys, and a plurality of data portion records. Each data portion record includes a data portion identifier (e.g., a source name of a corresponding data portion record) and one or more data portion index keys. For example, having interpreted the search criteria to identify the set of search index keys, the processing module identifies one data portion record when the one or more data portion index keys corresponds to the set of search index keys (e.g., match), where the one data portion record references the portion of the data. The processing module interprets the data portion identifier of the one of the plurality of data portion records to determine the source name for the portion of the data (e.g., extract). The processing module converts the source name into the DSN addressing information (e.g., generates slice names) utilized to recover the portion of the data from the DSN. When identifying the second object retrieval structure, the method continues at step 578 where the processing module determines second DSN addressing information for at least a portion of second data based on information of the second identified data version record utilized to recover the portion of the second data from the DSN.

FIGS. 41A, 41D, 41G, and 41J are diagrams illustrating an examples of indexing data, where the data includes a plurality of pictures taken by Alice Jones 580 and a plurality of pictures taken by Alice Smith 582 that are to be stored in a dispersed storage network (DSN). The indexing of the data utilizes multiple index structures 584 and at least one object retrieval structure 420. The multiple index structures 584 include one or more index structures such as a name index 452, a media index 454, and a date index 464. Each plurality of pictures includes a set of numbered pictures taken on a day by day basis. For example, the Alice Jones pictures 580 and the Alice Smith pictures 582 includes, at least, Tuesday pictures 1-n, Wednesday pictures 1-n, and Thursday the pictures 1-n as taken by a respective Alice. FIGS. 41A-C discuss an example of operation using one object retrieval structure 420 for both Alices; FIGS. 41D-F discuss an example of operation using a set of object retrieval structures for both Alices, where each object retrieval structure is associated with a unique picture number of all of the sets of pictures; FIGS. 41G-I discuss an example of operation using two object retrieval structures, where a first is associated with Alice Jones and a second is associated with Alice Smith; and FIGS. 41J-K discuss an example of operation using two sets of object retrieval structures, where each set of object retrieval structures is associated with one Alice, and each object retrieval structure of each set is associated with a unique day of the week.

In an example of indexing the data, a set of index keys is selected for each picture based on one or more of data creation information and an indexing approach. Values of common traits of the data are selected as the index keys in accordance with the indexing approach. The common traits may include data creation information. Data creation information includes one or more of a data identifier, a data name, a user identifier, a vault identifier, a date associated with the data, a time associated with the data, a data type indicator, a data size indicator, an owner identifier, and a data size indicator. Examples of index keys include an Alice index key, a Tuesday index key, a picture index key, a date index key, a picture number index key, a Jones index key, a Smith index key, an Alice Jones index key, an Alice Smith index key, and a data name index key (e.g., myphoto, mypicture, picture 1-n).

The indexing approach includes selecting index keys to assign to data index keys, version index keys, and portion index keys. For example, selection of the data index keys includes identifying the one or more index structures for utilization during subsequent retrieval of a picture where the multiple index structures 584 are to be utilized in the subsequent retrieval. As a specific example, the name index 452, the media index 454, and the date index 464, are identified when subsequent searching for a picture is to be accomplished using a name, a picture indicator, and a date. Having identified the one or more index structures, the data index keys may be selected, where the data index keys share a common trait with a corresponding index structure. For example, the Alice index key is selected as a data index key to be associated with the name index 452, the picture index key is selected as a data index key to be associated with the media index 454, and the Wednesday index key is selected as a data index key to be associated with the date index 464.

As an example of selecting index keys to assign to the version index keys, the Alice index key, the Alice Jones index key, and the Alice Smith index key are selected as the version index keys when the indexing approach includes associating a name with each version. As another example of selecting index keys to assign to the version index keys, the Tuesday index key, the Wednesday index key, and the Thursday index key are selected as the version index keys when the indexing approach includes associating a day with each version. As another example of selecting index keys to assign to the version index keys, the picture 1 index key through picture n index key are selected as the version index keys when the indexing approach includes associating a picture number with each version.

As an example of selecting index keys to assign to the portion index keys, the Tuesday index key, the Wednesday index key, the Thursday index key, and the picture 1-N index keys are selected as the portion index keys when the indexing approach includes the associating the name with each version and a different picture (e.g., by picture number or day) for each portion. As another example of selecting index keys to assign to the portion index keys, the picture 1-N index keys, the Alice index key, the Alice Jones index key, and the Alice Smith index key are selected as the portion index keys when the indexing approach includes associating a day with each version and a different picture from a different Alice for each portion. As yet another example of selecting index keys to assign to the portion index keys, the picture 1-N index keys are selected as the portion index keys when the indexing approach includes associating a day with each version and a different picture from a common Alice for each portion. As a still further example of selecting index keys to assign to the portion index keys, the Tuesday index key, the Wednesday index key, and the Thursday index key are selected as the portion index keys when the indexing approach includes associating a picture number with each version and a day with each portion from a common Alice. As yet a still further example of selecting index keys to assign to the portion index keys, the Tuesday index key, and the picture 1-n index keys are selected as the portion index keys when the indexing approach includes associating a date with each version and a different picture number from a common Alice for each portion.

Each object retrieval structure 420 is associated with a unique data object name. As such, each picture file is associated with a corresponding object retrieval structure 420 based on a data object name of the picture file. All pictures are generated with a common data object name when one object retrieval structure 420 is utilized. For example, FIG. 41A illustrates utilization of a common data object name myphoto 504 for all of the picture files to be associated with the single object retrieval structure 420.

FIGS. 41B-C are diagrams illustrating more examples of an object retrieval structure 420. The structures relate to the example of indexing data of FIG. 41A where one object retrieval structure 420 is associated with a plurality of pictures that share a common data object name of myphoto. FIGS. 41B-C illustrate associating index keys of the plurality of pictures with data index keys 430, version index keys 441, and portion index keys 443 in accordance with an indexing approach. The data index keys 430 includes an aggregation of index keys associated with the pictures such as a myphoto index key (e.g., the common data object name), an Alice index key, an Alice Jones index key, an Alice Smith index key, a Ted Jackson index key, a Tuesday index key, a Wednesday index key, a Thursday index key, and pictures 1-n index keys.

In particular, FIG. 41B illustrates an indexing approach where the object retrieval structure 420 associates each version with a unique name and associates each portion of each version with a different picture number. For example, version 1 is associated with Alice Jones, version 2 is associated with Alice Smith, version 3 is associated with Ted Jackson, and each version associates portion 1 with picture 1, portion 2 with picture 2 etc. The version index keys 441 include the Alice index key, the Alice Jones index key, the Alice Smith index key, and the Ted Jackson index key. The portion index keys 443 include the Tuesday index key, the Wednesday index key, the Thursday index key, and the pictures 1-n index keys.

FIG. 41C illustrates an indexing approach where the object retrieval structure 420 associates each version with a unique day and associates each portion of each version with a different picture number and name. For example, version 1 is associated with Tuesday, version 2 is associated with Wednesday, version 3 is associated with Thursday, and each version associates portion 1 with picture 1 from Alice Jones, portion 2 with picture 2 from Alice Jones through portion n with picture n from Alice Jones, portion n+1 with picture 1 from Alice Smith through portion 2n with picture n from Alice Smith. The version index keys 441 include the Tuesday index key, the Wednesday index key, and the Thursday index key. The portion index keys 443 include the pictures 1-n index keys, the Alice index key, the Alice Jones index key, the Alice Smith index key, and the Ted Jackson index key.

FIG. 41D illustrates another example of indexing data where common picture numbers are utilized to form data object names for the Alice Jones pictures 580 and the Alice Smith pictures 582. For example, Tuesday-Thursday picture 1's from Alice Jones are associated with data object name of picture 1 504 through Tuesday-Thursday picture n's from Alice Jones are associated with data object name of picture 1 504 and Tuesday-Thursday picture 1's from Alice Smith are associated with data object name of picture 1 504 through Tuesday-Thursday picture n's from Alice Smith are associated with data object name of picture 1 504. Each object retrieval structure 420 is associated with a unique data object name. For example, pictures of the data object name picture 1 504 are associated with a first object retrieval structure 420 through pictures of the data object name n 504 are associated with a nth object retrieval structure 420.

FIGS. 41E-F are diagrams illustrating more examples of an object retrieval structure 420. The structures relate to the example of indexing data of FIG. 41D where a set of n object retrieval structures 420 are associated with a plurality of pictures that share a common data object name by object retrieval structure (e.g., picture 1 through picture n). FIGS. 41E-F illustrate one object retrieval structure 420 (e.g., that are associated with object name picture 1) of the set of object retrieval structures indicating an association of index keys of the plurality of pictures with data index keys 430, version index keys 441, and portion index keys 443 in accordance with an indexing approach. The data index keys 430 includes an aggregation of index keys associated with the pictures such as a picture 1 index key (e.g., the common data object name), an Alice index key, an Alice Jones index key, an Alice Smith index key, a Ted Jackson index key, a Tuesday index key, a Wednesday index key, and a Thursday index key.

In particular, FIG. 41E illustrates an indexing approach where the object retrieval structure 420 associates each version with a unique name and associates each portion of each version with a different picture by day but with a common picture number of the object retrieval structure 420. For example, version 1 is associated with picture 1's of any day from Alice Jones, version 2 is associated with picture 1's of any day from Alice Smith, and version 3 is associated with picture 1's of any day from Ted Jackson. The version index keys 441 include the Alice index key, the Alice Jones index key, the Alice Smith index key, and the Ted Jackson index key. The portion index keys 443 include the Tuesday index key, the Wednesday index key, the Thursday index key, and the pictures 1 index key.

FIG. 41F illustrates another indexing approach where the object retrieval structure 420 associates each version with a unique day and associates each portion of each version with a common picture number from any name. For example, version 1 is associated with Tuesday, version 2 is associated with Wednesday, version 3 is associated with Thursday, and each version associates each portion with a picture 1 from any name. The version index keys 441 include the Tuesday index key, the Wednesday index key, and the Thursday index key. The portion index keys 443 includes the picture 1 index key, the Alice index key, the Alice Jones index key, the Alice Smith index key, and the Ted Jackson index key.

FIG. 41G illustrates another example of indexing data where common names are utilized to form data object names for the Alice Jones pictures 580 and the Alice Smith pictures 582. For example, all pictures from Alice Jones 580 are associated with data object name of Alice Jones pic 504 and all pictures 582 from Alice Smith are associated with data object name of Alice Smith pic 504. Each object retrieval structure 420 is associated with a unique data object name. For example, pictures of the data object name Alice Jones pic 504 are associated with a first object retrieval structure 420 and pictures of data object name Alice Smith pic 504 are associated with a second object retrieval structure 420.

FIGS. 41H-I are diagrams illustrating more examples of an object retrieval structure 420. The structures relate to the example of indexing data of FIG. 41G where a first object retrieval structure 420 is associated with the plurality of pictures that share the common data object name of Alice Jones pic and the second object retrieval structure 420 is associated with the plurality of pictures that share a common data object name of Alice Smith pic. FIGS. 41H-I illustrate the first object retrieval structure 420 (e.g., that associated with object name Alice Jones pic) indicating an association of index keys of the plurality of pictures of Alice Jones 580 with data index keys 430, version index keys 441, and portion index keys 443 in accordance with an indexing approach. The data index keys 430 includes an aggregation of index keys associated with the plurality of pictures such as pictures 1-n index keys, an Alice index key, an Alice Jones index key, a Tuesday index key, a Wednesday index key, and a Thursday index key.

In particular, FIG. 41H illustrates an indexing approach where the object retrieval structure 420 associates each version with a unique day and associates each portion of each version with a different picture number by day. For example, version 1 is associated with Tuesday, version 2 is associated with Wednesday, and version 3 is associated with Thursday. The version index keys 441 include the Tuesday index key, the Wednesday index key, and the Thursday index key. The portion index keys 443 include the pictures 1-n index keys.

FIG. 41I illustrates another indexing approach where the object retrieval structure 420 associates each version with a unique picture number and associates each portion of each version with a different day. All portions and versions are associated with Alice Jones. For example, version 1 is associated with picture 1, version 2 is associated with picture 2, version 3 is associated with picture 3, through version n is associated with picture n. The version index keys 441 includes the pictures 1-n index keys. The portion index key 443 includes the Tuesday index key, the Wednesday index key, and the Thursday index key.

FIG. 41J illustrates another example of indexing data where names and days are utilized to form data object names for the Alice Jones pictures 580 and the Alice Smith pictures 582. For example, all Tuesday pictures 1-n from Alice Jones are associated with data object name of Alice Jones Tue pic 504 through all Thursday pictures 1-n from Alice Jones are associated with data object name of Alice Jones Thur pic 504 and all Tuesday pictures 1-n from Alice Smith are associated with data object name of Alice Smith Tue pic 504 through all Thursday pictures 1-n from Alice Smith are associated with data object name of Alice Smith Thur pic 504. Each object retrieval structure 420 is associated with a unique day of week for each Alice providing seven object retrieval structures for each Alice for a total of 14 object retrieval structures. For example, pictures of the data object name Alice Jones Tue pic 504 are associated with a third object retrieval structure 420, pictures of the data object name Alice Jones Thur pic 504 are associated with a fifth object retrieval structure 420, pictures of the data object name Alice Smith Tue pic 504 are associated with a tenth object retrieval structure 420, pictures of the data object name Alice Smith Thur pic 504 are associated with a twelfth object retrieval structure 420.

FIG. 41K is a diagram illustrating more examples of an object retrieval structure 420. The structures relate to the example of indexing data of FIG. 41J where a data object retrieval structure is associated with each day of the week for each Alice. FIG. 41K illustrate the third object retrieval structure 420 (e.g., that associated with object name Alice Jones Tue pic) indicating an association of index keys of the plurality of pictures of Alice Jones 580 with data index keys 430, version index keys 441, and portion index keys 443 in accordance with an indexing approach. The data index keys 430 includes an aggregation of index keys associated with the plurality of pictures such as pictures 1-n index keys, the Alice index key, the Alice Jones index key, an Alice Jones Tue pic index key, the Tuesday index key, and Tuesday dates index keys (e.g., Jun. 4, 2013, Jun. 11, 2013, Jun. 18, 2013).

In particular, FIG. 41K illustrates an indexing approach where the object retrieval structure 420 associates each version with a unique date that is a Tuesday and associates each portion of each version with a different picture number for the Tuesdays. For example, version 1 is associated with Tuesday Jun. 4, 2013, version 2 is associated with Tuesday Jun. 11, 2013, and version 3 is associated with Tuesday Jun. 18, 2013. The version index keys 441 include the Tuesday dates index keys, and the Alice Jones index key. The portion index keys 443 include the Tuesday index key and the pictures 1-n index keys.

FIG. 41L is a diagram illustrating an example of data partitioning that includes a first version 586, a second version 588, a first picture 598 (e.g., associated with first picture index keys 592), and a second picture 600 (e.g., associated with second picture index keys 592). The first picture 598 and the second picture 600 are associated with the data object name my photo 504. The first version 586 includes a first portion 594 through a last portion 596. The second version 588 includes the first portion 594 through the last portion 596. The first portion 594 includes a set of data segments, where a first portion of the first picture 598 or of the second picture 600 is segmented in accordance with a segmentation scheme to produce the set of data segments. The last portion 596 includes another set of data segments, where a last portion of the first picture 598 or of the second picture 600 is segmented in accordance with the segmentation scheme to produce the other set of data segments.

The first picture data index keys 592 includes the Alice index key, the picture index key, the Wednesday index key, and the Jones index key. The first picture 598 and the second picture 600 are assigned the data object name of my photo 504 and are partitioned in accordance with an indexing scheme where each picture utilizes all portions of a version. A number of portions may be based on one or more of a predetermination, a size of the picture, a processing resource availability level, and a storage resource availability level. For example, three portions may be selected when three segmenting and encoding resources are available to facilitate parallel processing for a system improvement that includes lowering storage latency. A number of segments may be selected based on one or more of a predetermination, a desired segment size, a size of the portion, the processing resource availability level, and the storage resource availability level. For example, ten segments are selected when the first portion is 1 MB and the desired segment sizes 100 kB.

FIG. 41M is a diagram illustrating another example of data partitioning that includes a first version 602, a first picture 598 (e.g., associated with first picture index keys 592), and a second picture 600 (e.g., associated with second picture index keys 592). The first picture 598 and the second picture 600 are associated with the data object name my photo 504. The first version 602 includes a first portion 604 and a second portion 606. The first portion 604 includes a set of data segments, where the first picture 598 is associated with the first portion 604. The second portion 606 includes another set of data segments, where the second picture 600 is associated with the second portion 606. Each of the first portion 604 and the second portion 606 are produced by segmenting each of the first picture 598 and the second picture 600 in accordance with the segmentation scheme to produce each set of corresponding data segments.

The first picture 598 and the second picture 600 are assigned the data object name of my photo 504 and are partitioned in accordance with another indexing scheme where each picture utilizes a unique portion. A number of segments may be selected based on one or more of the predetermination, the desired segment size, a size of the portion (e.g., picture), the processing resource availability level, and the storage resource availability level. For example, 50 segments are selected when the first picture 598 is 5 MB and the desired segment sizes 100 kB.

FIG. 41N is a diagram illustrating another example of indexing data that includes the root index node table 450 of FIG. 40G, an object name index 608, an object retrieval structure 420, a first picture data index keys 592 associated with the object retrieval structure 420, and a dispersed storage network 480. The DSN 480 includes storage of at least a first version 586 of FIG. 41L where the first picture of FIG. 41L is stored at least in the first portion 594 and perhaps through the last portion 596 in accordance with an indexing approach where a picture is associated with one or more portions of a version as discussed with reference to FIGS. 41L-M. The object retrieval structure 420 is generated to include the DSN addressing information of the utilized portions from the first portion 594 through the last portion 596 and to include the first picture data index keys 592 (e.g., Alice, picture, Wednesday, Alice Jones).

The object name index 608 is utilized to determine whether the object retrieval structure 420 exists prior to storage of picture 1. The root index node table 450 is accessed using an access request that indicates the object name 504 is my photo to identify a DSN address of an index for object names 616 (e.g., DSN address of a root index node of the object name index 608 is extracted from the root index node table 450. The object name index 608 is traversed by entering at the root index node (e.g., accessing using the DSN address of the index for object name 616) and searching for a leaf node that includes an entry that includes my photo. An indication is provided that the object retrieval structure 420 exists for the my photo data object name when the entry that includes my photo is identified. The object retrieval structure 420 is updated to include the DSN addressing information of the first version 586 when the object retrieval structure 420 already exists. When the object retrieval structure 420 does not exist, a new object retrieval structure 420 is generated and updated with the DSN addressing information of the first version 586. Next, the entry of the leaf node of the object name index 608 that corresponds to the object retrieval structure 420 is updated to include the DSN address of the object retrieval structure associated with my photo 500 and an index key of my photo 614.

FIGS. 41P-Q are diagrams illustrating more examples of the object retrieval structure 420 and the DSN 480 of FIG. 41N where the first picture 598 is either stored in all portions of a version or is stored in one portion of a version. The object retrieval structure 420 includes a data object name 428 of my photo and data index keys 430 that includes the Alice index key, the picture index key, and the Wednesday index key.

FIG. 41P illustrates the first picture 598 stored as all portions 594-596 of the first version 586 in the DSN 480. The version 1 information 434 of the object retrieval structure 420 includes version index keys 441 of Alice, picture, Wednesday, and Alice Jones. The portion 1 information 436 includes a portion 1 source name 438 that includes a source name corresponding to a storage location of the first portion 594 in the DSN 480. The portion 1 information 436 further includes portion index keys 443 including Alice, picture, Wednesday, Alice Jones, and picture 1. Each portion contains similar information through the last portion information 436 that includes a source name 438 for the last portion stored in the last portion 596 of the DSN 480. The last portion information 436 further includes portion index keys 443 of Alice, picture, Wednesday, Alice Jones, and picture 1.

FIG. 41Q illustrates the first picture 598 stored as one portion 604 of the first version 602 in the DSN 480. The version 1 information 434 of the object retrieval structure 420 includes version index keys 441 of Alice, picture, Wednesday, and Alice Jones. The portion 1 information 436 includes a portion 1 source name 438 that includes a source name corresponding to a storage location of the first portion 604 in the DSN 480. The portion 1 information 436 further includes portion index keys 443 including Alice, picture, Wednesday, Alice Jones, and picture 1.

FIG. 40R is a diagram illustrating another example of multiple index structures associated with the object retrieval structure 420 of FIG. 41N that includes the root index node table 450 of FIG. 41N, the name index 452, the media index 454, and the data index 456 all of FIG. 40G. The access request 458 of FIG. 40G that includes the request for the picture of Alice from Wednesday is utilized to access the root index node table 450 extract the DSN address of index for names 460, the DSN address of index for media 462, and the DSN address of index for dates 464. The name index 452 is accessed using the DSN address of index for names 460 where the name index 452 is traversed to identify the leaf node associated with the Alice index key 466. The media index 454 is accessed using the DSN address of index for media 462 to identify the leaf node associated with the picture index key 468. The date index 456 is accessed using the DSN address of index for dates 464 to identify the leaf node associated with the Wednesday index key 470. Each leaf node is updated to include a new entry that includes a corresponding index key and the DSN address of the object retrieval structure associated with my photo 500. For example, the leaf node of the name index 452 is updated to include the Alice index key 466 and the DSN address of the object retrieval structure associated with my photo 500, the leaf node of media index 454 is updated to include the picture index key 468 and the DSN address of the object retrieval structure associated with my photo 500, and the leaf node of date index 456 is updated to include the Wednesday index key 470 and the DSN address of the object retrieval structure associated with my photo 500.

FIG. 41S is a schematic block diagram of an embodiment of a data storage system that includes a computing device 620 and a dispersed storage network (DSN) 480. The DSN 480 includes a dispersed storage (DS) unit set 512. The DS unit set 512 includes a set of DS units 514. Each DS unit 514 may be DST execution unit 36. The computing device 620 includes a DS module 622 and may be a user device 14, a DST processing unit 16, or other device within the system.

The DS module 622 includes a store data module 624, a search index module 626, and an update object retrieval structure module 628.

In an example of storing data 630, the store data module 624 stores the data 630 in the DSN 480. The data 630 includes a data object name 632 and one or more data portions. The data may include at least one of a file, a plurality of files, and streaming data. The file is divided into the one or more data portions when the data includes the file. For example, the file includes a book where the one or more data portions corresponds to chapters of the book. As another example, the file includes a movie where the one or more data portions corresponds to chapters and/or scenes of the movie. A file of the plurality of files corresponds to one of the one or more data portions when the data includes the plurality of files. Examples of files includes one or more of an audio file, a video file, a photo file, an email file, a text file, and any other file that includes data. A time segment of the streaming data corresponds to the one or more data portions when the file includes the streaming data.

The data 630 is associated with a set of data index keys 634 (e.g., one or more). Each data portion includes a data portion identifier (ID) and is associated with a set of portion index keys and with a version index key. Values of common traits of the data are represented by the set of data index keys 634, at least one value of a trait of a version of the data is represented by the version index key, and values of common traits of the data portion is represented by set of portion index keys.

In an example of determining the version index key and the set of portion index keys, the store data module 624 obtains data creation information regarding the data 630. For example, the store data module 624 receives the data creation information which includes one or more of a user identifier, a vault identifier, a date associated with the data, a time associated with the data, a data type indicator, a data size indicator, an owner identifier, and a data size indicator. Having obtained the data creation information, the store data module 624 determines the version index key and the set of portion index keys based on the data creation information. For example, the store data module 624 generates the version index key to indicate Alice Jones when the owner identifier identifies Alice Jones as an owner. As another example, the store data module 624 generates a set of portion index keys to include a Wednesday index key, an Alice index key, an Alice Jones index key, and a picture index key when the date associated with the data is Wednesday, the owner identifier identifies Alice Jones as the owner, and the data type indicator indicates a picture.

In an example of determining the set of data index keys, the store data module 624 determines the set of data index keys based on attributes of the data. As a specific example, the store data module 624 identifies traits as attributes of the data 630 (e.g., for all data portions), identifies an index structure associated with each trait, and identifies a value of a corresponding trait of each of the indexes as a data index key. As another specific example, the store data module 624 aggregates each set of portion index keys for all data portions of the data 630 to produce the set of data index keys. As a specific example of storing the data 630, the store data module 624 encodes the data portion in accordance with a dispersed storage error encoding function to produce encoded data record slices 636. The encoding may include segmenting the data portion to produce a set of sequential data segments and encoding each data segment to produce a corresponding set of encoded data record slices 636. The store data module 624 sends the encoded data record slices 636 to the DS unit set 512 for storage. For instance, the store data module 624 generates a new DSN address for each sequential data segment starting with a source name of a first data segment, generating write slice requests that includes the encoded data record slices with reference to the DSN address of each segment, and sending the write slice requests to the DS unit set 512. Having stored the data record slices 636 in the DSN 480, the store data module 624 equates the data portion identifier to the reference to the DSN address. For example, the store data module 624 establishes at least one of the source name of the first data segment of the set of sequential data segments and a DSN address for each data segment as the data portion identifier associated with the data portion.

In an example of traversing a plurality of index structures, the search index module 626 traverses, based on the set of data index keys 634, the plurality of index structures of a searching index structure to determine whether an object retrieval structure 420 exists for the data object name (e.g., object retrieval structure 420 that includes the data object name of the data 630). The object retrieval structure 420 includes a data object section and data allocation table, where the data object section includes the data object name and one or more data index keys. The data allocation table includes one or more data version records, where a data version record includes a data version identifier, one or more data version index keys, and one or more data portion records. A data portion record includes a data portion identifier and one or more data portion index keys.

As a specific example of traversing, the search index module 626 identifies the plurality of index structures based on the set of data index keys 634 (e.g., substantially matching trait types). For each index structure, the search index module 626 traverses the index structure using a corresponding data index key of the set of data index keys 634 to attempt to identify a leaf node with an entry linking to the object retrieval structure 420 that corresponds to the data index key. For instance, the search index module 626 recovers index slices 638 from the DSN 480 associated with one or more index nodes traversed on a path from a root index node to the leaf index node. When the object retrieval structure 420 exists, the search index module 626 provides object retrieval identity 530 and the object retrieval structure 420. When the object retrieval structure 420 does not exist, the search index module 626 provides an indication that the object retrieval structure 420 does not exist (e.g., a null value for object retrieval structure identity 530).

An example of creating a new data portion record for the data portion, when the object retrieval structure 420 exists, the update object retrieval structure module 628 updates the object retrieval structure 420 by determining whether a version record exists that corresponds to the version index key (e.g., by attempting to match the version index key to version index keys of versions already stored in the DSN 480 as indicated by a the object retrieval structure 420). When the version record exists, update object retrieval structure module 628 creates, within the version record, a new data portion record for the data portion to include an identifier of the data portion (e.g., the base source name of the set of sequential data segments) and the set of portion index keys.

Another example of creating the new data portion record for the data portion, when the version record does not exist (e.g., and the object retrieval structure 420 exists), the update object retrieval structure module 628 creates, within the object retrieval structure, a new version record based on the version index key (e.g., generate the new version record to include the version index key). Having created the new version record, the update object retrieval structure module 628 creates, within the new version record, the new data portion record for the data portion to include the identifier of the data portion and the set of portion index keys. The update object retrieval structure module 628 updates, for the object retrieval structure, the one or more data version index keys to include the version index key. For example, the update object retrieval structure module 628 includes the version index keys in the field of data index keys of the object retrieval structure.

An another example of creating the new data portion record for the data portion, when the object retrieval structure 420 does not exist, the update object retrieval structure module 628 creates a new object retrieval structure based on the set of data index keys. For instance, the update object retrieval structure module 628 includes the set of data index keys and includes the data object name (e.g., which is new). The update object retrieval structure module 628 creates, within the new object retrieval structure, a new version record based on the version index key (e.g., to include the version index key). Having created the new version record, the update object retrieval structure module 628 creates within the new version record, the new data portion record for the data portion to include the identifier of the data portion and the set of portion index keys. When storing a second data portion of the one or more data portions, the update object retrieval structure module 628 creates, within the version record, a second new data portion record for the second data portion to include a second identifier of the second data portion and a second set of portion index keys.

Having created the new object retrieval structure, the update object retrieval structure module 628 encodes the new object retrieval structure in accordance with the dispersed storage error encoding function to produce a set of encoded retrieval structure slices 640. The update object retrieval structure module 628 stores, with reference to a DSN address of the new object retrieval structure, the set of encoded retrieval structure slices 640 in the DSN 480. As a specific example, the update object retrieval structure module 628 generates the DSN address of the new object retrieval structure and issues write slice requests to the DSN 480 that includes the retrieval structure slices 640 and slice names based on the DSN address of the new object retrieval structure. Having stored the retrieval structure slices 640, the update object retrieval structure module 628 links the new object retrieval structure into the searching index structure based on at least one of the set of data index keys 634 and the reference to the DSN address of the new object retrieval structure. For example, the update object retrieval structure module 628 stores the DSN address of the new object retrieval structure in an entry of each index structure of the searching index structure along with an associated data index key that corresponds to the index structure. For instance, the update object retrieval structure module 628 stores the DSN address of the new object retrieval structure and a data index key of Alice in a name index structure.

FIG. 41T is a flowchart illustrating an example of storing data to add an index into a searching index structure. The method begins at step 646 where a processing module stores data in a dispersed storage network (DSN), where the data includes a data object name and one or more data portions. The data is associated with a set of data index keys (e.g., one or more). A data portion of the one or more data portions includes a data portion identifier (ID) and is associated with a set of portion index keys and with a version index key. The data may include a plurality of files, where a file of the plurality of files corresponds to one of the one or more data portions. The data may further include a file, where the file is divided into the one or more portions. The data may still further include streaming data, where a time segment of the streaming data corresponds to the one of the one or more data portions.

As an example of storing, the processing module may determine the version index key and the set of portion index keys. As a specific example, processing module obtains data creation information regarding the data and determines at least one of the version index key and the set of portion index keys based on the data creation information. As yet another example of storing, the processing module encodes the data portion in accordance with a dispersed storage error encoding function to produce encoded data record slices; stores, with reference to a DSN address, the encoded data record slices in the DSN; and equates the data portion identifier to the reference to the DSN address. As a still further example of storing, the processing module determines the set of data index keys based on attributes of the data (e.g., identify traits, identify indexes, generate data index keys as values of the traits).

The method continues at step 648 where the processing module traverses, based on the set of data index keys, a plurality of index structures of a searching index structure to determine whether an object retrieval structure exists for the data object name. The object retrieval structure includes a data object section and data allocation table. The data object section includes the data object name and one or more data index keys. The data allocation table includes one or more data version records. Each data version record includes a data version identifier, one or more data version index keys, and one or more data portion records. Each data portion record includes a data portion identifier and one or more data portion index keys. The processing module indicates that the object retrieval structure exists when an entry of an index structure indicates that the data object retrieval structure includes the data object name. The method branches to step 660 when the object retrieval structure does not exist. The method continues to step 650 when the object retrieval structure exists.

When object retrieval structure exists, the method continues at step 650 where the processing module updates the object retrieval structure by determining whether a version record exists that corresponds to the version index key (e.g., the version index key substantially matches a version index key of the object retrieval structure). The method branches to step 654 when the version record does not exist. The method continues to step 652 when the version record exists.

When the version record exists, the method continues at step 652 where the processing module creates, within the version record, a new data portion record for the data portion to include an identifier of the data portion (e.g., a storage location) and the set of portion index keys. Alternatively, or in addition to, when creating the new data portion, the processing module may create, within the version record, a second new data portion record for a second data portion of the one or more data portions to include a second identifier of the second data portion and a second set of portion index keys. The method branches to step 658.

When the version record does not exist, the method continues at step 654 where the processing module creates, within the object retrieval structure, a new version record based on the version index key (e.g., to include the version index key). The method continues at step 656 where the processing module creates, within the new version record, the new data portion record for the data portion to include the identifier of the data portion and the set of portion index keys. The method continues at step 658 where the processing module updates, for the object retrieval structure, the one or more data version index keys to include the version index key (e.g., include the version index keys in a field of data index keys of the object retrieval structure).

When the object retrieval structure does not exist, the method continues at step 660 where the processing module creates a new object retrieval structure based on the set of data index keys (e.g., include the set of data index keys, include the data object name which is new). The method continues at step 662 where the processing module creates, within the new object retrieval structure, a new version record based on the version index key (e.g., to include the version index key). The method continues at step 664 where the processing module creates, within the new version record, the new data portion record for the data portion to include the identifier of the data portion and the set of portion index keys.

The method continues at step 666 where the processing module encodes the new object retrieval structure in accordance with a dispersed storage error encoding function to produce a set of encoded retrieval structure slices. The method continues at step 668 where the processing module stores, with reference to a DSN address of the new object retrieval structure, the set of encoded retrieval structure slices in the DSN. The processing module generates the DSN address of the new object retrieval structure. The method continues at step 670 where the processing module links the new object retrieval structure into the searching index structure based on at least one of the set of data index keys and the reference to the DSN address of the new object retrieval structure. For example, for each index structure, the processing module stores the DSN address of the new object retrieval structure and an associated data index key in an entry of the index structure.

FIG. 42 is a flowchart illustrating an example of accessing data. The method begins at step 676 where a processing module (e.g., of a distributed storage and task (DST) client module) identifies two or more data descriptors associated with a data object stored in a dispersed storage and task network (DSTN). A data descriptor includes at least one of a filename, and owner, a creation date, a date identifier, a data type, a data size, a key word, and a data expiration timeframe. The identifying includes at least one of receiving, analyzing the data object, a query, a predetermination, and a lookup.

For each data descriptor, the method continues at step 678 where the processing module identifies a corresponding data index key and an associated index. The identifying includes identifying the data index key and associated index based on a data descriptor type and a key type trait associated with an index. For example, the processing module identifies an index associated with last names when the data descriptor is associated with a last name key type trait.

For each data descriptor, the method continues at step 680 where the processing module accesses the associated index utilizing the identified corresponding data index key to retrieve a set of source names corresponding to one or more data objects associated with the DSTN. The set of source names may include any number of source names (e.g., 0 or more). For example, the processing module searches the associated index utilizing a data index key of "C" to retrieve any source names corresponding to one or more data objects associated with a last name starting with "C".

The method continues at step 682 where the processing module identifies source names common each data descriptor of the two or more data descriptors to produce a superset of source names. The superset includes source names of data objects where each data descriptor matches a corresponding data index key associated with each source name. For example, the processing module identifies source names common to a last name an index key of "C" from a first index and a first name data index key of "A" from a second index. In addition, the processing module may access the DSTN utilizing the superset of source names to retrieve a superset of data objects.

FIG. 43 is a flowchart illustrating another example of storing data. The method begins at step 684 where a processing module (e.g., of a distributed storage and task (DST) client module) receives a request to store a data object in a dispersed storage and task network (DSTN). The method continues at step 686 where the processing module transforms a data name of the data object utilizing a deterministic function to produce a source name to be associated with the data object. The association includes one of the source name corresponding to direct access of slices of the data object and access of slices of a metadata object of the data object, where the metadata object includes a source name of slices of the data object. The deterministic function includes at least one of a hashing function, a hash-based message authentication code (HMAC) function, and a mask generating function (MGF). The transforming may include preprocessing the data name (e.g., changing alphanumeric characters to all lowercase). In an example of transforming, the processing module utilizes the hashing function on the data name to generate a deterministic object number. Next, the processing module generates the source name to include a vault identifier associated with a requesting entity of the request and the deterministic object number.

The method continues at step 688 where the processing module generates data information for an index that includes at least one of the source name, a data index key, and key type traits. The generating includes generating the data index key based on the data object. The method continues at step 690 where the processing module updates a corresponding leaf node of the index to include the date information. For example, the processing module appends the data information to the leaf node.

Subsequent retrieval of the data update includes transforming the data name utilizing the deterministic function to reproduce the source name and accessing the DSTN utilizing the reproduced source name to directly retrieve the data object or indirectly retrieve the data object by retrieving the metadata object, extracting a source name associated with the data object, and retrieving the data object utilizing the source name associated with the data object. Such utilizing of the index enables rapid storing of the data object and subsequent listing of the index (e.g., summarizing index entries).

FIG. 44 is a flowchart illustrating another example of storing data, which include similar steps to FIG. 43. The method begins with step 684 of FIG. 43 where a processing module (e.g., of a distributed storage and task (DST) client module) receives a request to store a data object in a dispersed storage and task network (DSTN). The method continues at step 692 where the processing module identifies a vault associated with the data object. The identifying may be based on one or more of a requesting entity identifier (ID), a registry lookup utilizing the requesting entity ID, and extracting the vault ID from the request.

The method continues at step 694 where the processing module transforms a data name of the data object utilizing a deterministic function to produce a source name for a metadata object of the data object. The transforming includes applying the deterministic function to the data name to generate an object number of the source name. The deterministic function includes at least one of a hashing function, a hash-based message authentication code (HMAC) function, and a mask generating function (MGF). The transforming may include preprocessing the data name (e.g., translating a language of the request to a second language). The transforming further includes generating a generation ID, wherein a small percentage (e.g., 5%) of source names associated with a set of generation IDs are utilized for metadata objects and remaining source names are utilized for data objects. The transforming further includes generating the source name to include the vault ID, the generation ID, and the object number. As an example of transforming, the processing module utilizes the MGF on the data name to generate the object number, identifies the generation ID (e.g., a generation ID list lookup for the vault), and generates the source name to include the object number, the generation ID, and the vault ID.

When storing data for a vault for a first time, the method continues at step 696 where the processing module facilitates establishing a fixed amount of storage capacity for metadata objects associated with the vault. The establishing includes determining whether the storage capacity has been set up by at least one of checking a flag, receiving a message, invoking a query, and testing storage resources. The establishing further includes determining the fixed amount of storage capacity based on at least one of a predetermination, a lookup, receiving a storage level, and calculating based on a data type. For example, the processing module establishes the fixed amount of storage capacity for metadata objects associated with the vault to be 2% of a vault storage allocation (e.g., and 98% for data) based on a lookup utilizing the vault ID.

The method continues at step 698 where the processing module facilitates storing the data in the DSTN. For example, the processing module generates source names utilizing random object numbers for the data. Next, the processing module encodes the data object to produce slices, generates slices names based on the source names, generates write slice requests that includes the slice names and slices, and outputs the write slice requests to the DSTN.

The method continues at step 700 where the processing module facilitates storing the metadata in the DSTN. For example, the processing module generates metadata source names utilizing deterministic object numbers for the metadata. Next, the processing module encodes the metadata object to produce metadata slices, generates metadata slice names based on the metadata source names, generates write slice requests that includes the metadata slice names and slices, and outputs the write slice requests to the DSTN. The method continues with steps 688 and 690 of FIG. 43 where the processing module generates data information for an index that includes at least one source name, a data index key, and key type traits and the processing module updates a corresponding leaf node of the index to include the data information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices to add an index into a searching index structure, the method comprises:

storing data in a dispersed storage network (DSN), wherein the data includes a data object name and one or more data portions, wherein the data is associated with a set of data index keys, wherein a data portion of the one or more data portions includes a data portion identifier (ID) and is associated with a set of portion index keys and with a version index key;

traversing, based on the set of data index keys, a plurality of index structures of the searching index structure to determine whether an object retrieval structure exists for the data object name, wherein a number of nodes and number of levels in each index structure of the plurality of index structures depends on a desired search granularity and a number of data objects that are searchable via this index structure, wherein the object retrieval structure includes a data object section and data allocation table, wherein the data object section includes the data object name and one or more data index keys, wherein the data allocation table includes one or more data version records, and wherein a data version record of the one or more data version records includes a data version identifier, one or more data version index keys, and one or more data portion records, and wherein a data portion record of the one or more data portion records includes a data portion identifier and one or more data portion index keys; and when the object retrieval structure exists, updating the object retrieval structure by:

determining whether a version record exists that corresponds to the version index key; and when the version record exists, creating, within the version record, a new data portion record for the data portion to include an identifier of the data portion and the set of portion index keys.

2. The method of claim 1 further comprises:

when the version record does not exist:

creating, within the object retrieval structure, a new version record based on the version index key; and creating, within the new version record, the new data portion record for the data portion to include the identifier of the data portion and the set of portion index keys.

3. The method of claim 2 further comprises:

updating, for the object retrieval structure, the one or more data version index keys to include the version index key.

4. The method of claim 1 further comprises:
when the object retrieval structure does not exist:
- creating a new object retrieval structure based on the set of data index keys;
- creating, within the new object retrieval structure, a new version record based on the version index key; and
- creating, within the new version record, the new data portion record for the data portion to include the identifier of the data portion and the set of portion index keys.

5. The method of claim 4 further comprises:
encoding the new object retrieval structure in accordance with a dispersed storage error encoding function to produce a set of encoded retrieval structure slices;
storing, with reference to a DSN address, the set of encoded retrieval structure slices in the DSN; and
linking the new object retrieval structure into the searching index structure based on at least one of the set of data index keys and the reference to the DSN address of the new object retrieval structure.

6. The method of claim 1 further comprises:
creating, within the version record, a second new data portion record for a second data portion of the one or more data portions to include a second identifier of the second data portion and a second set of portion index keys.

7. The method of claim 1 further comprises one or more of:
- the data including a plurality of files, wherein a file of the plurality of files corresponds to one of the one or more data portions;
- the data including a file, wherein the file is divided into the one or more data portions; and
- the data including streaming data, wherein a time segment of the streaming data corresponds to the one of the one or more data portions.

8. The method of claim 1 further comprises:
obtaining data creation information regarding the data; and
determining at least one of the version index key and the set of portion index keys based, at least in part, on the data creation information.

9. The method of claim 1 further comprises:
encoding the data portion in accordance with a dispersed storage error encoding function to produce encoded data record slices;
storing, with reference to a DSN address, the encoded data record slices in the DSN; and
equating the data portion identifier to the reference to the DSN address.

10. The method of claim 1 further comprises:
determining the set of data index keys based on attributes of the data.

* * * * *